(12) United States Patent
Kim et al.

(10) Patent No.: US 10,506,583 B2
(45) Date of Patent: Dec. 10, 2019

(54) METHOD AND APPARATUS FOR TRANSMITTING AND RECEIVING A SIGNAL IN A WIRELESS COMMUNICATION SYSTEM USING RESOURCE BLOCK STRUCTURE

(71) Applicant: Samsung Electronics Co., Ltd., Suwon-si, Gyeonggi-do (KR)

(72) Inventors: Chanhong Kim, Suwon-si (KR); Yeohun Yun, Hwaseong-si (KR); Hyunseok Ryu, Yongin-si (KR); Taeyoung Kim, Seoul (KR); Peng Xue, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/721,378

(22) Filed: Sep. 29, 2017

(65) Prior Publication Data

US 2018/0092080 A1    Mar. 29, 2018

(30) Foreign Application Priority Data

Sep. 29, 2016 (KR) .................. 10-2016-0125958
Nov. 3, 2016 (KR) .................. 10-2016-0146047

(51) Int. Cl.
*H04W 72/04* (2009.01)
*H04L 5/00* (2006.01)

(52) U.S. Cl.
CPC ......... *H04W 72/044* (2013.01); *H04L 5/0007* (2013.01); *H04L 5/0053* (2013.01); *H04L 5/0092* (2013.01); *H04W 72/042* (2013.01)

(58) Field of Classification Search
CPC .. H04W 72/044; H04W 72/042; H04L 5/0007
(Continued)

(56) References Cited

U.S. PATENT DOCUMENTS

| 8,982,822 B2 | 3/2015 | Ogawa | |
| 2011/0134892 A1* | 6/2011 | Shirakabe | H04W 72/10 370/336 |

(Continued)

FOREIGN PATENT DOCUMENTS

| WO | 2016004901 A1 | 1/2016 |
| WO | 2016137201 A1 | 9/2016 |

OTHER PUBLICATIONS

International Search Report regarding Application No. PCT/KR2017/010762, dated Jan. 18, 2018, 3 pages.
(Continued)

*Primary Examiner* — Kwang B Yao
*Assistant Examiner* — Syed M Bokhari

(57) ABSTRACT

The present disclosure relates to a 5G or pre-5G communication system to be provided to support a higher data transmission rate since 4G communication systems like LTE. The present disclosure provides a transmission and reception method applying a special resource block structure in a scalable frame structure to integrally support various services in a cellular wireless communication system. According to the present disclosure, it is possible to minimize interference between adjacent resource blocks due to heterogeneous subcarrier spacings between the 5G system and the LTE system or the 5G system to improve system performance.

14 Claims, 51 Drawing Sheets

(58) Field of Classification Search
USPC .................................................. 370/329, 330
See application file for complete search history.

(56) References Cited

U.S. PATENT DOCUMENTS

| | | | |
|---|---|---|---|
| 2011/0211489 A1* | 9/2011 | Chung | H04L 5/001 370/252 |
| 2014/0044083 A1* | 2/2014 | Kim | H04L 5/001 370/329 |
| 2015/0036645 A1 | 2/2015 | Shin et al. | |
| 2015/0200758 A1* | 7/2015 | Wakabayashi | H04L 5/0041 370/329 |
| 2015/0256308 A1 | 9/2015 | Ma et al. | |
| 2015/0327226 A1* | 11/2015 | Cheng | H04W 72/1289 370/329 |
| 2015/0381330 A1* | 12/2015 | Chen | H04L 5/0046 370/329 |
| 2017/0324525 A1 | 11/2017 | Choi et al. | |
| 2018/0048435 A1* | 2/2018 | Islam | H04L 5/001 |
| 2018/0049204 A1* | 2/2018 | Nory | H04W 76/10 |

OTHER PUBLICATIONS

Samsung, "Discussion on numerology support", 3GPP TSG WG1 Meeting #86, Aug. 22-26, 2016, 3 pages, R1-166754.

* cited by examiner

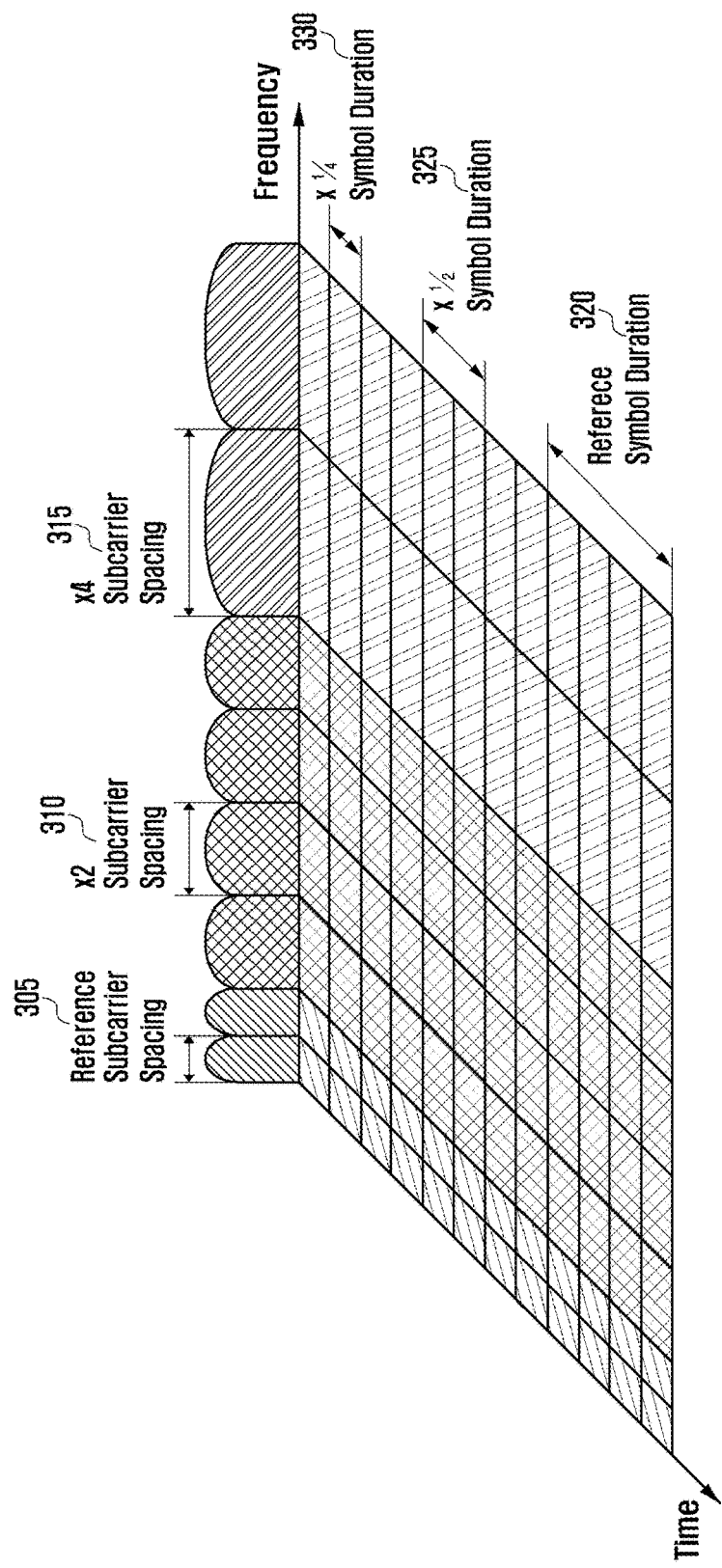

FIG. 26
DMRS pattern assigned to a UE
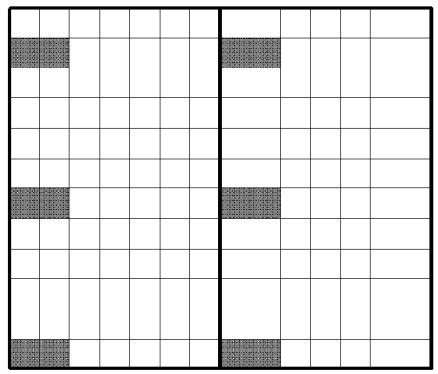
DMRS pattern assigned to a UE
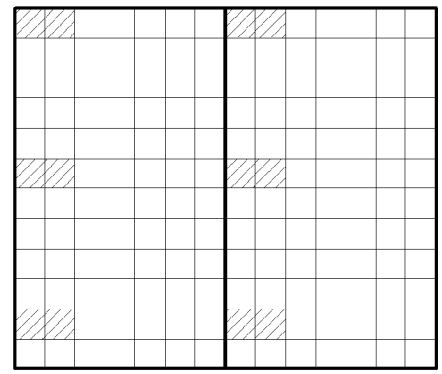

FIG. 32
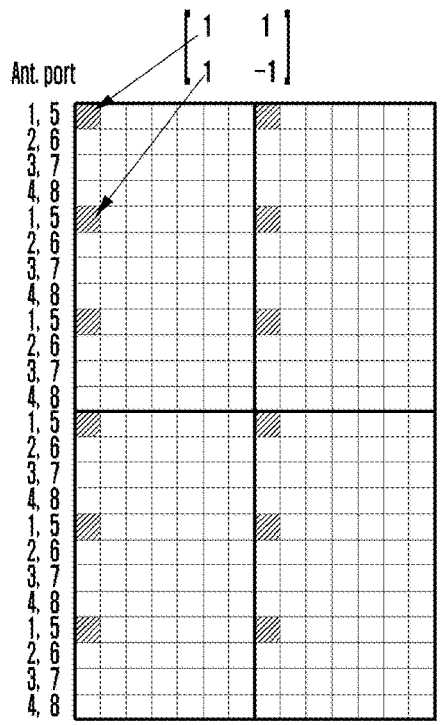
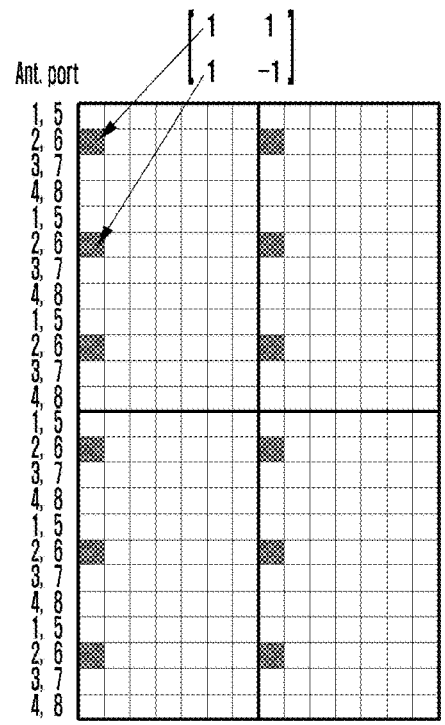
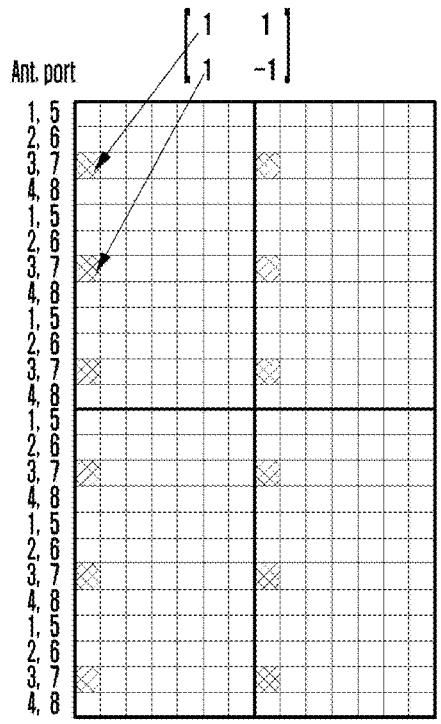
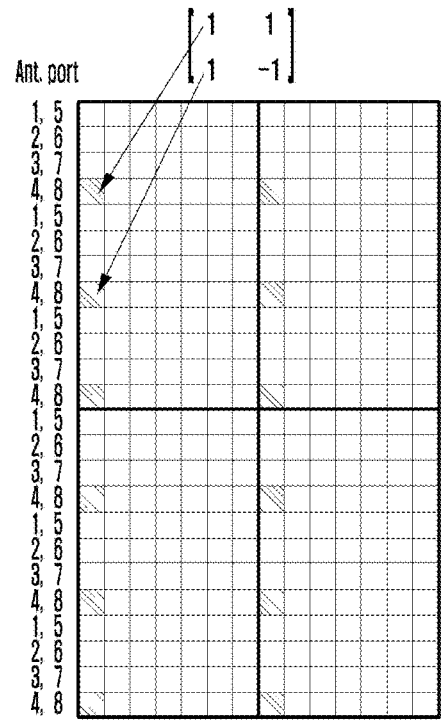

DMRS pattern assigned to a UE

METHOD AND APPARATUS FOR TRANSMITTING AND RECEIVING A SIGNAL IN A WIRELESS COMMUNICATION SYSTEM USING RESOURCE BLOCK STRUCTURE

CROSS-REFERENCE TO RELATED APPLICATION(S)

The present application is related to and claims priority to Korean Patent Application Nos. 10-2016-0125958 filed on Sep. 29, 2016 and 10-2016-0146047 filed Nov. 3, 2016, the contents of which are incorporated herein by reference.

TECHNICAL FIELD

Various embodiments of the present disclosure relate to a cellular wireless communication system, and more particularly, to a resource block structure for transmitting and receiving a signal and a method and an apparatus for transmitting and receiving a signal using the same.

BACKGROUND

In order to process explosively increasing mobile data traffic in recent years, a 5th generation (5G) system or a new radio access technology (NR) which is a next generation telecommunication system since long term evolution (LTE) or evolved universal terrestrial radio access (E-UTRA) and LTE-advanced (LTE-A) or E-UTRA evolution has been actively discussed. The existing mobile communication system focuses on voice/data communication, while the 5G system aims to meet various services, such as an enhanced mobile broad band (eMBB) service for enhancement of the existing voice/data communication, an ultra reliable/ultra-low latency communication (URLLC) service, and a machine type communication (massive MTC) service supporting mass communication of things, and requirements.

To meet a demand for radio data traffic that is on an increasing trend since commercialization of a 4G communication system, efforts to develop an improved 5G communication system or a pre-5G communication system have been conducted. For this reason, the 5G communication system or the pre-5G communication system is called a beyond 4G network communication system or a post LTE system. To achieve a high data transmission rate, the 5G communication system is considered to be implemented in an ultra-high frequency (mmWave) band (e.g., like 60 GHz band). To relieve a path loss of a radio wave and increase a transfer distance of the radio wave in the ultra-high frequency band, in the 5G communication system, beamforming using an array antenna, massive MIMO, full dimensional MIMO (FD-MIMO), array antenna, hybrid beamforming, and large scale antenna technologies have been discussed. Further, to improve a network of the system, in the 5G communication system, technologies such as an evolved small cell, an advanced small cell, a cloud radio access network (cloud RAN), an ultra-dense network, a device to device communication (D2D), a wireless backhaul, a moving network, cooperative communication, coordinated multi-points (CoMP), and reception interference cancellation have been developed. In addition to this, in the 5G system, hybrid FSK and QAM modulation (FQAM) and sliding window superposition coding (SWSC) that are an advanced coding modulation (ACM) scheme and a filter bank multi carrier (FBMC), a non-orthogonal multiple access (NOMA) that are an advanced access technology, and so on have been developed.

Meanwhile, the Internet is being evolved from a human-centered connection network through which a human being generates and consumes information to the Internet of Things (IoT) network having information between distributed components like things transmitted and received therethrough and processing the information. The Internet of Everything (IoE) technology in which the big data processing technology, etc., is combined with the IoT technology by connection with a cloud server, etc. has also emerged. To implement the IoT, technology elements, such as a sensing technology, wired and wireless communication and network infrastructure, a service interface technology, and a security technology, have been required. Recently, technologies such as a sensor network, machine to machine (M2M), and machine type communication (MTC) for connecting between things have been researched. In the IoT environment, an intelligent Internet technology (IT) service that creates a new value in human life by collecting and analyzing data generated in the connected things may be provided. The IoT may apply for fields, such as a smart home, a smart building, a smart city, a smart car or a connected car, a smart grid, health care, smart appliances, and an advanced healthcare service, by fusing and combining the existing information technology (IT) with various industries.

Therefore, various tries to apply the 5G communication system to the IoT network have been conducted. For example, 5G communication technologies such as the sensor network, the things communication, and the MTC have been implemented by techniques such as the beamforming, the MIMO, and the array antenna. The application of the cloud radio access network (cloud RAN) as the big data processing technology described above may also be considered as an example of the fusing of the 5G communication technology with the IoT technology.

Meanwhile, the frame structure of the existing LTE and LTE-A systems is designed considering normal voice/data communications, and has limitations in scalability for various services and requirements like the 5G system. Therefore, in the 5G system, there is a need to flexibly define and operate the resource block structure in the frame considering the requirements of various services.

SUMMARY

To address the above-discussed deficiencies, it is a primary object of the present disclosure to provision an efficient special resource block structure to integrally support various services in a wireless communication system and a method and an apparatus for transmitting and receiving a signal using the same. Another object of the present disclosure is to provide a special resource block in an extended frame supporting at least two different subcarrier spacings and a method and an apparatus for transmitting and receiving a signal using the same, in a cellular wireless communication system using an orthogonal frequency division multiplexing (OFDM) scheme.

Objects of the present disclosure are not limited to the above-mentioned objects. That is, other objects that are not mentioned may be obviously understood by those skilled in the art to which the present disclosure pertains from the following description.

Various embodiments of the present disclosure are directed to the provision of a signal transmission and reception method of a terminal in a mobile communication system, including: acquiring first information associated with a set of subcarrier spacing applied to the terminal; receiving second information associated with a special resource block for the set of the subcarrier spacings from a base station; and transmitting and receiving data based on the second information, in which the special resource block may include at least one null subcarrier.

Various embodiments of the present disclosure are directed to the provision of a signal transmission and reception method of a base station in a mobile communication system, including: transmitting first information associated with a reference subcarrier spacing applied to a terminal to the terminal; transmitting second information associated with a special resource block for a set of subcarrier spacings corresponding to the reference subcarrier spacing; and transmitting and receiving data based on the second information, in which the special resource block may include at least one null subcarrier.

Various embodiments of the present disclosure are directed to the provision of a terminal in a mobile communication system, including: a transceiver; and a controller configured to perform a control to acquire first information on a set of subcarrier spacings applied to the terminal, receive second information associated with a special resource block for the set of subcarrier spacings from a base station, and transmit and receive data based on the second information, in which the special resource block may include at least one null subcarrier.

Various embodiments of the present disclosure are directed to the provision of a base station in a wireless communication system, including: a transceiver; and a controller configured to control to transmit first information associated with a reference subcarrier spacing applied to a terminal to the terminal, transmit second information associated with a special resource block for a set of subcarrier spacings corresponding to the reference subcarrier spacing, and transmit and receive data based on the second information, in which the special resource block may include at least one null subcarrier.

According to various embodiments of the present disclosure, it is possible to improve the system performance by minimizing the size of the guard band for preventing the inter-symbol interference of different subcarrier spacings.

It is possible to improve the system performance by solving the resource grid mismatching problem occurring due to various subcarrier spacings.

The effects that may be achieved by the embodiments of the present disclosure are not limited to the above-mentioned objects. That is, other effects that are not mentioned may be obviously understood by those skilled in the art to which the present disclosure pertains from the following description.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 3 illustrates resource grids that may have a good frequency/time alignment with respect to each other if excluding CP from OFDM symbols of a subcarrier spacing scaled by 2× and 4× based on a specific subcarrier spacing criterion;

FIG. 26 illustrates another example of a Front-loaded DMRS pattern;

FIG. 32 illustrates DMRS patterns of FIG. 26 for each port of an OCC pair;

DETAILED DESCRIPTION

Figure 1:
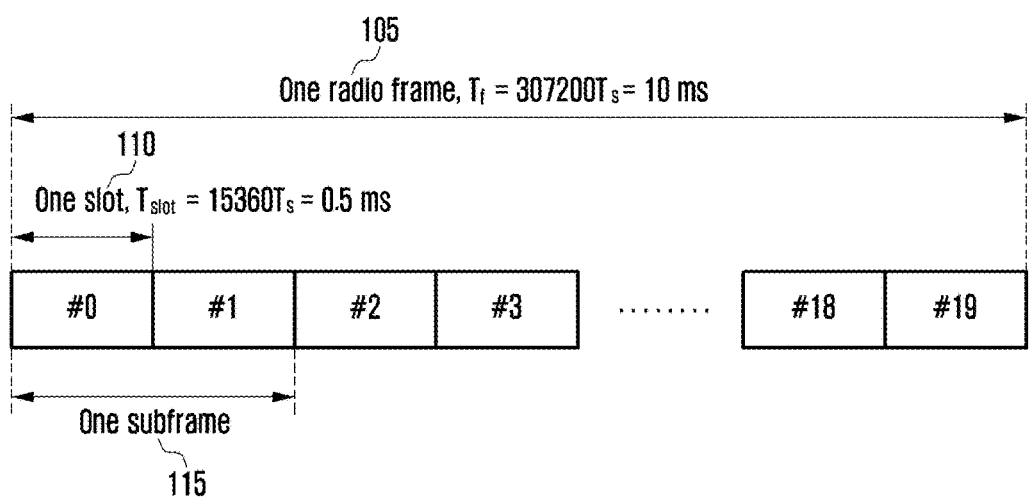
FIG. 1 illustrates definitions of a frame structure of the LTE system, a radio frame, a subframe, and a slot which are time units.

FIGS. 1 through 38, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

Hereinafter, embodiments of the present disclosure will be described in detail with reference to the accompanying drawings.

In describing the embodiments of the present disclosure, a description of technical contents which are well known to the art to which the present disclosure belongs and are not directly connected with the present disclosure will be omitted. This is to more clearly transmit a gist of the present specification by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art may easily understand the scope of the present disclosure. Therefore, the present disclosure will be defined by the scope of the appended claims. Like reference numerals throughout the description denote like elements.

In describing the embodiments of the present disclosure, a description of technical contents which are well known to the art to which the present disclosure belongs and are not directly connected with the present disclosure will be omitted. This is to more clearly transmit a gist of the present specification by omitting an unnecessary description.

For the same reason, some components are exaggerated, omitted, or schematically illustrated in the accompanying drawings. Further, the size of each component does not exactly reflect its real size. In each drawing, the same or corresponding components are denoted by the same reference numerals.

Various advantages and features of the present disclosure and methods accomplishing the same will become apparent from the following detailed description of embodiments with reference to the accompanying drawings. However, the present disclosure is not limited to the embodiments disclosed herein but will be implemented in various forms. The embodiments have made disclosure of the present disclosure complete and are provided so that those skilled in the art may easily understand the scope of the present disclosure. Therefore, the present disclosure will be defined by the scope of the appended claims. Like reference numerals throughout the description denote like elements.

In this case, it may be understood that each block of processing flow charts and combinations of the flow charts may be performed by computer program instructions. Since these computer program instructions may be mounted in a processor of a general computer, a special computer, or other programmable data processing apparatuses, these computer program instructions executed through the process of the computer or the other programmable data processing apparatuses create means performing functions described in a block(s) of the flow chart. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operation steps on the computer or the other programmable data processing apparatuses to create processes executed by the computer, thereby executing the computer or the other programmable data processing apparatuses may also provide steps for performing the functions described in a block (s) of the flow chart.

In addition, each block may indicate some of modules, segments, or codes including one or more executable instructions for executing a specific logical function (specific logical functions). Further, it is to be noted that functions mentioned in the blocks occur regardless of a sequence in some alternative embodiments. For example, two blocks that are continuously illustrated may be simultaneously performed in fact or be performed in a reverse sequence depending on corresponding functions.

Here, the term '~unit' used in various embodiment of the present disclosure means software or hardware components such as FPGA and ASIC and the '~unit' performs any roles. However, the meaning of the '~unit' is not limited to software or hardware. The '~unit' may be configured to be in a storage medium that may be addressed and may also be configured to reproduce one or more processor. Accordingly, for example, the '~unit' includes components such as software components, object oriented software components, class components, and task components and processors, functions, attributes, procedures, subroutines, segments of program code, drivers, firmware, microcode, circuit, data, database, data structures, tables, arrays, and variables. The functions provided in the components and the '~units' may be combined with a smaller number of components and the '~units' or may be further separated into additional components and '~units'. In addition, the components and the '~units' may also be implemented to reproduce one or more CPUs within a device or a security multimedia card.

Further, in the embodiments, it may be understood that each block of processing flow charts and combinations of the flow charts may be performed by computer program instructions. Since these computer program instructions may be mounted in a processor of a general computer, a special computer, or other programmable data processing apparatuses, these computer program instructions executed through the process of the computer or the other programmable data processing apparatuses create means performing functions described in a block (s) of the flow chart. Since these computer program instructions may also be stored in a computer usable or computer readable memory of a computer or other programmable data processing apparatuses in order to implement the functions in a specific scheme, the computer program instructions stored in the computer usable or computer readable memory may also produce manufacturing articles including instruction means performing the functions described in block(s) of the flow charts. Since the computer program instructions may also be mounted on the computer or the other programmable data processing apparatuses, the instructions performing a series of operation steps on the computer or the other programmable data processing apparatuses to create processes executed by the computer, thereby executing the computer or the other programmable data processing apparatuses may also provide steps for performing the functions described in a block (s) of the flow chart.

In addition, each block may indicate some of modules, segments, or codes including one or more executable instructions for executing a specific logical function (specific logical functions). Further, it is to be noted that functions mentioned in the blocks occur regardless of a sequence in some alternative embodiments. For example, two blocks that are continuously illustrated may be simultaneously performed in fact or be performed in a reverse sequence depending on corresponding functions.

When it is decided that a detailed description for the known function or configuration related to various embodiments of the present disclosure may obscure the gist of the present disclosure, the detailed description therefor will be omitted. Further, the following terminologies are defined in consideration of the functions in the present disclosure and may be construed in different ways by the intention of users and operators. Therefore, the definitions thereof should be construed based on the contents throughout the specification. Hereinafter, a base station is the subject performing resource allocation of a terminal and may be at least one of eNode B, Node B, a next generation node B (gNB), a base station (BS), NR, BS, a wireless access unit, a base station controller, and a node on a network. The terminal may include user equipment (UE), a mobile station (MS), a cellular phone, a smart phone, a computer, or a multimedia system performing a communication function. In the present disclosure, a downlink (DL) means a radio transmission path of a signal transmitted from a base station to a terminal and an uplink (UL) means a radio transmission path of a signal transmitted from the terminal to the base station. In addition, embodiments of the present disclosure may also be applied to other communication systems having a technical background or a channel form similar to the embodiments of the present disclosure to be described below. Further, embodiments of the present disclosure may be applied even to other communication systems by partially being changed without greatly departing from the scope of the present disclosure under the decision of those skilled in the art.

A system transmission bandwidth per carrier of the LTE and the LTE-A is limited up to 20 MHz, whereas the 5G system is aimed to support super-high speed data services of several Gbps using an ultra-wide bandwidth much wider than that. As a result, the 5G system has considered as a candidate frequency a band from several GHz to 100 GHz, which is relatively easy to secure an ultra-wideband frequency. Each country attempts to secure a wideband frequency for the 5G system by frequency reallocation or new frequency allocation in a frequency band included in several hundreds of MHz to several GHz used in the mobile communication systems.

In an ultra-high frequency band of tens of GHz, a wavelength of a radio wave is several millimeters, and therefore is also called millimeter wave (mmWave). Generally, as a frequency increases, a path loss of the radio wave increases. Therefore, the cell coverage of the mobile communication system using the ultra-high frequency band is reduced compared to the existing several GHz band. In order to overcome the disadvantage, a beamforming technique for concentrating radiation energy of a radio wave onto a predetermined destination by using a plurality of array antennas to increase an arrival distance of the radio wave is becoming more important. The beamforming technology may be applied not only to a transmitting end but also to a receiving end. In order for the beam forming technology to be operated properly, a method for accurate measurement and feedback of a transmitting/receiving beam direction is required. For a base station to find the transmitting/receiving beam direction for a terminal in a cell, it may be advantageous to shorten a symbol duration for beam measurement in order to perform sweeping of a plurality of beams within a short period of time.

As another requirement of the 5G system, an ultra-low latency service having a transmission delay of about 1 ms between the transmitting and receiving ends is required. By one method for reducing the transmission delay, a frame structure design based on a short transmit time interval (TTI) compared to the LTE and the LTE-A is required. The TTI is a basic unit for performing scheduling, and the TTI of the LTE and LTE-A systems is 1 ms corresponding to one subframe duration. For example, the short TTI to meet the requirements for the ultra-low latency service of the 5G system may be 0.5 ms, 0.25 ms, 0.125 ms, 62.5 µs, or the like that are shorter than the LTE and LTE-A systems.

In the case of the 5G system based on the OFDM, since the OFDM symbol duration has a reciprocal relation to the subcarrier spacing, when the subcarrier spacing is twice larger than before (e.g., LTE is 15 kHz), the OFDM symbol duration may be reduced twice, such that a short OFDM symbol duration may be made corresponding to the above requirements.

On the other hand, the 5G system needs to consider a massive machine-type communications (mMTC) service which enables a wireless connection with a large number of IoT terminals. In the case of the mMTC, a transmission scheme is required to maintain a battery life for a long period of time with a wider coverage rather than increasing a data transmission rate. In this case, the OFDM subcarrier spacing is reduced several times than before to make the symbol duration long so that transmission energy of a terminal concentrates on a narrow band.

Therefore, in order to satisfy the above-mentioned various requirements within a carrier frequency band, there is a need to design an extended frame structure design capable of simultaneously supporting various sizes of subcarrier spacings instead of fixed subcarrier spacing like LTE. First of all, the OFDM-based frame structure of the LTE and LTE-A systems and main system parameters such as subframe, slot, subcarrier spacing, and physical resource block (PRB) will be described.

FIG. 1 illustrates a frame structure for frequency division duplex (FDD) of LTE and LTE-A systems. Referring to FIG. 1, the frame structure for the FDD is disclosed. Even in the case of a time division duplex (TDD) frame, except for a special subframe, a basic structure is the same as that of the FDD, and definitions of time units such as a radio frame 105, a subframe 115, and a slot 110 are the same irrespective of duplex. Therefore, the following description will be focused on the frame structure for the FDD.

The LTE and LTE-A systems sets a reference time unit to be $$T_s = 1 \div (2048 \cdot 15 \text{ kHz}) = \frac{1}{30720000} \text{ sec}$$

which is a reciprocal number of a sampling rate of the OFDM system and sets a slot duration to be $T_{slot}=15360 \cdot T_s=0.5$ ms, in consideration of the OFDM system in which a subcarrier spacing is 15 kHz and fast Fourier transform (FFT) has a size of 2048 at a maximum system bandwidth of 20 MHz which may be supported per carrier. Two slots 110 are gathered to form one subframe 115, and ten subframes are gathered to form one radio frame 105. Therefore, the of the subframe is given by $T_{sf}=2T_{slot}=1$ ms, and the radio frame duration is given by $T_f=10T_{sf}=10$ ms. However, in various embodiments of the present disclosure, the subframe duration is not limited to 1 ms, and the subframe duration may be long or short. The change in duration may be flexibly provided according to the system design.

Figure 2A:
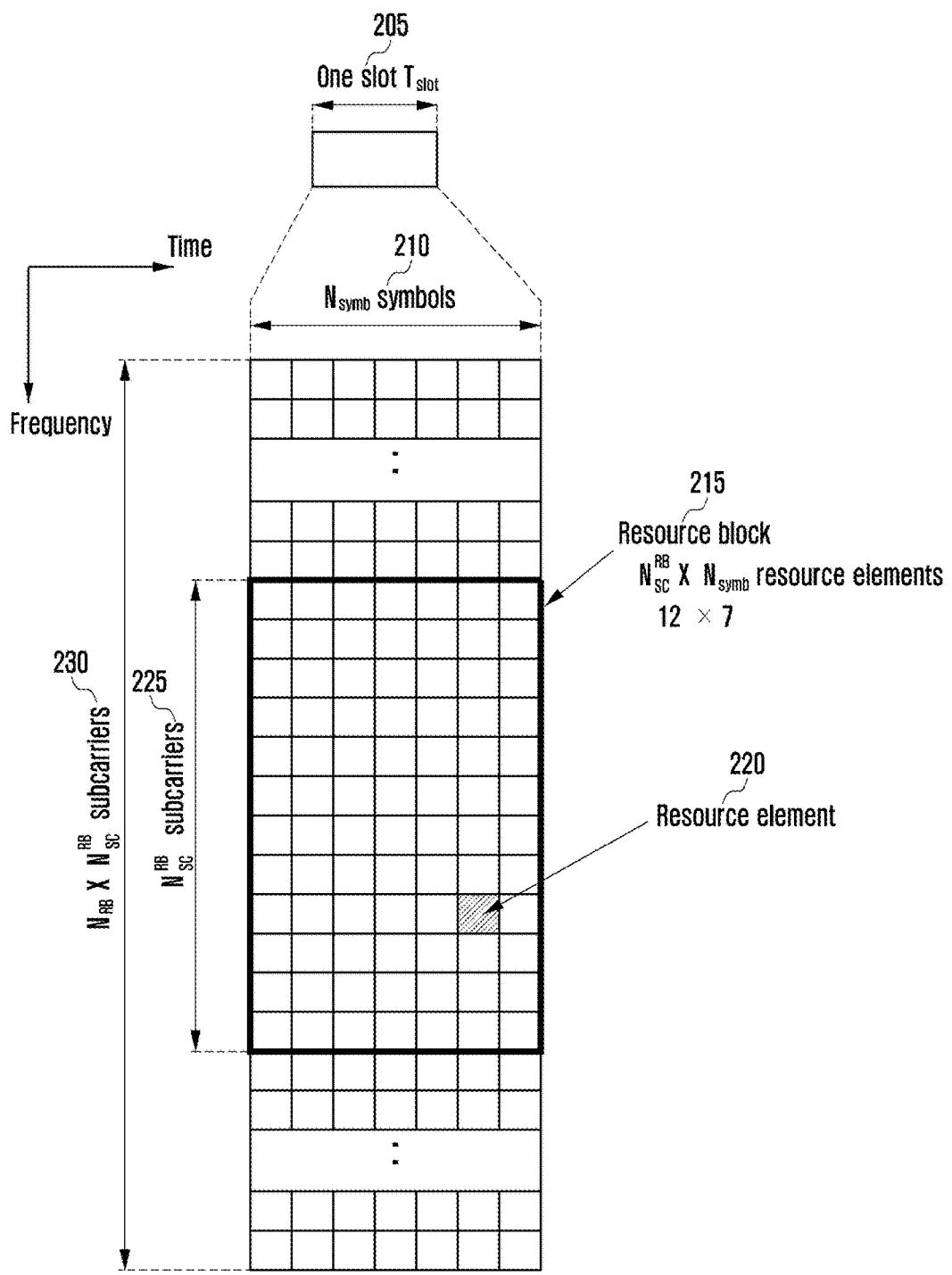
FIG. 2A illustrates definitions of a slot structure, a resource block, and a resource element using a normal CP in the LTE system.
Figure 2B:
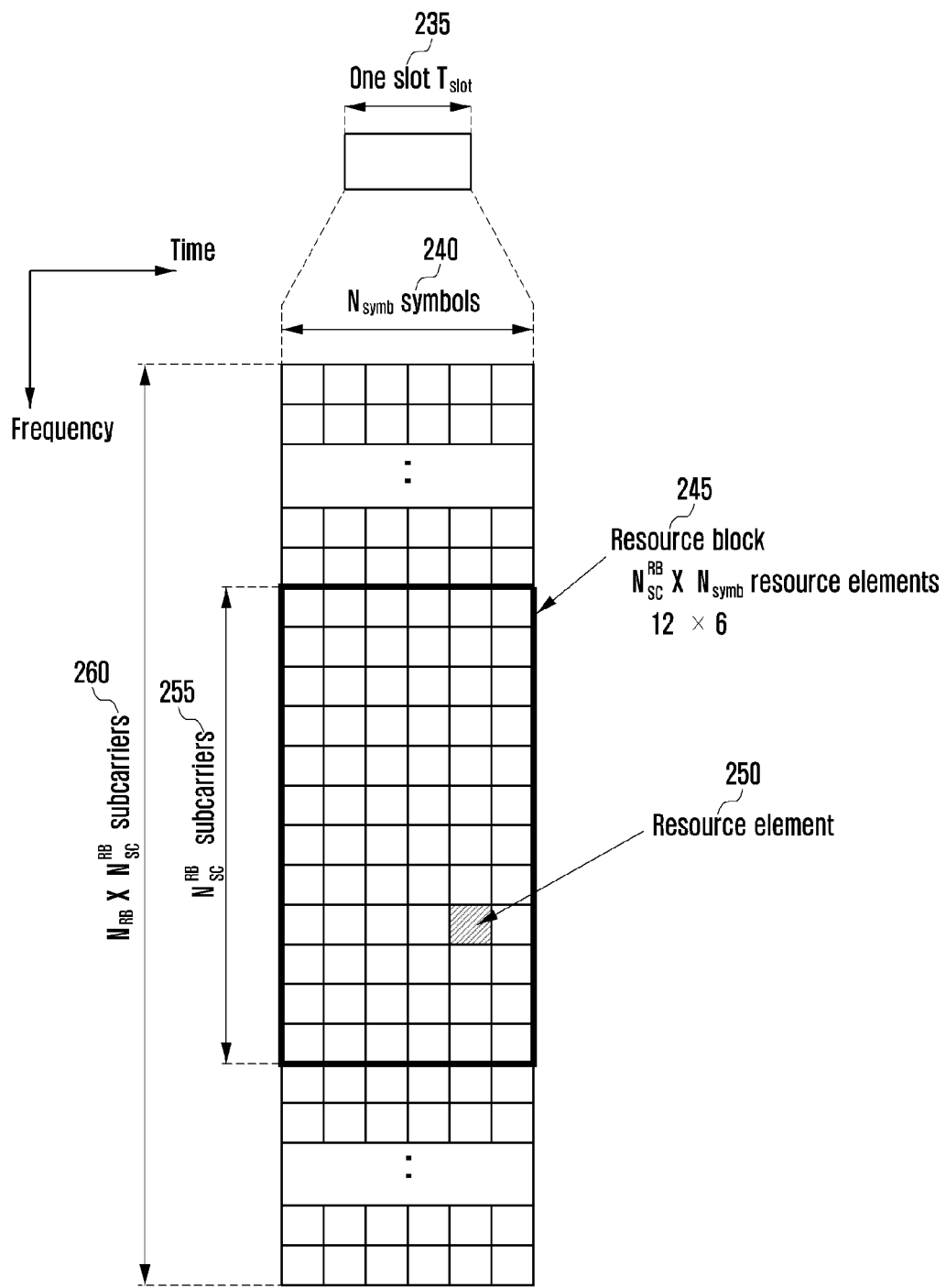
FIG. 2B illustrates definitions of a slot structure, a resource block, and a resource element using an extended CP in the LTE system.

FIGS. 2A and 2B illustrate a basic structure of a time-frequency resource area that is a radio resource area in which data or control channels of the LTE and LTE-A systems are transmitted. Referring to FIGS. 2A and 2B a horizontal axis represents a time domain and a vertical axis represents a frequency domain. A minimum transmission unit in the time domain is one OFDM symbol in the case of a downlink (DL) case and one SC-FDMA symbol in the case of an uplink (UL), in which Nsymb symbols 210 and 240 are gathered to form one slot 205 and 235. Since the OFDM symbol duration and an SC-FDMA symbol duration may correspond to each other, only the OFDM symbol duration will be described hereinafter. A basic unit of resources in the time-frequency domain is resource elements (REs) 220 and 250 and may be represented by an OFDM symbol index and a symbol index. Resource blocks 215 and 245 (RB or physical resource block (PRB)) are defined by $N_{SC}^{RB}$ consecutive subcarriers 225 in the frequency domain and $N_{symb}$ consecutive subcarriers 225 in the time domain. Therefore, one RB consists of $N_{SC}^{RB} \times N_{symb}$ REs. In the LTE and LTE-A systems, a data is mapped in an RB unit, and the base station performs scheduling in a RB-pair consisting of one subframe for a predetermined terminal, that is, two consecutive slot units. The number $N_{symb}$ of OFDM symbols 210 and 240 is determined according to a cyclic prefix (CP) duration added to each symbol to prevent the inter-symbol interference. If a normal CP is applied 210 as illustrated in FIG. 2, $N_{symb}=7$ (210) and if an extended CP is applied as illustrated in FIG. 2B, $N_{symb}=7$ (240). The extended CP may be applied to a system having a radio wave transmission distance relatively longer than the normal CP, thereby maintaining inter-symbol orthogonality. Since the number of subcarriers configuring one RB has a fixed value as $N_{SC}^{RB}=12$, a bandwidth 230 and 260 of the system transmission bandwidth increases in proportion to the number $N_{SC}$ of RBs. For example, each of the $N_{RB}$ values corresponding to the system bandwidths of 1.4 MHz, 3 MHz, 5 MHz, 10 MHz, 15 MHz, and 20 MHz supported by the LTE or the LTE-A are 6, 12, 25, 50, 75, and 100. The system bandwidth includes a guard band in which a part of both ends of the bandwidth does not transmit data in consideration of the interference with the adjacent bands. For example, in the case of the downlink of the system bandwidth of 20 MHz, a bandwidth of about 18 MHz is used as a transmission band using 1200 (=$N_{RB} \times N_{SC}^{RB}$=100×12) subcarriers except for DC at a subcarrier spacing of 15 kHz, and the rest 2 MHz is used as a guard band by being divided into both ends by 1 MHz. Even in the case of the downlink of other bandwidths, the guard band may also exist.

In the general wireless communication system, the sub-carrier spacing, the CP duration, or the like are essential information for the OFDM transmission and reception and the base station and the terminal need to recognize the subcarrier spacing, the CP duration, or the like as a common value to enable the smooth transmission and reception. Such essential information may be information transmitted from the base station to the terminal through separate signaling or may be predetermined information between the terminal and the base station.

As described above, since an operating frequency band of the 5G system is wide from several hundreds of MHz to 100 GHz, it is difficult to enable the transmission and reception suitable for channel environments for each frequency band by the operation of the single frame structure over the overall frequency band. That is, there is a need to enable the efficient signal transmission and reception by subdividing the operating frequency band and operating the frame structure in which the subcarrier spacing is defined in accordance with the subdivision of the operating frequency band.

For example, it is preferable to operate the 5G system at the short OFDM symbol duration by making the subcarrier spacing relatively large in order to overcome the performance deterioration due to the phase noise in the high frequency band and making the beam sweeping period short. Also, it is preferable to relatively increase the subcarrier spacing even when supporting a high mobility terminal whose speed is fast or supporting an ultra-low latency service terminal. On the other hand, it is preferable to enable the wide coverage and the energy-efficient low speed transmission using the long OFDM symbol duration by making the subcarrier spacing relatively small in the case of supporting the mMTC terminal in the sub-1 GHz band. In addition to the operating frequency band and the service type, even a cell size may also be a main consideration defining the frame structure. For example, when the cell size is large, it is preferable to apply a relatively long the CP duration in order to avoid an inter-symbol interference due to a multi-path propagation signal. Hereinafter, for convenience of explanation, the frame structure defined according to various scenarios such as the operating frequency band, the service characteristics, the cell size, or the like will be referred to as an extended frame structure in the following description.

One of the main subjects of various embodiments of the present disclosure is to control an interference occurring when resource blocks of signals having different subcarrier spacings are adjacent to each other on a frequency axis by setting a null subcarrier in the resource block at the time of designing the resource block structure within the extended frame structure. According to various embodiments of the present disclosure, it is possible to set guard bands in an individual subcarrier unit instead of setting the guard bands in the resource block unit, and efficiently operate the system capable of adaptively adjusting the size of the guard band according to OFDM numerology parameters, a difference in received power between different numerology signals, time/frequency synchronous accuracy between numerologies, pulse shaping capability such as filtering and windowing, performance requirements, or the like.

In the case of the OFDM subcarrier spacing in the extended frame structure, the subcarrier spacing may be determined to be an integer multiple based on the reference subcarrier spacing. Further, the subcarrier spacing may be determined to be $2^m$ times (m is any integer) based on the reference subcarrier spacing. This is because the subcarrier spacing has a reciprocal relation to the OFDM symbol duration, and thus the FFT size may be expanded in $2^{-m}$ form when the subcarrier spacing is limited to $2^m$ times. For example, if 15 kHz which is the subcarrier spacing of the LTE may be considered as a baseline subcarrier of the NR OFDM and a subcarrier spacing of 30 kHz extended therefrom is supported, a pure OFDM symbol duration excluding the CP of 30 kHz may be exactly half the pure OFDM symbol duration except for the CP of 15 kHz.

FIG. 3 illustrates OFDM symbols with a subcarrier spacing that is scaled by 2 times and 4 times based on a specific subcarrier spacing.

Referring to FIG. 3, if the OFDM symbols of the subcarrier spacing scaled by two times (310) and four times (315) based on a specific subcarrier spacing 305 do not have the CP, the alignment of the time/frequency resources, that is, the grid alignment may be made (e.g., subcarriers of the 15 kHz, 30 kHz, and 60 kHz bands may be supported). According to the embodiment of the present disclosure, the specific subcarrier 305 may be referred to as a reference subcarrier, and may be set to support the subcarrier spacings having the $2^m$ scaling relation to the reference subcarrier, for example, subcarriers of 7.5 kHz (×½), 15 kHz (×1), 30 kHz (×2), 60 kHz (×4), 120 kHz (×8), 240 kHz (×16), and 480 kHz (×32) bands.

If having the subcarrier spacing, the OFDM symbol may have symbol duration s 320 and 330 in proportion to the reciprocal number of the subcarrier spacing based on a reference symbol duration 320.

The application scope of the present disclosure may be not only applied to the scaled subcarrier spacing of $2^m$ times (m is any integer) at 15 kHz, but also applied to a system supporting the subcarrier spacing in various ways. However, as an example, a reference time unit shorter than N times based on $$T_s = \frac{1}{30720000} \sec$$

which is the reference time unit of the LTE and LTE-A systems is defined as $T_{s,N}=T_s/N$. Based on this, a method for setting a time unit such as the subframe duration, the slot duration, the OFDM subcarrier spacing, and the CP duration of the extended frame structure and a method for setting a CP duration at which time alignment between subcarrier spacings may be made will be described below. In addition, since the CP duration of the specific subcarrier spacing may be changed, the subframe duration, the slot duration, or the like which are associated with the number of OFDM symbols may be changed. Therefore, in the 5G system, the definitions of the subframe duration and the slot duration which becomes the reference for each subcarrier spacing are required. In the present specification, 15 OFDM symbol duration s are described as the subframe duration of the reference subcarrier spacing when the same frame structure as the LTE based on, for example, $T_{s,N}$, that is, the CP is not present. At this time, the slot duration is described a half of the subframe duration. For example, if N=1 (i.e., when taking the same $T_s$ as the LTE), when the reference subcarrier spacing is 15 kHz, the subframe duration is 1 ms corresponding to duration s of 15 pure OFDM symbols and the slot duration is 0.5 ms, which is the same as the definition of the LTE. When the reference subcarrier spacing is 30 kHz, the subframe duration is 0.5 ms corresponding to pure 30 kHz 15 OFDM symbol duration s and the slot duration is 0.25 ms, which is 2 times smaller than 15 kHz. Similarly, the subframe duration of $2^m$×15 kHz reference subcarrier spacing is defined as $2^{-m}$×1 ms and the slot duration is defined as $2^{-m}$×0.5 ms. However, the various embodiments of the present disclosure are not limited thereto, and the unit indicating the duration of the time domain may be variously defined other than the above-described definition.

In the various embodiments of the present disclosure, the meaning of the reference (or baseline) subcarrier spacing may be defined in various ways. The reference subcarrier spacing may be a subcarrier spacing obtained at the initial access of the terminal, a subcarrier spacing determined by the base station so that the terminal is operated using the same as a reference, or a subcarrier spacing that the base station uses as a reference. As described above, the reference subcarrier spacing may be defined differently according to the embodiment, and may be interchangeably used in each determination method.

In various embodiments of the present disclosure, a time unit in which resource scheduling is possible is called a TTI, and the duration of the TTI may vary depending on the type of services and the like. For example, the TTI for the eMBB service may be 1 ms and the TTI for the URLLC service may be 62.5 μs. The scheduling unit may be efficiently operated only when the extended frame structure to be described in various embodiments of the present disclosure is set to meet the time alignment unit, and the system may be operated by specifying different TTIs even in the extended frame structure.

Figure 4:
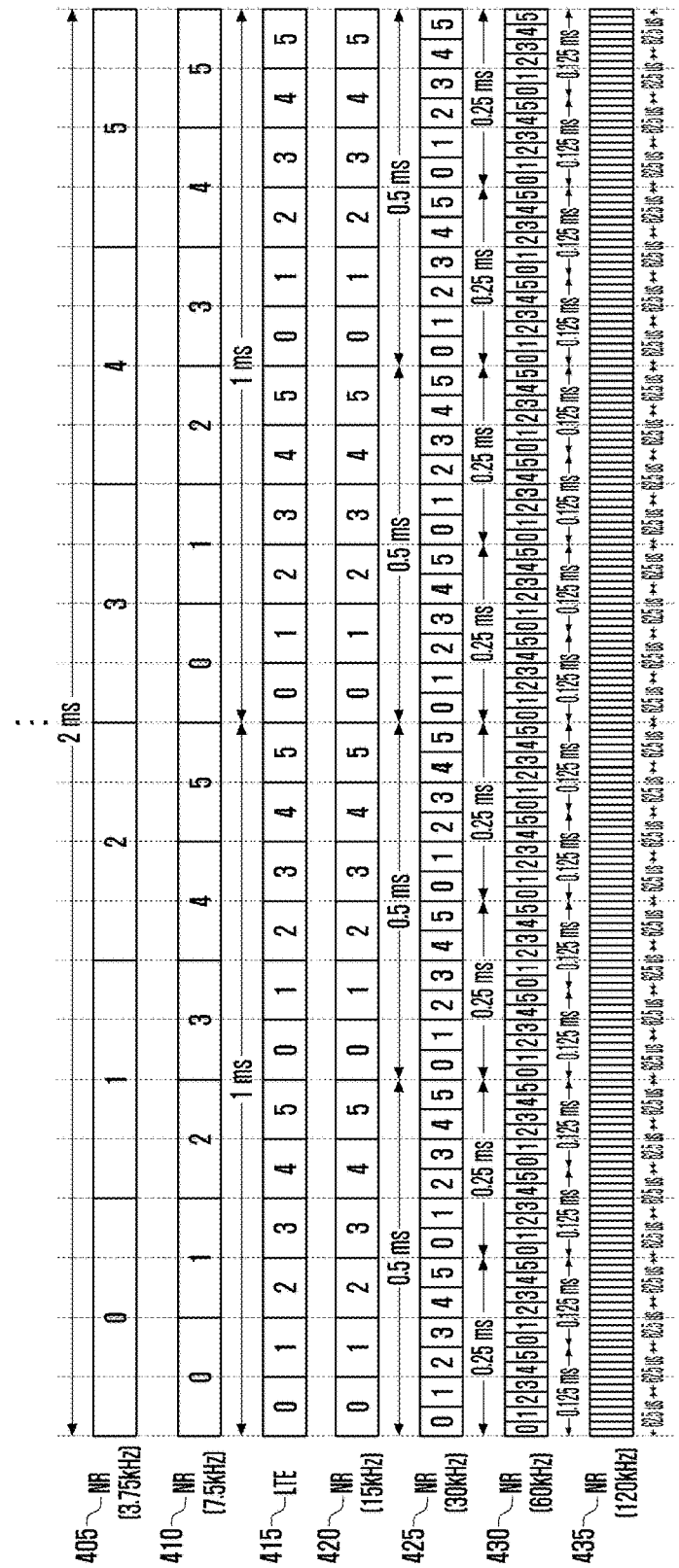
FIG. 4 illustrates an example of a frame structure satisfying an extended CP duration-based symbol/slot/subframe alignment having a CP ratio of 1/4, for any 2m reference subcarrier spacing based on 15 kHz.

FIG. 4 illustrates an extended frame structure in which symbols/slots/subframes are aligned when the subcarrier spacing is scaled by 4 times downward and 16 times upward based on the LTE/LTE-A 15 kHz.

Referring to FIG. 4, a frame structure of a plurality of subcarriers 405, 410, 420, 425, 430, and 435 scaled based on an LTE subcarrier 415 is illustrated. Each number assigned to each subcarrier spacing corresponds to an OFDM symbol index included in one slot. A width of each index block means a CP-OFDM symbol duration obtained by adding one CP duration to a pure OFDM symbol duration. As the subcarrier spacing is scaled by 2 times from 3.75 kHz to 120 kHz, the subframe duration is reduced by 2 times from 4 ms to 0.125 ms, and the slot duration is also reduced by 2 times from 2 ms to 62.5 μs. Since all the CP-OFDM symbol durations are the same for each subcarrier spacing, the periodicity for the CP pattern may be 1. All these properties may be extended for normal $2^m$ subcarrier spacing scaling.

Figure 5:
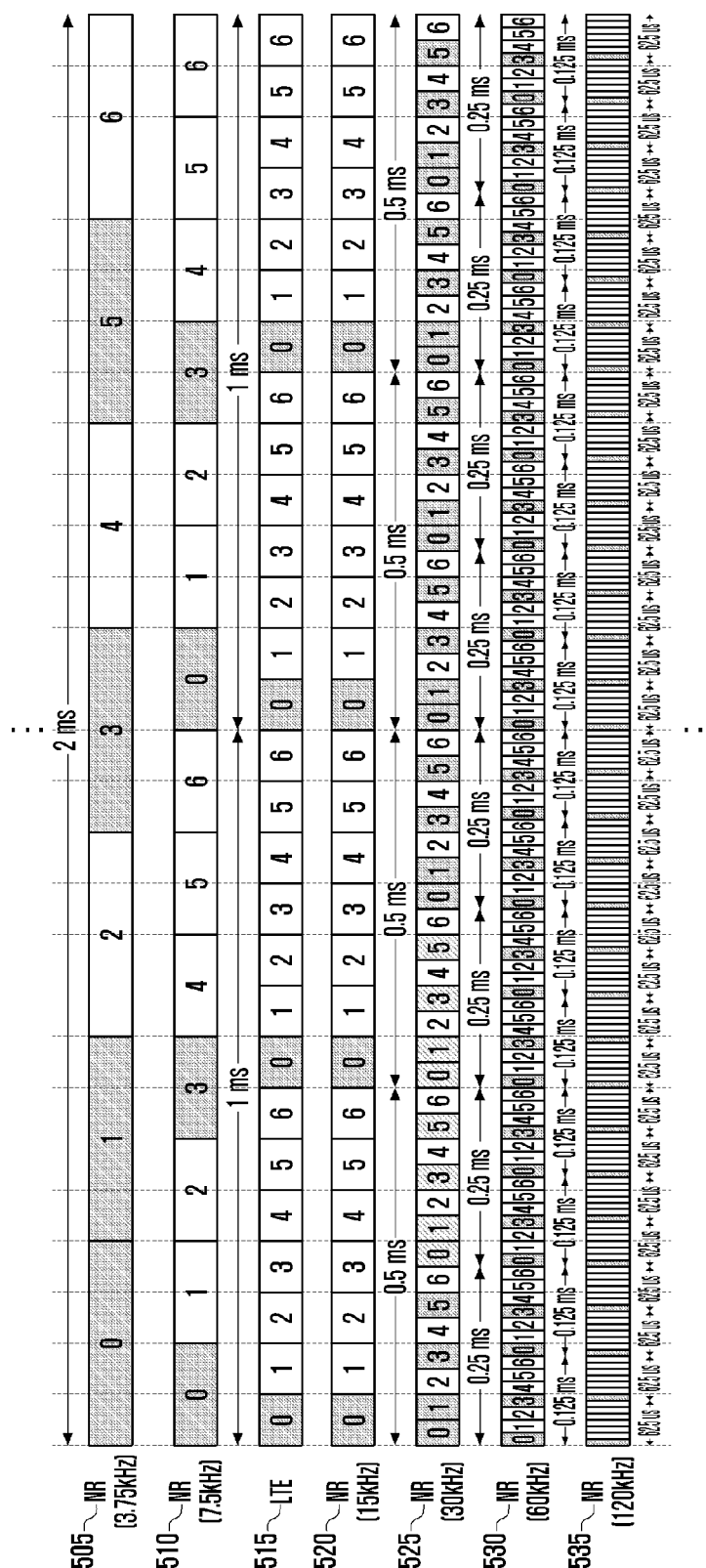
FIG. 5 illustrates an example of a frame structure satisfying a normal CP duration-based symbol/slot/subframe alignment having a CP ratio of 1/14, for any 2m reference subcarrier spacing based on 15 kHz.

FIG. 5 illustrates an example of the extended frame structure satisfying the symbol/slot/subframe alignment when scaling the subcarrier spacing by $2^m$ while maintaining compatibility with the LTE/LTE-A in the case of a normal CP with a CP ratio of 1/14.

Referring to FIG. 5, a frame structure of a plurality of subcarriers 505, 510, 520, 525, 530, and 535 scaled based on an LTE subcarrier 515 is illustrated. Blocks (e.g., 0, 1 indexes in carrier wave (505)) denoted by dark gray represent one CP-OFDM symbol duration using a longer CP duration in a normal CP, and the rest blocks are one CP-OFDM symbol duration using shorter CP duration in the normal CP. By doing so, the normal CP of 15 kHz subcarrier spacing of a new radio (NR) access technology) becomes the same as the normal CP duration pattern of the LTE/LTE-A, thus maintaining compatibility with the LTE/LTE-A.

Figure 6A:
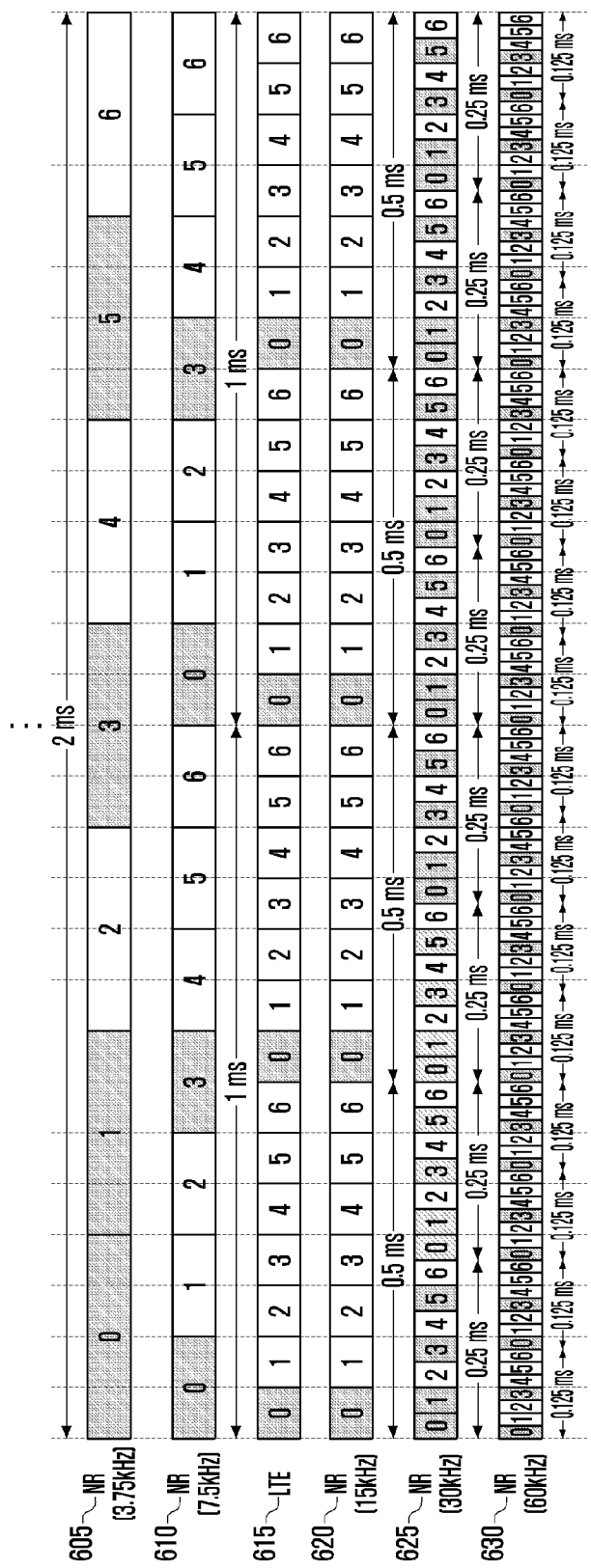
FIG. 6A illustrates an example of a frame structure satisfying a normal CP duration-based symbol/slot/subframe alignment having a CP ratio of 1/14, for 3.75 kHz, 7.5 kHz, 30 kHz, and 60 kHz while keeping a CP pattern of the LTE based on T_s and 15 kHz for the purpose of a sub-6 GHz band.
Figure 6B:
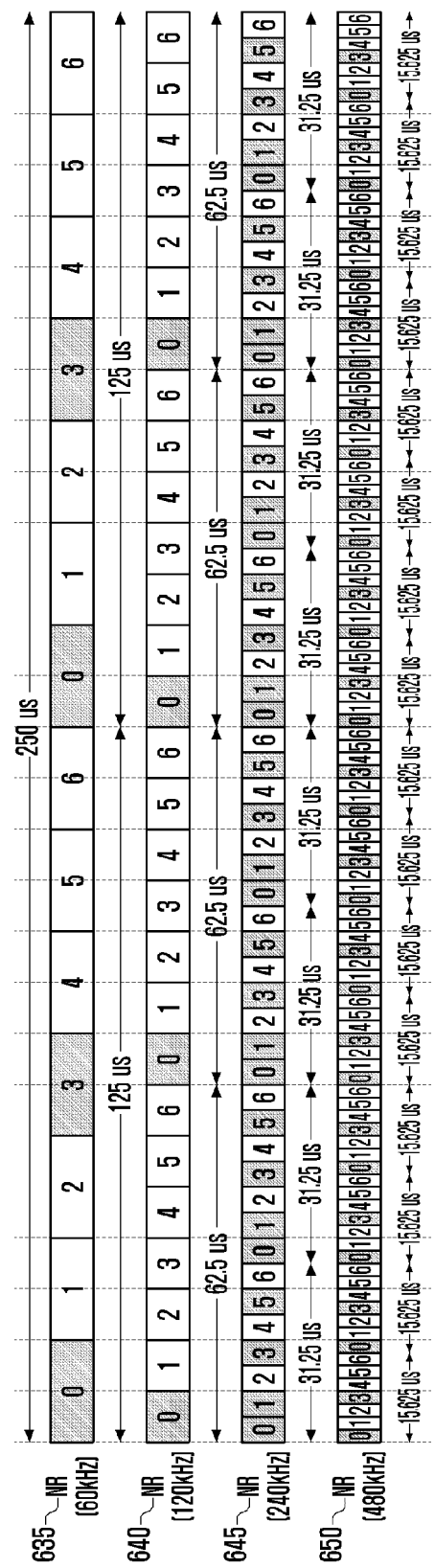
FIG. 6B illustrates an example of a frame structure satisfying a normal CP duration-based symbol/slot/subframe alignment having a CP ratio of 1/14, for, 60 kHz, 120 kHz, 240 kHz, and 480 kHz while keeping a CP pattern of the LTE based on T_s and 15 kHz for the purpose of a mmWave band.
Figure 7A:
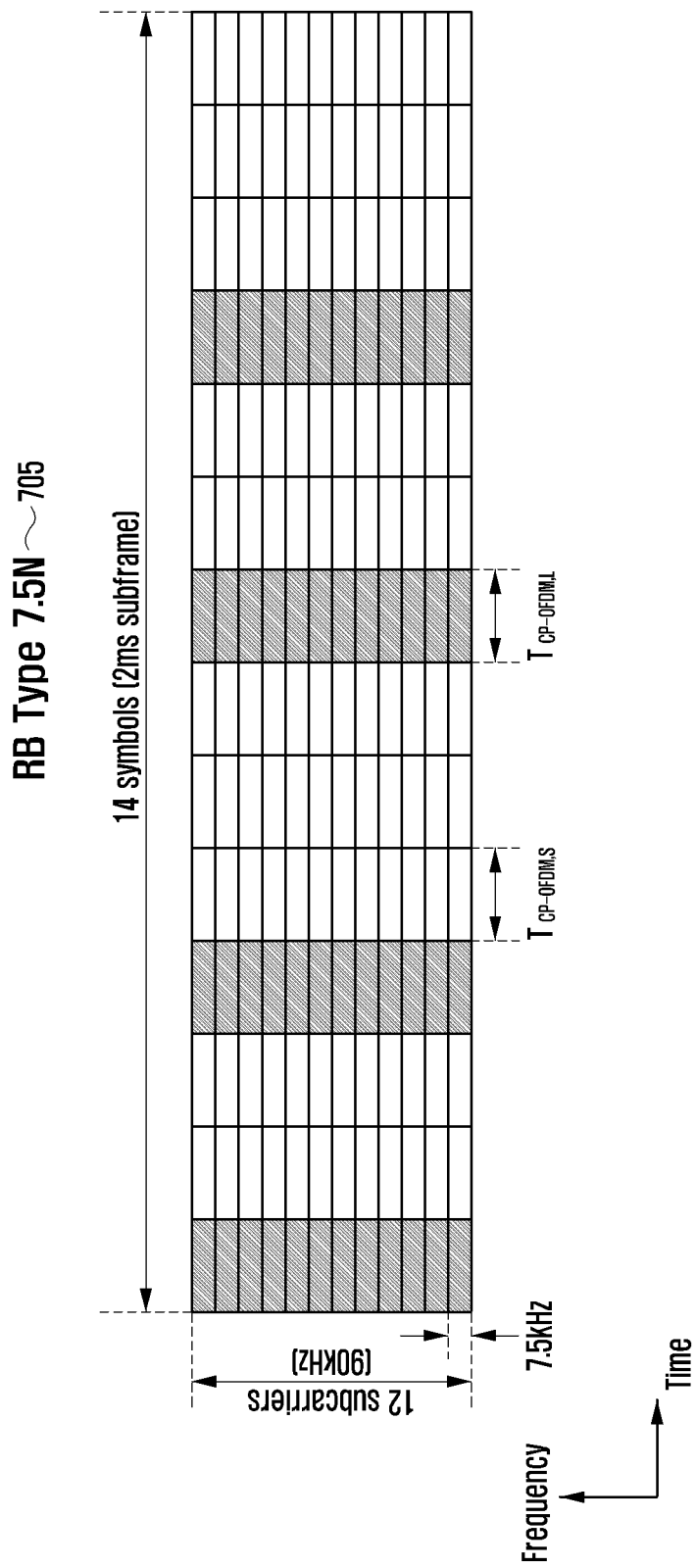
FIG. 7A illustrates an example of a resource block corresponding to a normal CP of a 7.5 kHz reference subcarrier spacing.
Figure 7B:
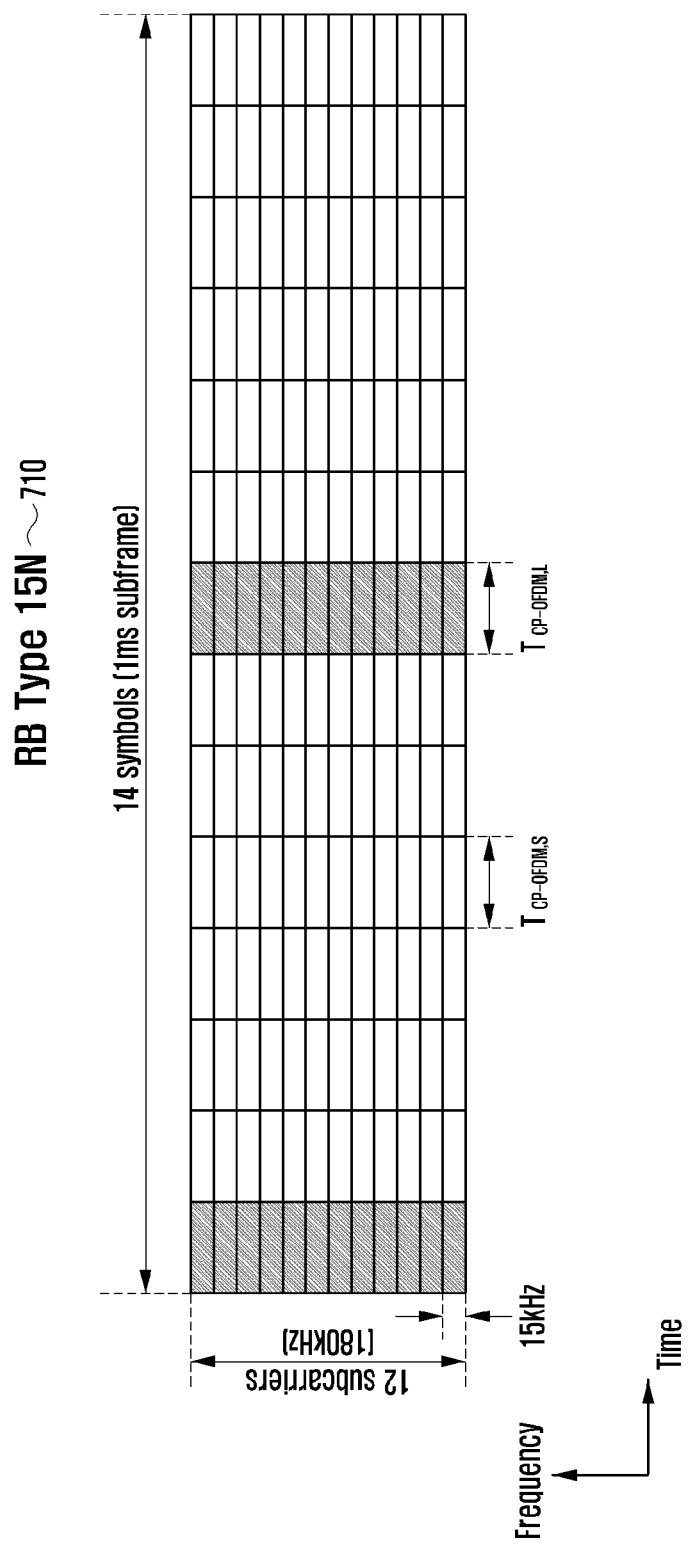
FIG. 7B illustrates an example of a resource block corresponding to a normal CP of a 15 kHz reference subcarrier spacing.
Figure 7C:
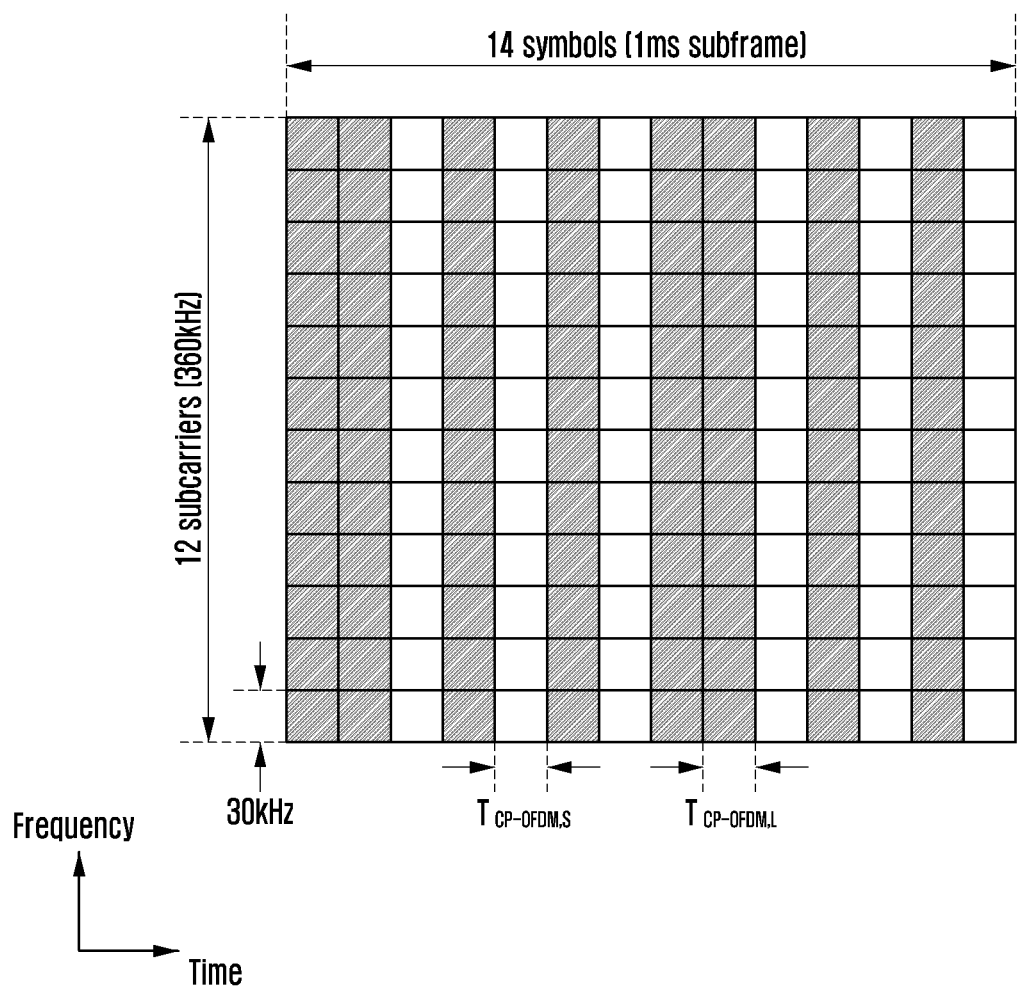
FIG. 7C illustrates an example of a resource block corresponding to a normal CP of a 30 kHz reference subcarrier spacing.
Figure 7D:
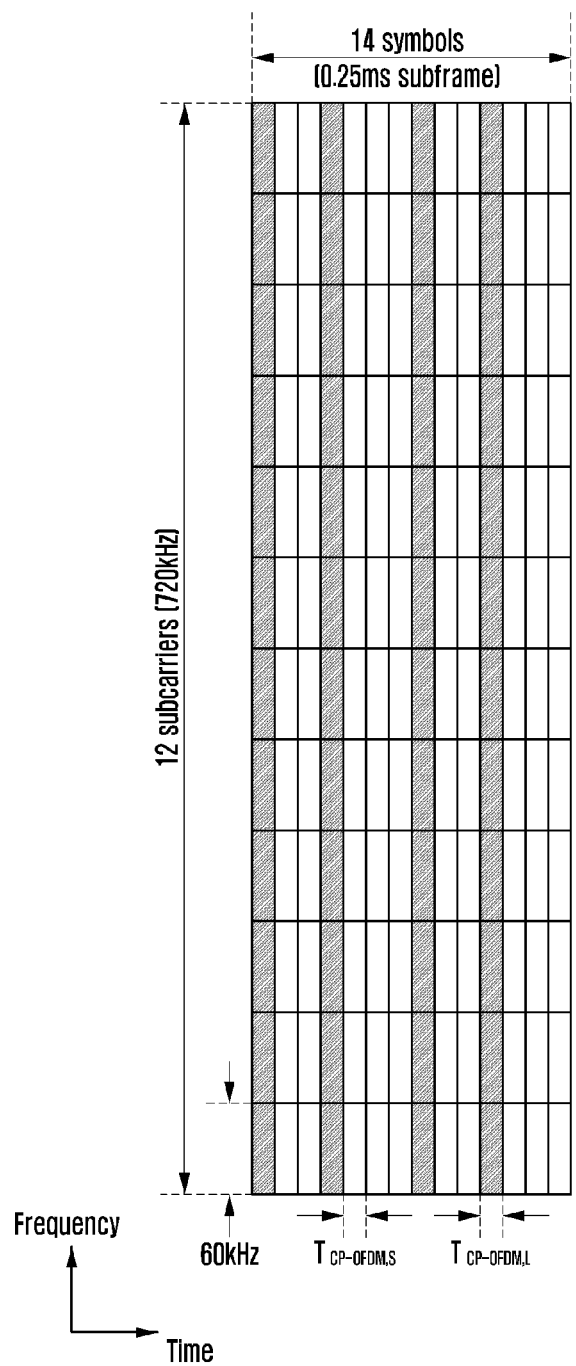
FIG. 7D illustrates an example of a resource block corresponding to a normal CP of a 60 kHz reference subcarrier spacing.
Figure 8A:
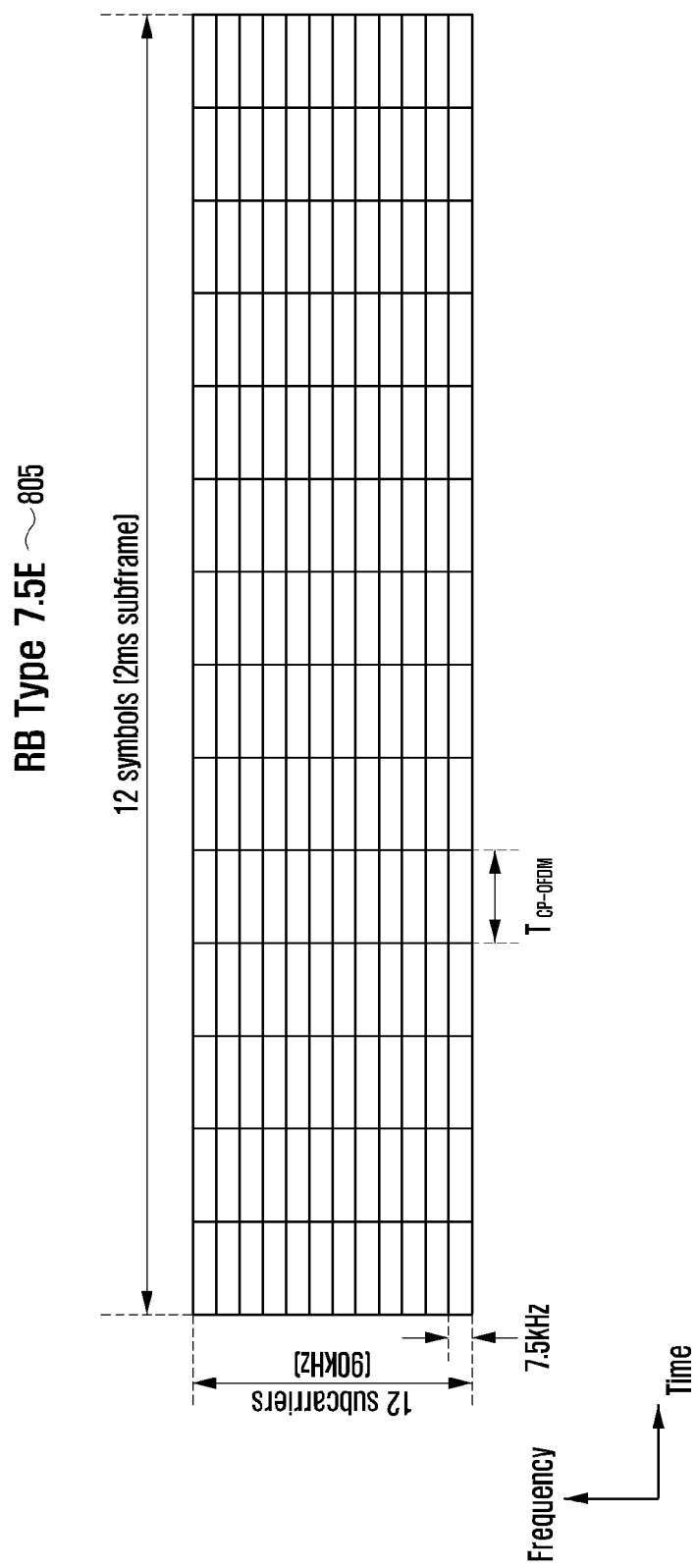
FIG. 8A illustrates an example of a resource block corresponding to an extended CP of a 7.5 kHz reference subcarrier spacing.
Figure 8B:
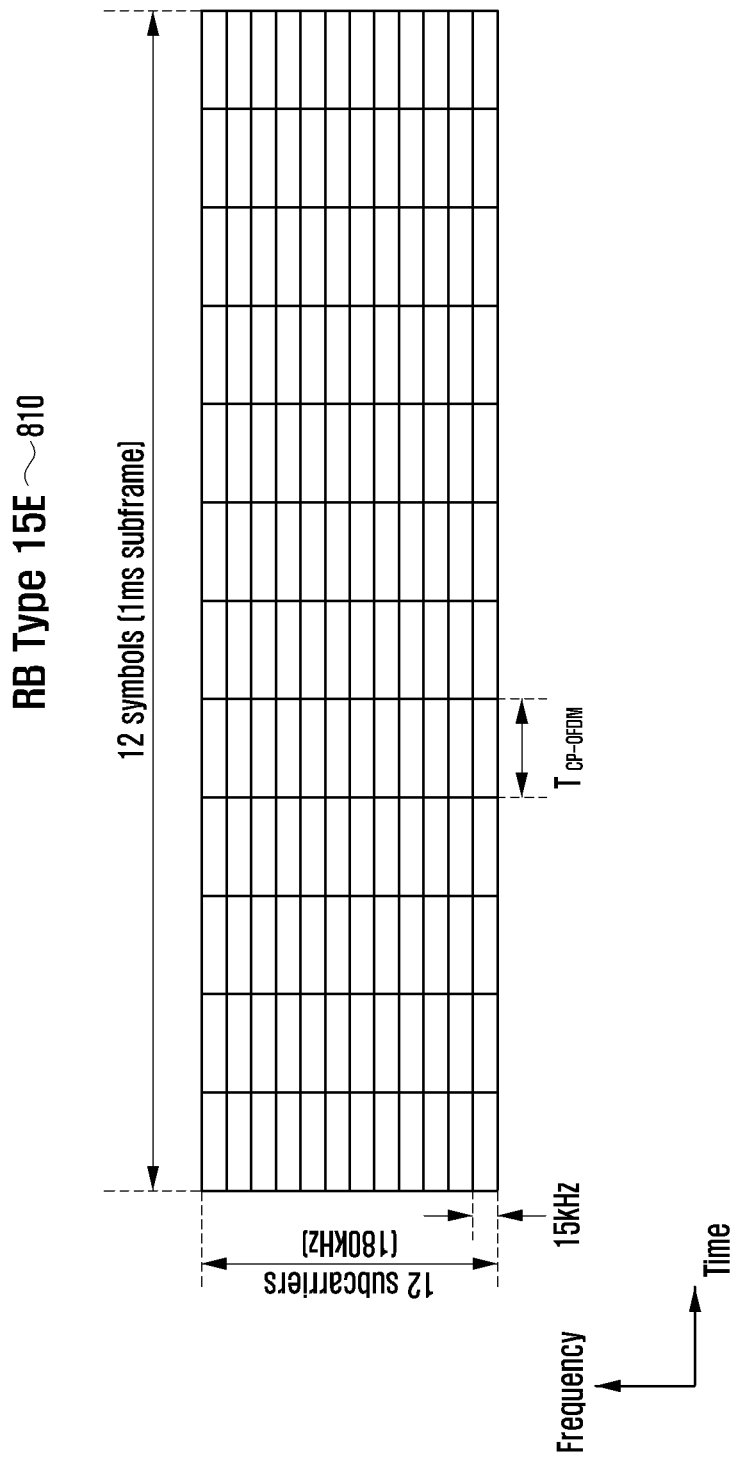
FIG. 8B illustrates an example of a resource block corresponding to an extended CP of a 15 kHz reference subcarrier spacing.
Figure 8C:
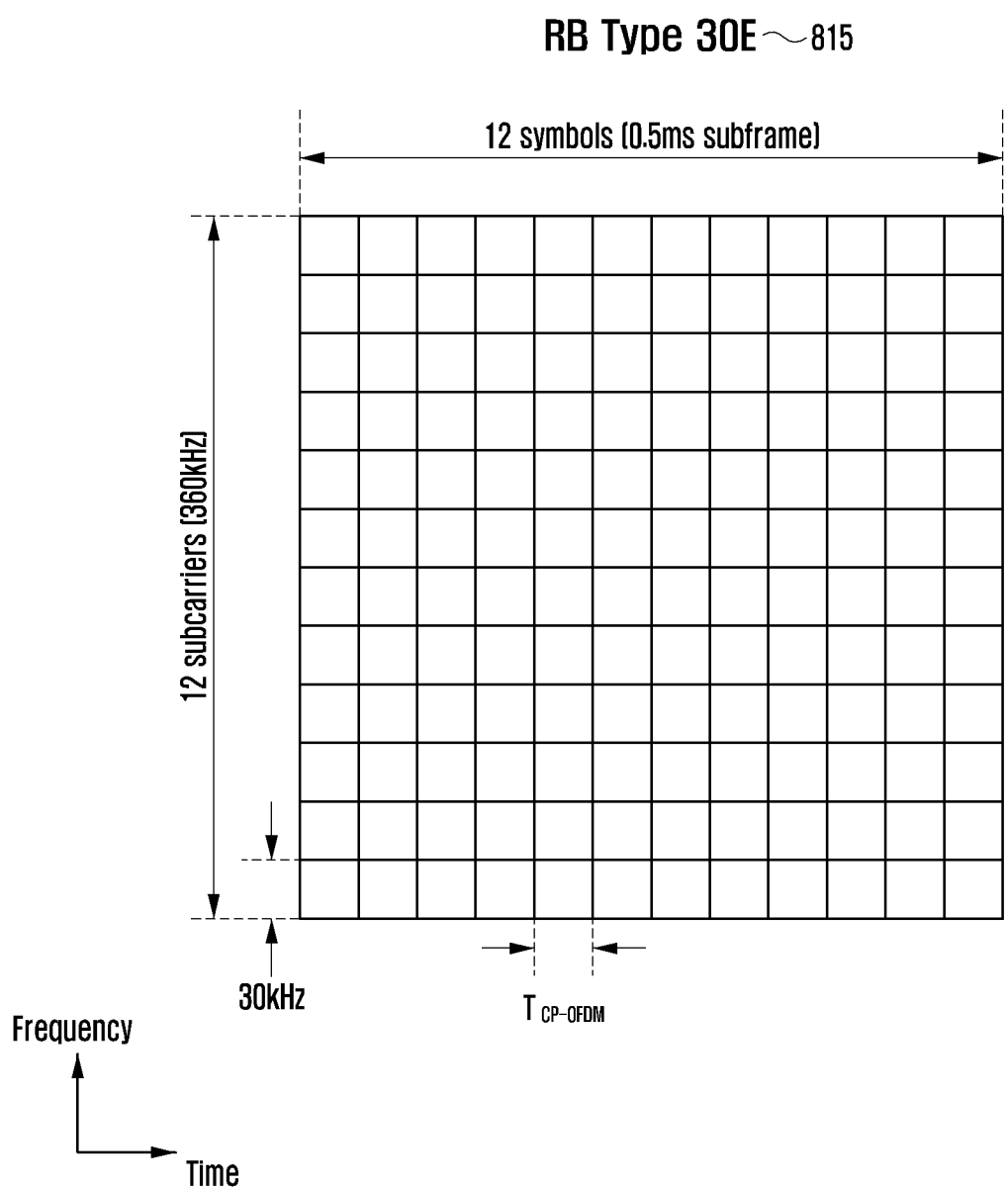
FIG. 8C illustrates an example of a resource block corresponding to an extended CP of a 30 kHz reference subcarrier spacing.
Figure 8D:
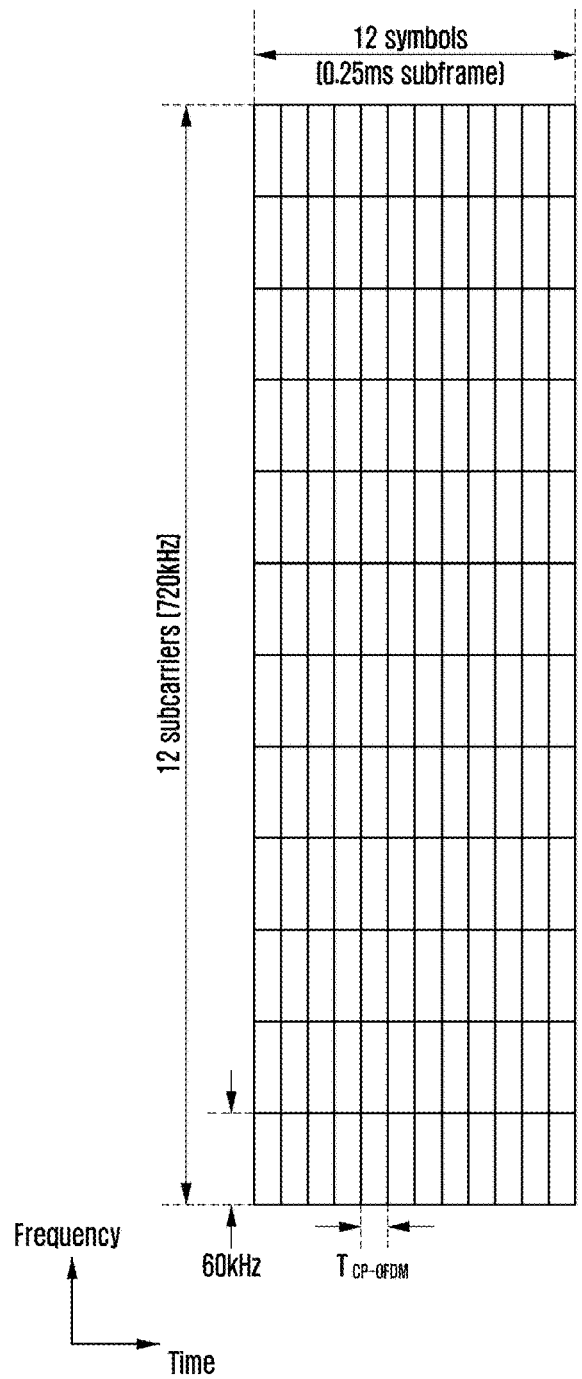
FIG. 8D illustrates an example of a resource block corresponding to an extended CP of a 60 kHz reference subcarrier spacing.

FIGS. 6A and 6B illustrate an extended frame structure up to a 60 kHz subcarrier spacing enabling the symbol/slot/subframe alignment while maintaining the compatibility of the LTE/LTE-A.

Referring to FIGS. 6A and 6B, a frame structure of a plurality of subcarriers 605, 610, 620, 625, 630, 635, 640, 645, and 650 scaled based on an LTE subcarrier 615 is illustrated.

The system operation may be made without greatly changing the frame structure depending on the frequency band, the support bandwidth size, or the like by supporting the set of various subcarrier spacings in which the same CP pattern may be applied and supporting the integer multiple scaling based on the reference time unit of 15 kHz, thereby greatly lowering the complexity of the system implementation while securing flexibility/scalability in the frame structure.

Hereinafter, the method for setting a resource block for an extended frame structure will be described.

Until now, the extended frame structure on the time axis has been described. Now, to describe the extended frame structure on the frequency axis, a resource block (RB) which may be a basic unit of resource allocation will be described.

FIGS. 7A to 7D illustrate the extended frame structure for the normal CP capable of maintaining the compatibility with the LTE/LTE-A and performing the symbol/slot/subframe alignment between subcarrier spacings as illustrated in FIG. 6A, and illustrate the resource block setting for each subcarrier spacing.

Referring to FIGS. 7A to 7D, a method for setting a resource block of an extended frame structure for a normal CP at 7.5 KHz (705), 15 KHz (710), 30 KHz (715), and 60 KHz (720) is disclosed. In the embodiment, the symbol darkly represented is a symbol having a relatively long CP duration, and the time interval may be represented as $T_{CP\text{-}OFDM,L}$, and an uncolored symbol is a symbol having a relatively short CP duration and may be represented by $T_{CP\text{-}OFDM,M}$.

The number of frequency axis subcarriers×the number of time axis OFDM symbols is equal to 12×14 so that the number of resource elements (REs) in one resource block may be the same even if the subcarrier spacing is changed, and the CP pattern for satisfying the symbol/slot/subframe alignment was applied.

FIGS. 8A to 8D illustrate the extended frame structure for the extended CP capable of maintaining the compatibility with the LTE/LTE-A and performing the symbol/slot/subframe alignment between the subcarrier spacings as illustrated in FIG. 6A, and illustrate an example of the resource block setting for each subcarrier spacing.

Referring to FIGS. 8A to 8D, a method for setting a resource block of an extended frame structure for an extended CP at 7.5 KHz (805), 15 KHz (810), 30 KHz (815), and 60 KHz (820) is disclosed. The extended CP has the same CP duration, which may be represented by $T_{CP\text{-}OFDM}$.

FIGS. 8A to 8D illustrate an example of setting a resource block that may be used in an extended frame structure for an extended CP as illustrated in FIG. 4. Here, the number of frequency-axis subcarriers is set to be 12 for the compatibility with the LTE, but 16 subcarriers or other numbers of subcarriers are possible without considering the compatibility with the LTE. However, by maintaining the number of subcarriers at the subcarrier spacing to be the same, the RB alignment may be performed well even on the frequency axis, so that the system operation may be easily extended regardless of the FDM/TDM system.

Figure 9A:
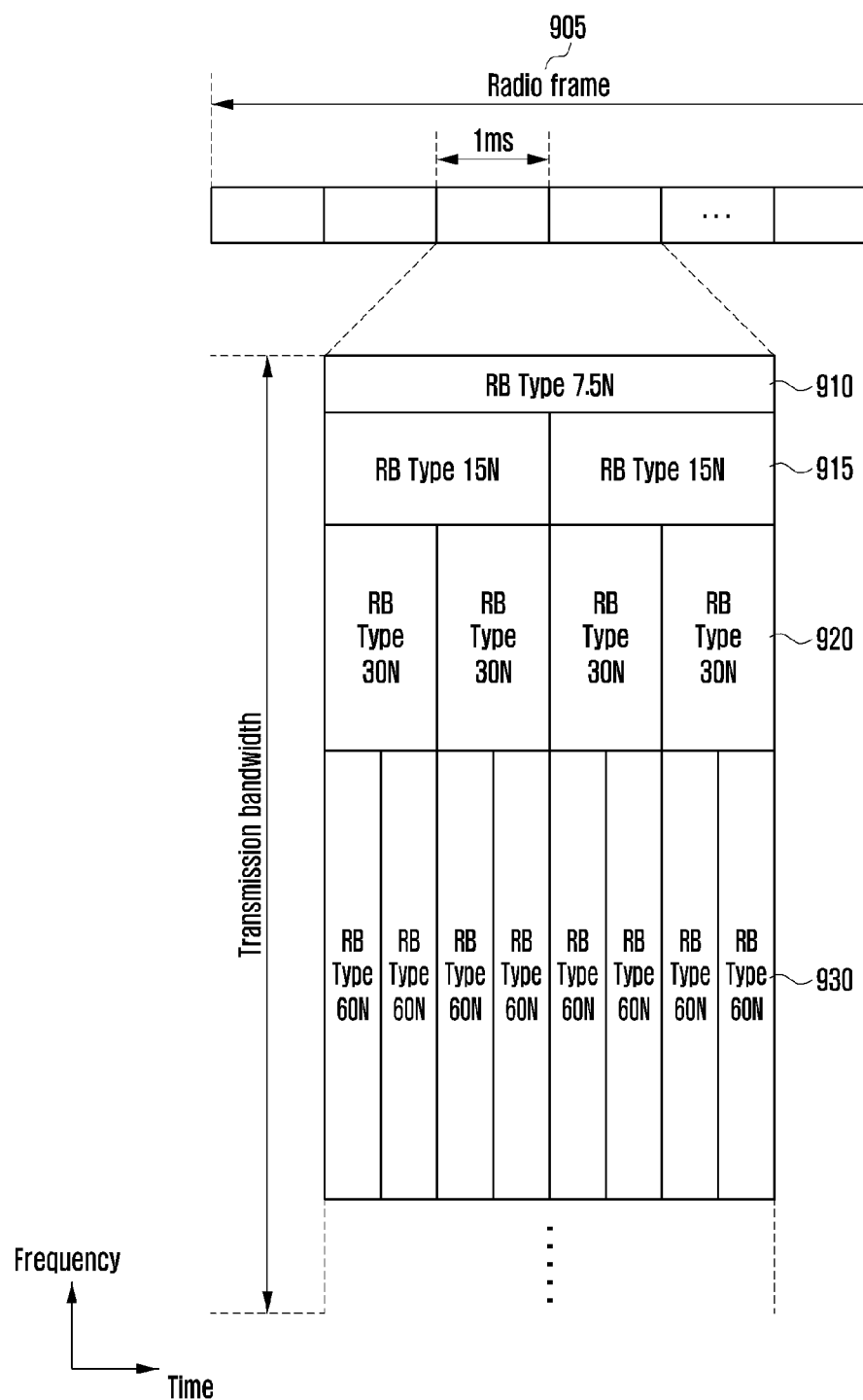
FIG. 9A illustrates an example in which resource blocks coexist in a frequency division multiplexing (FDM) form as in FIG. 7A/7B/7C/7D in an extended frame structure as illustrated in FIG. 6A.
Figure 9B:
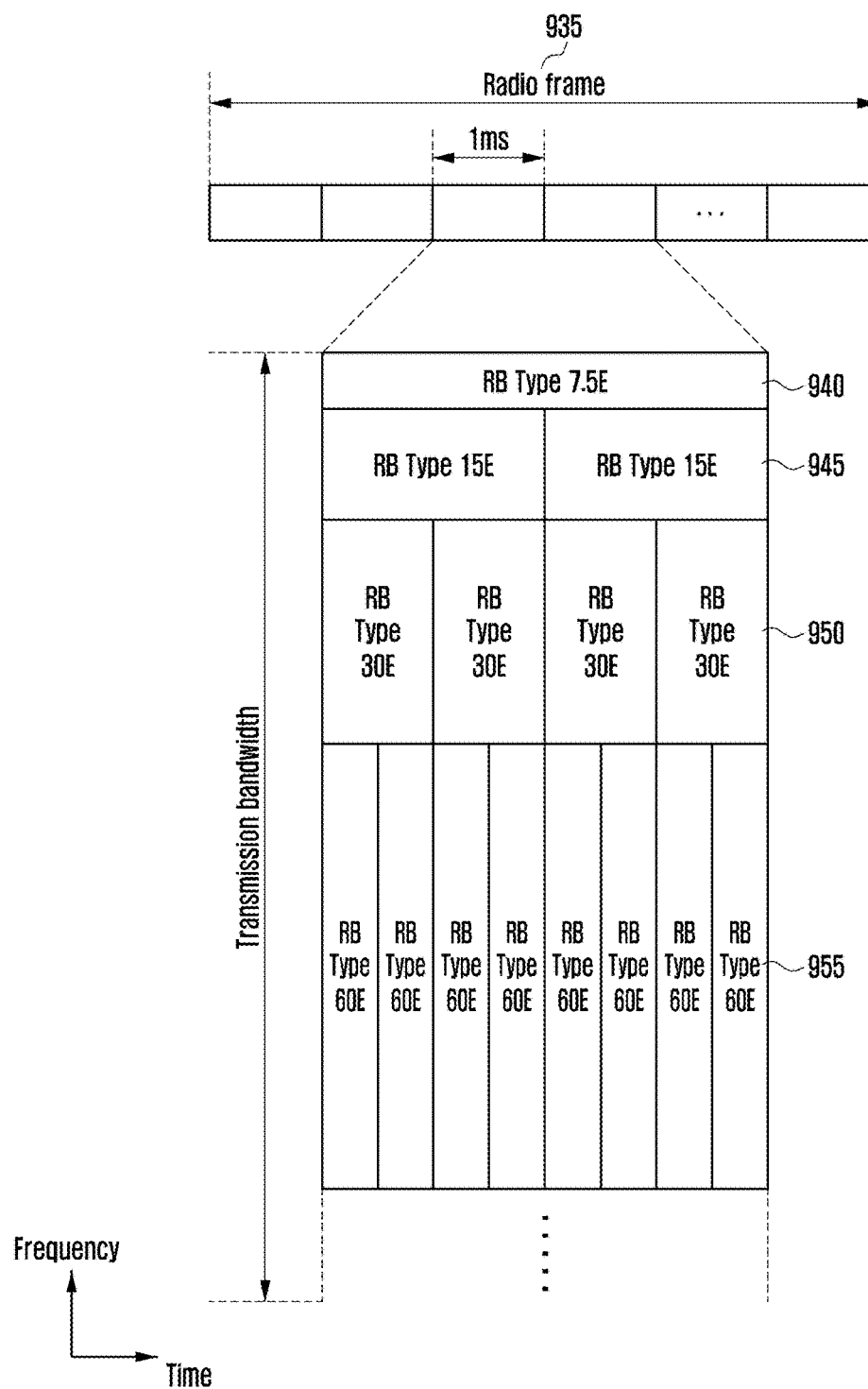
FIG. 9B illustrates an example in which resource blocks coexist in the frequency division multiplexing (FDM) form as in FIG. 8A/8B/8C/8D in the extended frame structure as illustrated in FIG. 4.

FIG. 9A illustrates an example in which the resource blocks as illustrated in FIGS. 7A to 7D coexist in the frequency division multiplexing (FDM) type in the extended frame structure as illustrated in FIG. 6A, and FIG. 9B illustrates an example in which the resource block as illustrated in FIGS. 8A to 8D coexist in the frequency division multiplexing (FDM) type.

Figure 10:
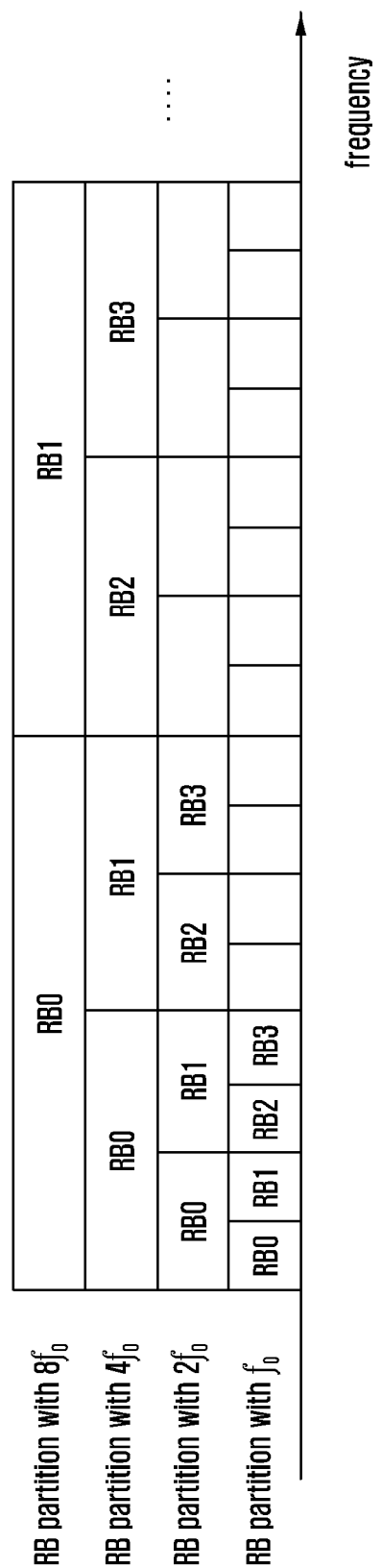
FIG. 10 illustrates an example in which grids of resource blocks for a subcarrier spacing scaled in a form of 2×, 4×, and 8× based on a f0 subcarrier spacing is hierarchically configured.

The reason of performing the alignment on the frequency axis as illustrated in FIGS. 9A and 9B is to solve the above problem because the control information overhead may be increased at the time of the resource operation if the separate RB mapping/indexing rule is established for each subcarrier spacing when an informatization operation for the resource scheduling is performed in supporting various subcarrier spacings. For example, a hierarchical structure in which two consecutive RBs 1715 for 15 kHz become one RB 1730 of 30 kHz and two consecutive RBs 1730 of 30 kHz become one RB 1735 of 60 kHz to allow the terminal to more easily figure out the resource map depending on the subcarrier spacing while reducing the overhead of the control information, thereby making the procedure easy when the switching operation to other subcarrier spacings is required. FIG. 10 illustrates the hierarchical structure of the RB.

Figure 11:
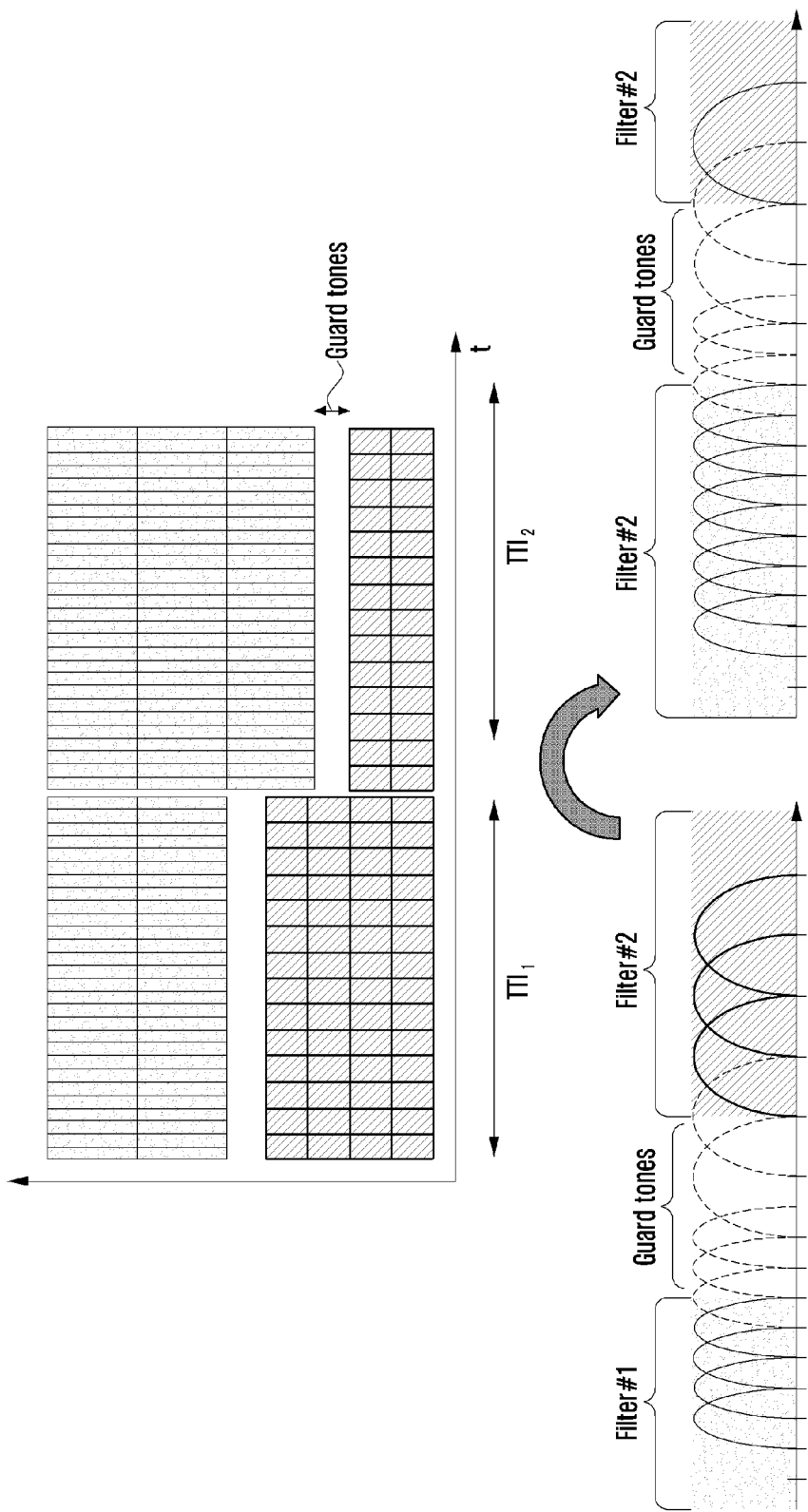
FIG. 11 illustrates an example of an interference situation that may occur when two signals having different subcarrier spacings coexist in a frequency division multiplexing form and an example of setting a guard band using null subcarriers and waveform shaping to control the interference situation.

FIG. 11 illustrates an example in which signals of two different subcarrier spacings are allocated to adjacent RBs in the frequency division multiplexing form. In this case, the interference occurs due to the mutual non-orthogonality of both signals at the point where different subcarrier spacing meets each other. Therefore, a method for solving the same is required. According to various embodiments of the present disclosure, various methods for placing guard tones (or guard bands) between different subcarrier spacings, reducing out-of-band radiation by applying waveform shaping to OFDM signals such as subband filtering and windowing, applying a low modulation and coding scheme (MCS) level to adjacent resource areas by base station scheduling, or the like may be considered.

Figure 12:
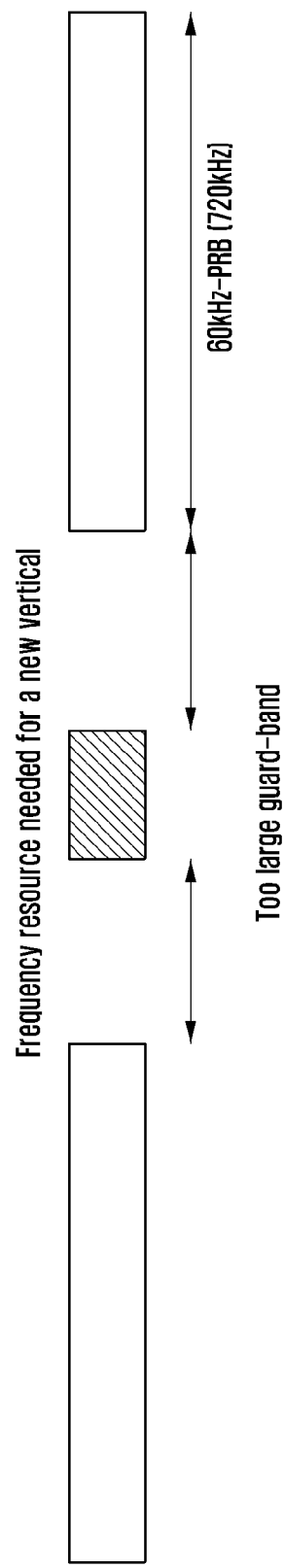
FIG. 12 illustrates an example in which a resource block size is too large to cause a waste of a guard band when a new service with small bandwidth requirement is introduced under a hierarchical resource block grid.

The size of the in-band guard-band may vary depending on the size of the allocated bandwidth of each subcarrier spacing signal, the capability of pulse shaping (out-of-band radiation) of the base station/terminal, the difference in the strength of the received signal, or the like, and therefore, a mechanism for adaptively adjusting the size of the guard band may be needed. Also, when a hierarchical resource grid is set as illustrated in FIG. 10, in the case of a system having a large subcarrier spacing, the size of the resource block also increases so that when the resources are vacant in units of the resource block, the guard band becomes too large as illustrated in FIG. 12, thereby reducing the frequency efficiency. FIG. 12 illustrates the case where 12 subcarriers of 60 kHz subcarrier spacings are gathered to form one PRB. If a new vertical service is required, which is a sufficient service only by the bandwidth smaller than the PRB, the inefficiency of the resource operation greatly occurs due to the guard band in the hierarchical structure as illustrated in FIG. 12.

In the various embodiments of the present disclosure, as a method for solving the same, a method for introducing a special resource block in which additional functions are added to the normal resource block and operating the same is proposed. First, the time-axis length of the special resource block (or the specific resource block) is the same as that of the normal resource block (or the normal resource block), but the frequency-axis length may be set to, for example, two cases as follows.

1) Shorter length than the normal resource block (i.e., the number of subcarriers is less than that of the normal resource blocks)

2) The same length as the normal resource block (i.e., a length defined by the same number of subcarriers)

First, in the case of 1), the system bandwidth is just met with only an integer multiple of the specific subcarrier spacing due to the hierarchical resource grid, and even if an area smaller than one RB size occurs at the end of the band with respect to the subcarrier spacing larger than the specific subcarrier spacing, resources may also be allocated even to the corresponding area. At this time, the corresponding special resource block setting information may be explicitly known by the terminal through the control information of the base station, or implicitly obtained by the terminal even if the terminal acquires only the hierarchical resource grid information depending on the bandwidth size and the subcarrier spacing according to the promised resource mapping rule.

Figure 13:
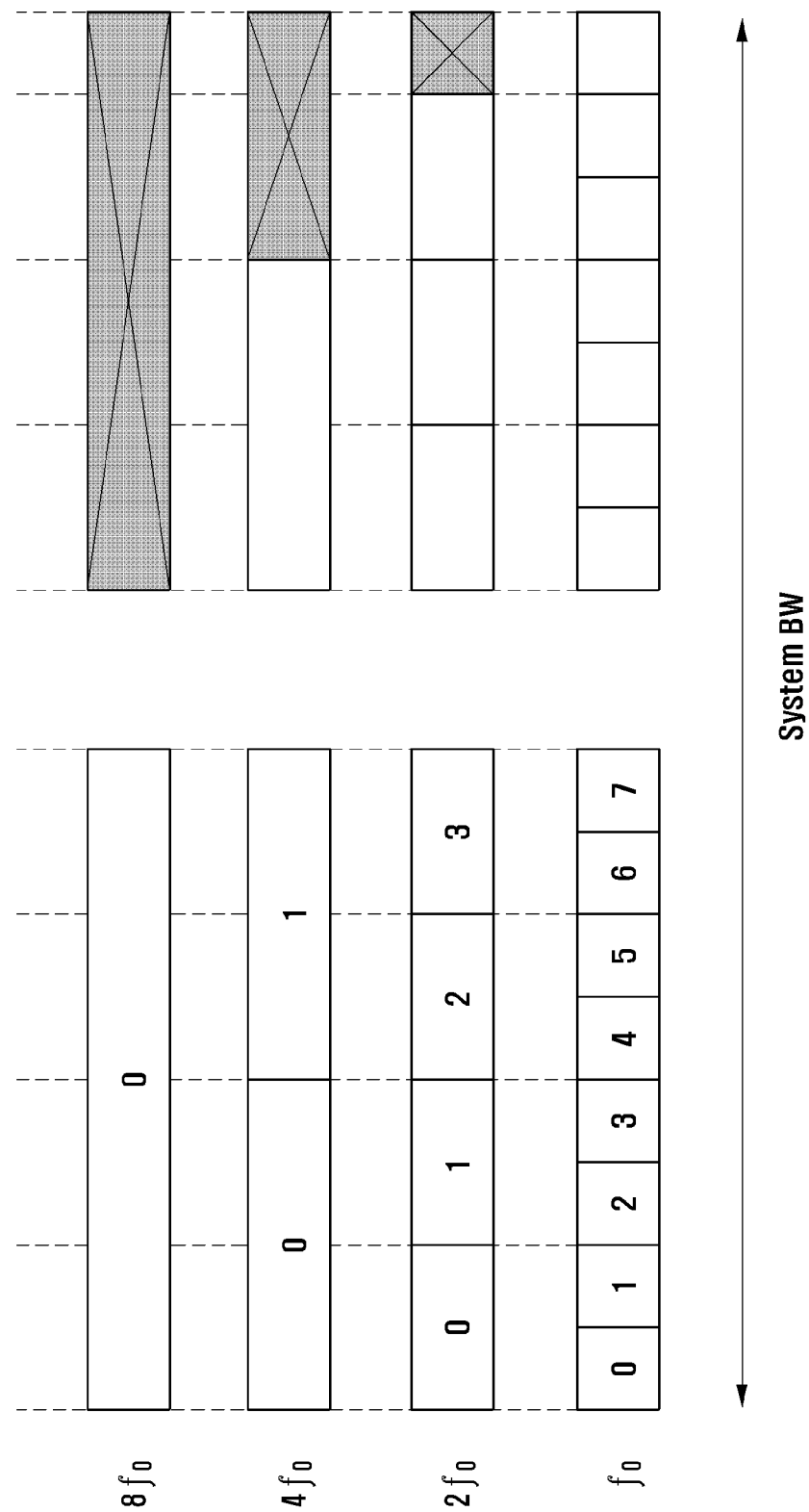
FIG. 13 illustrates that a resource area smaller than a resource block size may be generated because a system bandwidth does not match an integer multiple of the grid at the time of using the hierarchical resource block grid and the corresponding region may be set as a special resource block and used.

For example, as illustrated in FIG. 13, the given system bandwidth is an integral multiple of the normal resource block length at the $f_0$ subcarrier spacing, but is not the integer multiple of the normal resource block (RB) length at the subcarrier spacing where the $f_0$ subcarrier is scaled by 2, 4, or 8 times. That is, since some resource areas of the subcarrier spacings in which the f0 subcarrier is scaled by 2 times, 4 times, and 8 times is smaller than the size of the normal RB, the case in which the normal RB may not be allocated by the integer multiple, which corresponds to an X box area in FIG. 13. Therefore, by allocating the special resource block having a smaller frequency size compared to the normal resource block to the corresponding area, it is possible to make the entire resources of the system bandwidth available for all subcarrier spacings.

Next, in case 2), the nulling subcarriers available as a guard band may exist, and the number and location of the nulling subcarriers may be transmitted through the control information. As an example, if the frequency axis configuration of the normal resource block is consists 12 subcarriers, the setting of the special resource block may be configured as illustrated in Table 1 below.

TABLE 1

| 4-bit integer | Resource allocatable subcarrier bitmap (1: possible, 0: null subcarrier) |
|---|---|
| 0 | 000000000000 |
| 1 | 000000000001 |
| 2 | 000000000011 |
| 3 | 000000000111 |
| 4 | 000000001111 |
| 5 | 000000011111 |
| 6 | 000000111111 |
| 7 | 000001111111 |
| 8 | 000011111111 |
| 9 | 000111111111 |
| 10 | 001111111111 |
| 11 | 011111111111 |
| 12 | 111111111111 |

Table 1 shows an example. In order to reduce the number of control information bits, null subcarriers may be set in a bundle unit corresponding to a division of subcarriers and only a part of the information may be set such as setting only null subcarriers corresponding to an exponent of 2 like 1, 2, 4 and 8. Furthermore, in addition to analyzing the corresponding information through the bitmap information exchange, the base station may directly set the corresponding value so as to be suitable for the specific operation scenario and transmit the contents of the corresponding bitmap to the terminal. In addition, the number of special resource blocks may be preset to be 0, 1, or more, respectively, on both ends of a resource block group to be allocated based on a terminal. In the normal coexistence situations, the number of special resource blocks may be zero (if the adjacent RBs have the same subcarrier spacing) or one (if the adjacent RBs have different subcarrier spacing). At this time, the special resource block setting information corresponding to both ends of the resource block group may be divided into a low/high frequency and transmitted. If the number of special resource block setting information is the same, it is transmitted as one integrated information and the terminal symmetrically sets the information to recognize the special resource block setting. As an example, it may be recognized that when the special resource block setting information is represented by 2 bits in consideration of the overhead of the control channel, if '00', the allocated resource block consists of only the normal resource block, if '01', the last resource block on the high frequency side of the allocated resource block consists of the special resource block having the already promised number of null subcarriers, if '10', the last resource block on the low frequency side among the allocated resource blocks consists of a special resource block having the already promised number of null subcarriers, and if '11', all the last resource blocks on both ends of the low/high frequencies among the allocated resource blocks consist of the special resource block having the already promised number of null subcarriers. (Here, '00', '01', '10', and '11' mean four cases that may be generally represented by two bits. If only one-to-one correspondence relationship is maintained, the correspondence relationship with the above contents may be changed.) If the special resource block is set to be 2 or more, for the continuity of data allocation, the special resource block other than the special resource blocks on both ends may be set as No. 12 in Table 1, and the special resource blocks on both ends may be set to have values from No. 0 to No. 12. In this case, in order to obtain a low peak-to-average power ratio (PAPR) through the waveform shaping in addition to the purpose of setting the guard band, the base station may assist the terminal to further add the waveform shaping to the corresponding area at the cost of resources of the base station. As an example, techniques such as frequency domain spectrum shaping (FDSS) may be incorporated. For example, technologies such as frequency domain spectrum shaping (FDSS) may be incorporated.

Figure 14A:
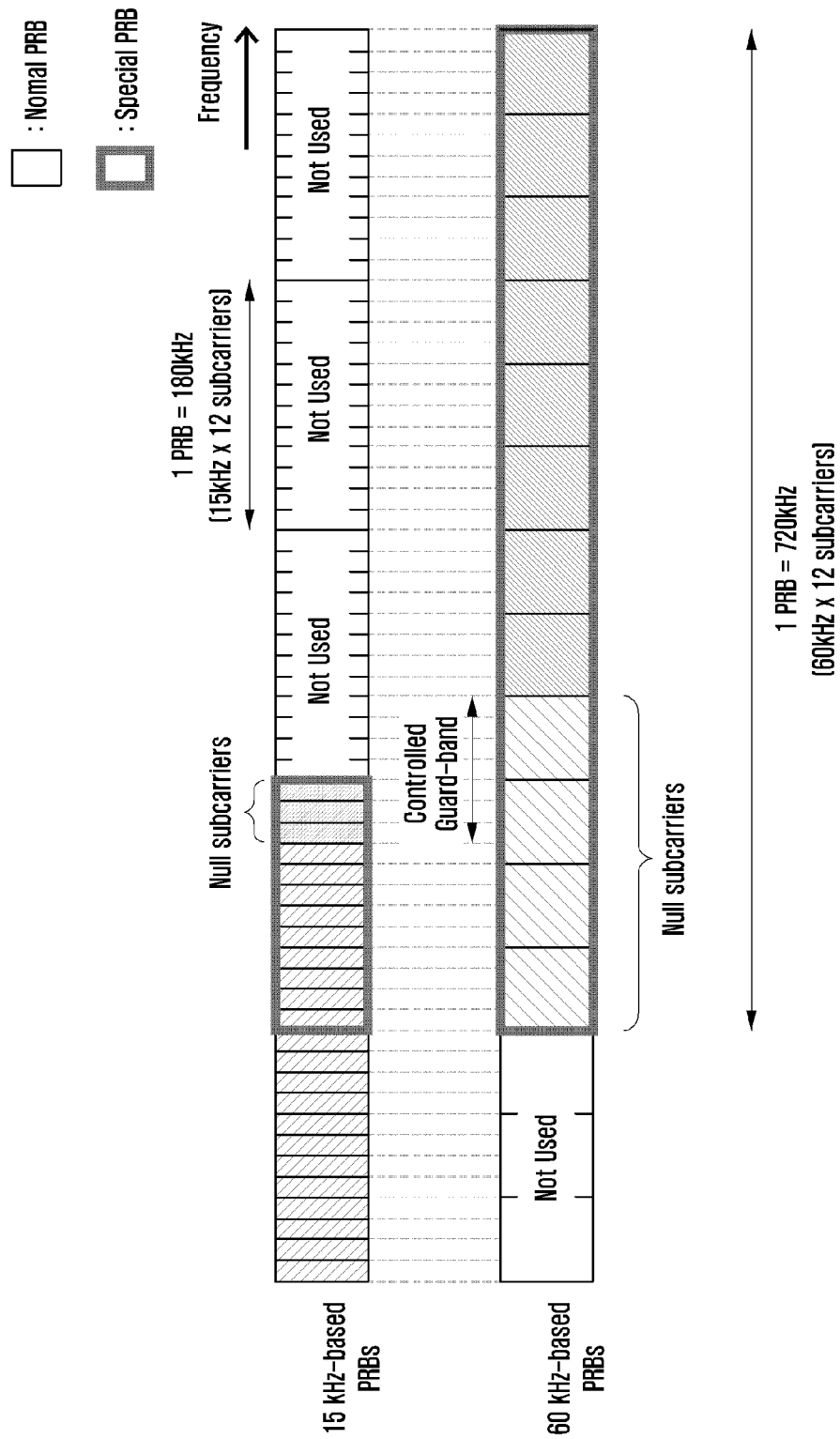
FIG. 14A illustrates an example of adjusting a guard band by allocating a special resource block to each of the two terminals with different subcarrier spacings according to various embodiments of the present disclosure.
Figure 14B:
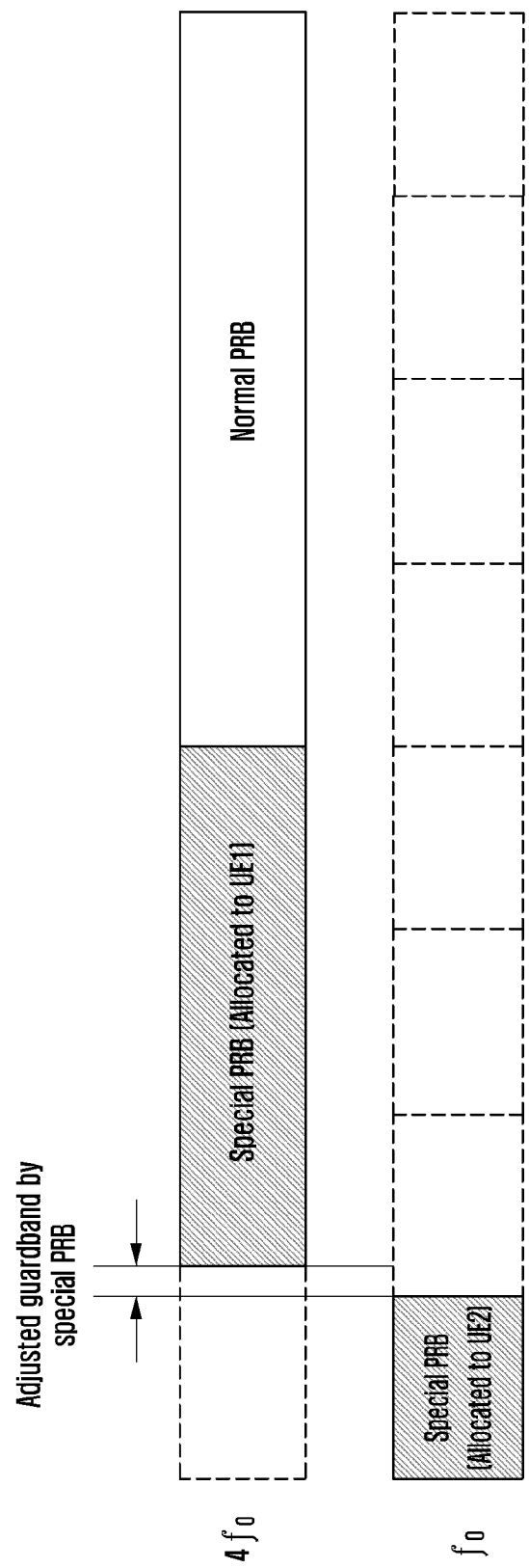
FIG. 14B illustrates an example of adjusting a guard band by allocating a special resource block only a terminal having a relatively larger subcarrier spacing of two terminals having different subcarrier spacings according to various embodiments of the present disclosure.
Figure 14C:
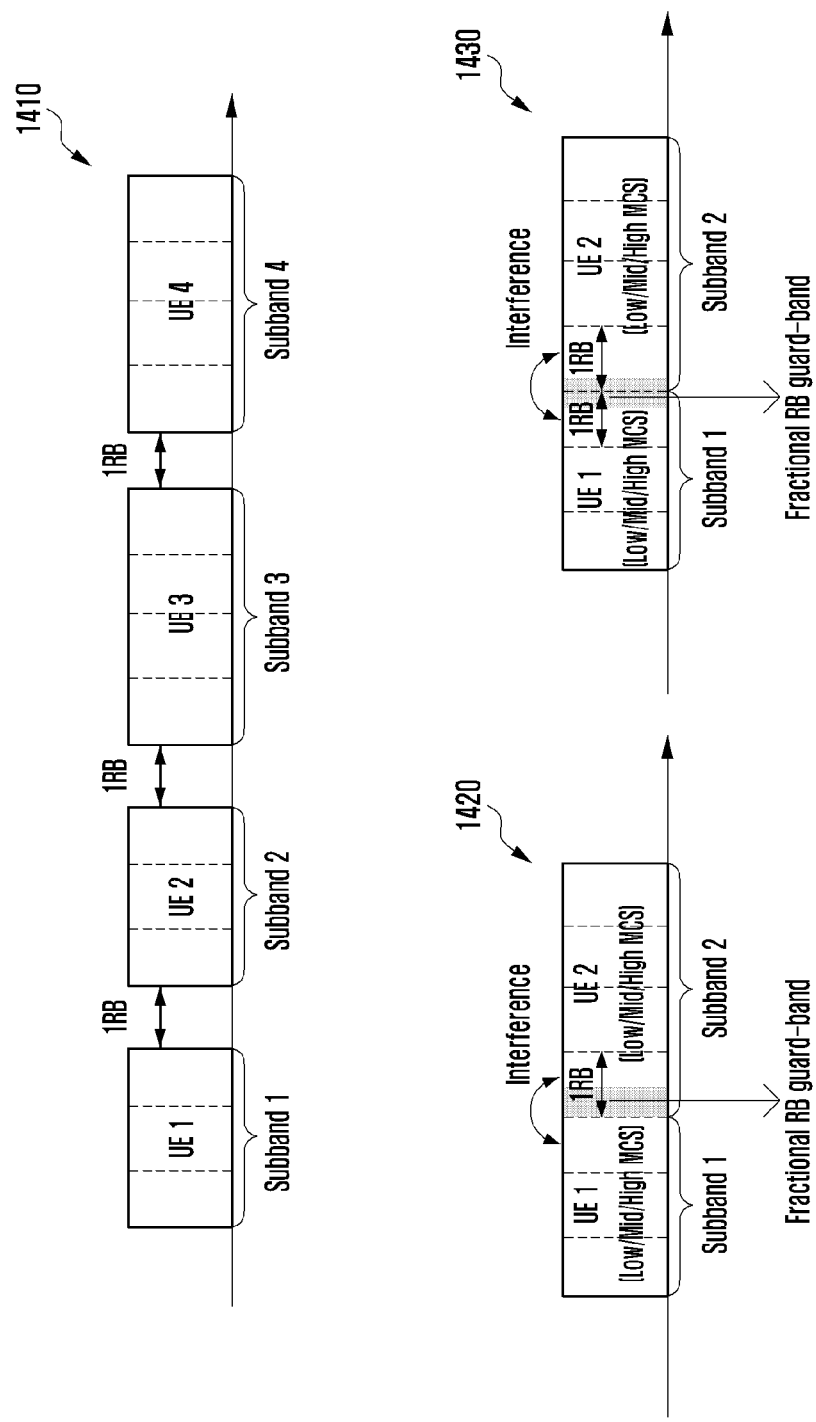
FIG. 14C illustrates an example of adjusting a guard band by adaptively allocating a special resource block depending on various operation scenarios and performance requirements according to various embodiments of the present disclosure.

FIGS. 14A to 14C illustrate an example in which the base station allocates frequency resources to two different UEs adjacent to each other by utilizing a special resource block according to various embodiments of the present disclosure.

As one example, referring to FIG. 14A, if user 1 is allocated two resource blocks of 15 kHz subcarrier spacing, one of them is a normal resource block and the other is allocated a special resource block having three null subcarriers. If user 2 is allocated one resource block of 60 kHz subcarrier spacing, the corresponding resource block is a special resource block in which four null subcarriers are set in consideration of interference with the neighboring user 1. As in this example, if the special resource block is used, it may overcome the disadvantage that the resource allocation with a relatively larger subcarrier spacing may not be made when a resource allocation with a small subcarrier spacing is made small as one or several subcarriers in the hierarchical resource grid structure as illustrated in FIG. 10.

As another example, a normal resource block may be allocated to a terminal using a small subcarrier spacing as illustrated in FIG. 14B, and a special resource block may be allocated only to a terminal using a relatively larger subcarrier spacing, thereby minimizing the guard band.

As another example, the special resource blocks may be utilized in consideration of various operational scenarios and performance requirements as illustrated in FIG. 14C. In other words, in some cases, one resource block may be set as the guide band between subbands applied to each terminal as in the case of 1410, or a special resource block may be set only in a subband of a terminal using a relatively larger subcarrier spacing among two adjacent subbands, or the special resource block may be set in two adjacent subbands as in the case of 1430.

Figure 15:
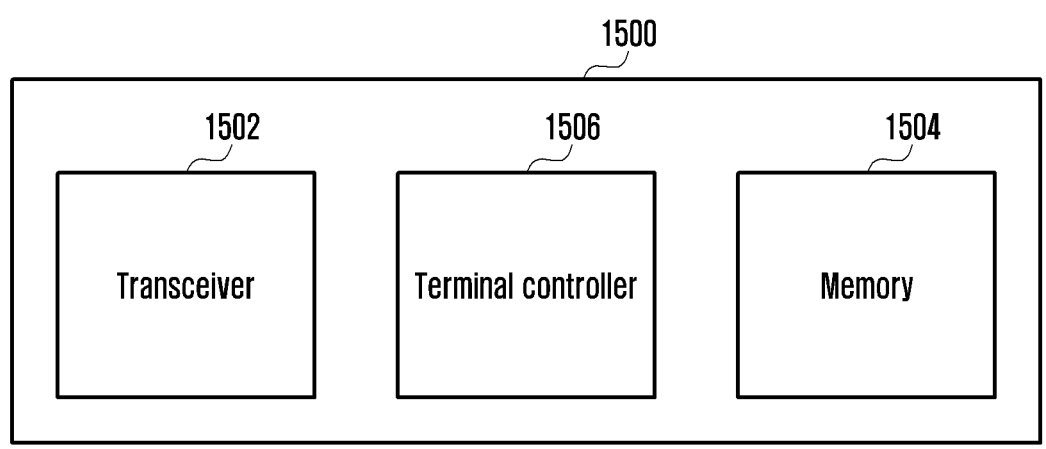
FIG. 15 illustrates a structure of the terminal according to the embodiment of the present disclosure.

FIG. 15 illustrates a configuration of a terminal according to an embodiment of the present disclosure.

Referring to FIG. 15, a terminal 1500 includes a transceiver 1502, a memory 1504, and a controller 1506.

The transceiver 1502 may transmit and receive a signal to and from the base station.

The memory 1504 may store at least one of the information associated with the terminal 1500 and the information transmitted and received through the transceiver 1502.

The controller 1506 may control the operation of the terminal 1500 and may control the overall terminal configuration to perform the operations associated with the terminal described in the various embodiments of the present disclosure. The controller 1506 may include at least one processor.

Figure 16:
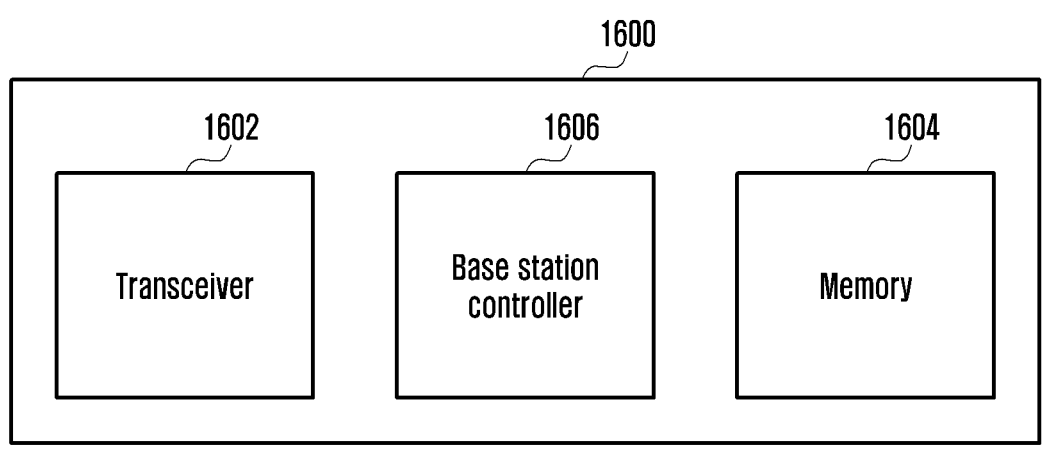
FIG. 16 illustrates a structure of a base station according to the embodiment of the present disclosure.

FIG. 16 illustrates a configuration of a base station according to an embodiment of the present disclosure.

Referring to FIG. 16, a base station 1600 includes a transceiver 1602, a memory 1604, and a controller 1606.

The transceiver 1602 may transmit and receive signals to and from the terminal and other network entities.

The memory 1604 may store at least one of the information associated with the base station 1600 and the information transmitted and received through the transceiver 1602.

The controller 1606 may control the operation of the base station 1600 and may control the overall base station configuration to perform the operations associated with the base station described in the various embodiments of the present disclosure. The controller 1606 may include at least one processor.

Figure 17:
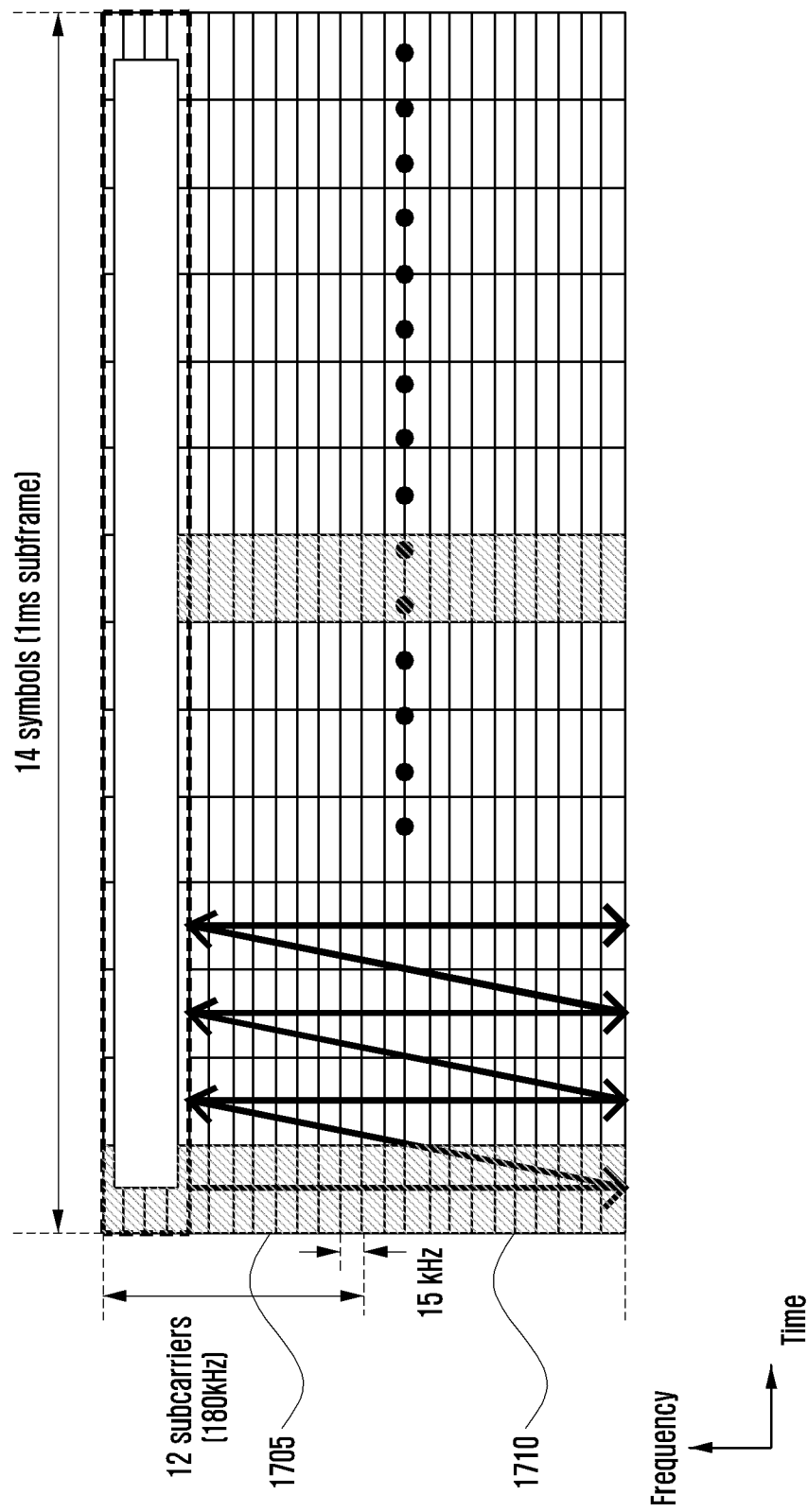
FIG. 17 illustrates an example in which a base station and a terminal promise directions in which resources are read and written when a special resource block according to various embodiments of the present disclosure is set.

FIG. 17 illustrates an example in which the base station 1600 and the terminal 1500 promise directions in which resources are read and written when a special resource block according to various embodiments of the present disclosure is set.

FIG. 17 illustrates an example in which if the base station allocates one special resource block 1705 and one consecutive normal resource block 1710 to a terminal, an order in transmitted data are written and an order in which received data are read after the terminal receives control information are promised to each other in consideration of null subcarriers included in a special resource block. As illustrated in FIG. 17, data may be first read or written on the frequency axis in order to reduce the transmission/reception processing delay. However, due to a certain reason, a promise may be made in different directions (e.g., a method for first filling a time axis which is a vertical axis and sequentially filling a frequency axis). If the directivity in which resources in the resource block are read and written is various, the base station may need to inform the corresponding order to the terminal through the control information.

On the other hand, upon transmitting/receiving data including the special resource block, the detailed example of the resource mapping and the transmitting/receiving operations of the base station and the terminal will be described later. In the following description, the operations of the base station and the terminal performing the signal transmission and reception using the special resource block according to various embodiments of the present disclosure will be described.

Figure 18A:
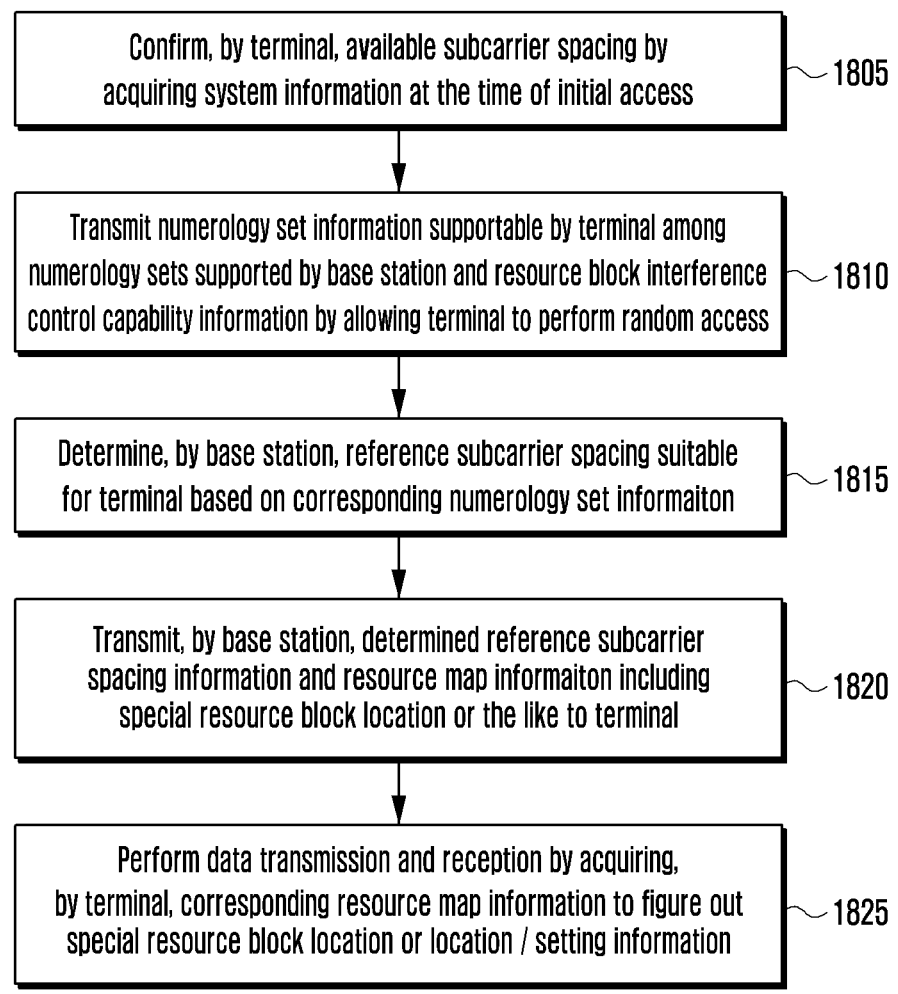
FIG. 18A illustrates a procedure for allowing a terminal according to various embodiments of the present disclosure to figure out a location and setting information of a special resource block and operating the terminal accordingly.

FIG. 18A illustrates a procedure for allowing a terminal (e.g., 1500) according to various embodiments of the present disclosure to figure out a location and setting information of a special type resource block and operating the terminal accordingly.

In step 1805, the terminal uses system information obtained by acquiring at least one of a master information block (MIB) or a system information block (SIB) at the time of an initial access to confirm a type of subcarrier spacing currently used by the base station and time/frequency resource map information (or grid information) in which the corresponding subcarrier spacing is located. The corresponding map information may include the location and setting information in which the special resource block may exist.

In step 1810, the terminal may perform a random access and then transmit the UE capability information to the base station. For example, a terminal may transmit information on a numerology set that the terminal supports among numerology sets that can be supported by the base station, and may transmit its own pulse shaping capability information or resource block interference amount control capability information. The resource block interference amount control capability information may mean control capability information on interference that is radiated upon transmission to a frequency domain outside the resource block or accepted upon reception.

In step 1815, the base station can determine a reference subcarrier spacing suitable for the terminal based on the received terminal capability information. For example, the base station may determine a reference subcarrier spacing suitable for the terminal based on information on a numerology set supportable by the terminal. In addition, the base station can determine the special resource block related information associated with the numerology set applied to the terminal, for example, the location and setting information (e.g., null subcarrier setting information) of the special resource block, or the like based on the received capability information of the terminal. For example, the base station may refer to the received UE capability information to a null subcarrier to set the guard band size in setting the null subcarrier for the special resource block.

In step 1820, the base station may transmit the reference subcarrier spacing information determined as first control information to the terminal. In addition, the base station may transmit resource map information including the special resource block related information as second control information to the terminal. The terminal may receive the resource map information using the subcarrier spacing allocated by the base station.

For example, the first control information may be transmitted by RRC signaling. The second information may be transmitted by the RRC signaling at the time of semi-statically operating resources or may be transmitted by being included in downlink control information (DCI) at the time of dynamically operating resources in a scheduling unit.

In step 1825, the terminal may confirm a subcarrier spacing (numerology set) to be applied to the terminal based on the received reference subcarrier spacing information, and figure out the special resource block related information (e.g., location and/or setting information of the special resource block) based on the received resource map information to perform data transmission/reception.

The terminal rules out the corresponding area by looking at the number of nulling subcarriers determined by the base station to demodulate downlink data or transmit uplink. In addition, the terminal may perform the reception or transmission by applying the waveform shaping informed by the base station or applying the waveform shaping implemented in the terminal based on the UE capability that the base station understands by previous negotiation and the interference tolerance level information informed through the control channel.

Figure 18B:
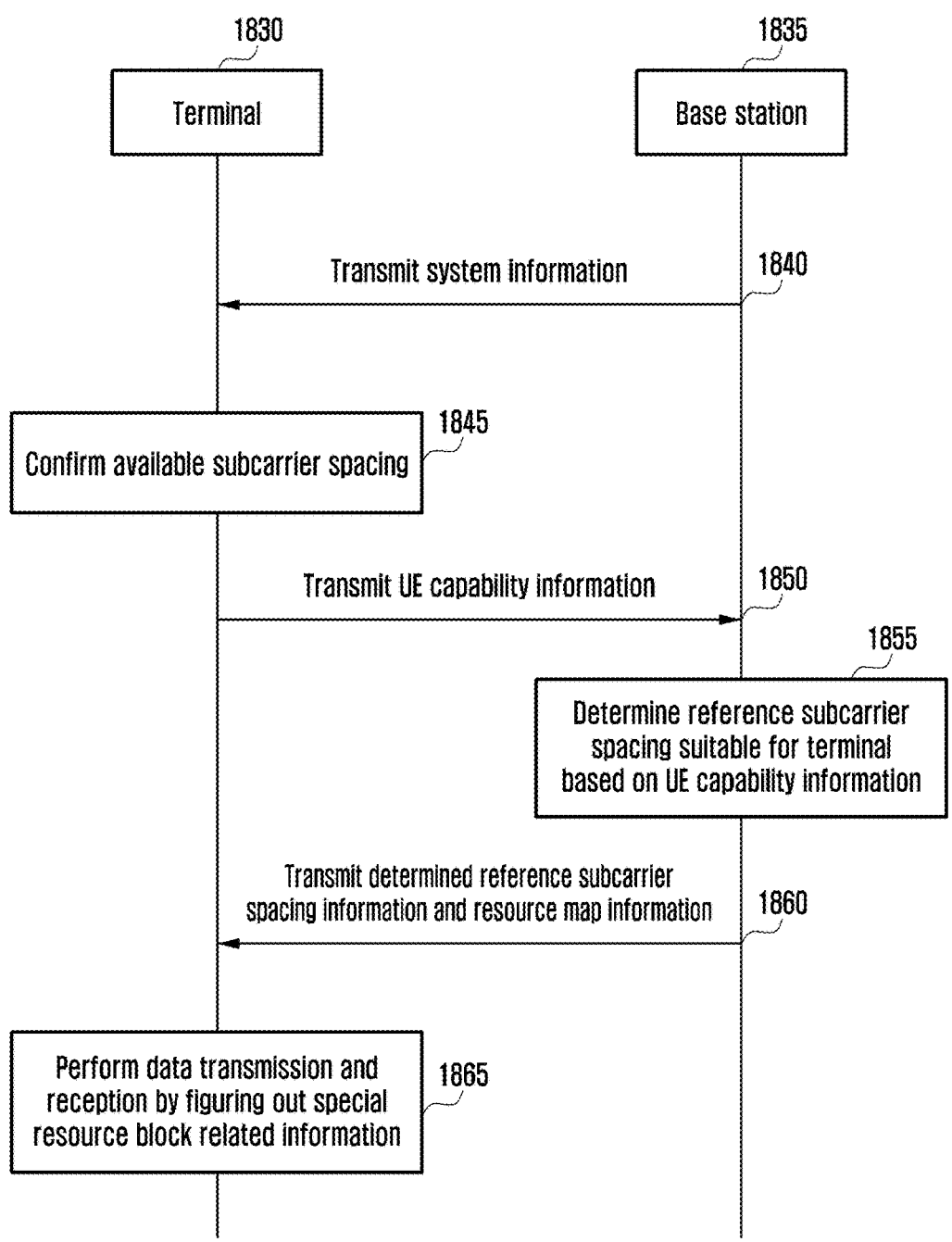
FIG. 18B illustrates a procedure for setting a terminal according to various embodiments of the present disclosure to perform data transmission/reception using a special resource block.

FIG. 18B illustrates an operation between the terminal (e.g., 1500) and the base station (e.g., 1600) illustrated in FIG. 18A.

The base station 1835 may transmit the system information to the terminal 1830 in step 1840. The system information may include information on the type of subcarriers currently used by the base station and the time/frequency resource map information on which the corresponding subcarrier spacing is located.

In step 1845, the terminal 1830 may confirm its own available subcarrier allocation. The terminal 1830 may confirm information on a numerology set that the terminal 1830 can support among the numerology sets supported by the base station. In step 1850, the terminal 1830 may transmit the UE capability information including the information on the numerology set that the terminal can support to the base station.

In step 1855, the base station may determine the reference subcarrier spacing suitable for the terminal based on the received terminal capability information. In addition, the base station 1835 may determine the special resource block related information associated with the numerology set applied to the terminal based on the UE capability information. The special resource block related information may include the location and setting information of the special resource block.

In step 1860, the base station 1835 may transmit the determined reference subcarrier spacing information to the terminal as control information, and may transmit resource map information including the special resource block related information to the terminal. For example, the determined reference subcarrier spacing information may be transmitted by RRC signaling. The resource map information may be transmitted by the RRC signaling at the time of semi-statically operating resources or may be transmitted by being included in downlink control information (DCI) at the time of dynamically operating resources in a scheduling unit. Various examples of the resource map information transmission through the DCI will be described below.

Figure 18C:
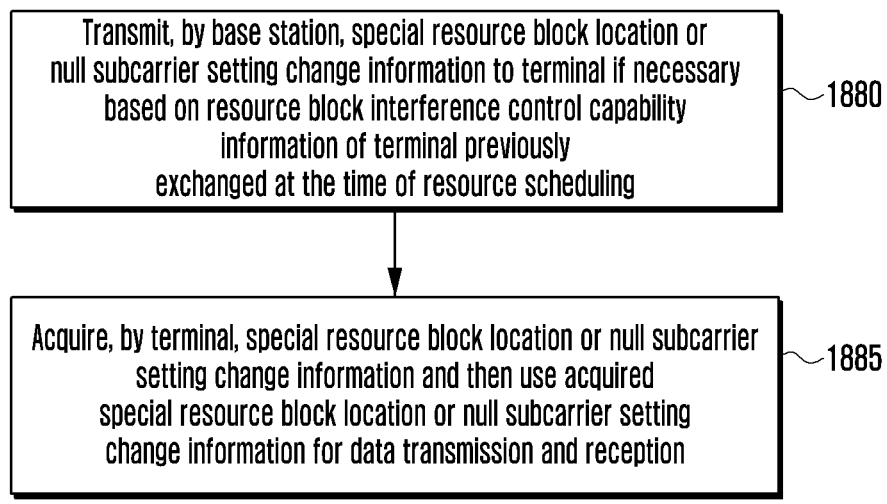
FIG. 18C illustrates a procedure for allowing a base station according to various embodiments of the present disclosure to transmit the time when the base station attempts to change a location and setting information of the special resource block according to situations to the terminal and operate the terminal.

In step 1865, the terminal 1830 may confirm the subcarrier set (numerology set) to be applied to the terminal based on the received control information and figure out the special resource block related information, thereby performing the data transmission/reception. FIG. 18C is a diagram illustrating that the base station (e.g., 1600) according to various embodiments of the present disclosure may change the location and setting information of the special resource block according to circumstances.

In step 1880, the base station may transmit the change information of the special resource block related information, for example, the change information of the location and/or setting information (e.g., null subcarrier setting information) of the special resource block if necessary, based on the resource block interference control capability information of the exchanged terminal upon the resource scheduling.

In step 1885, the terminal may utilize the received change information of the special resource block related information for subsequent data transmission and reception.

Figure 19:
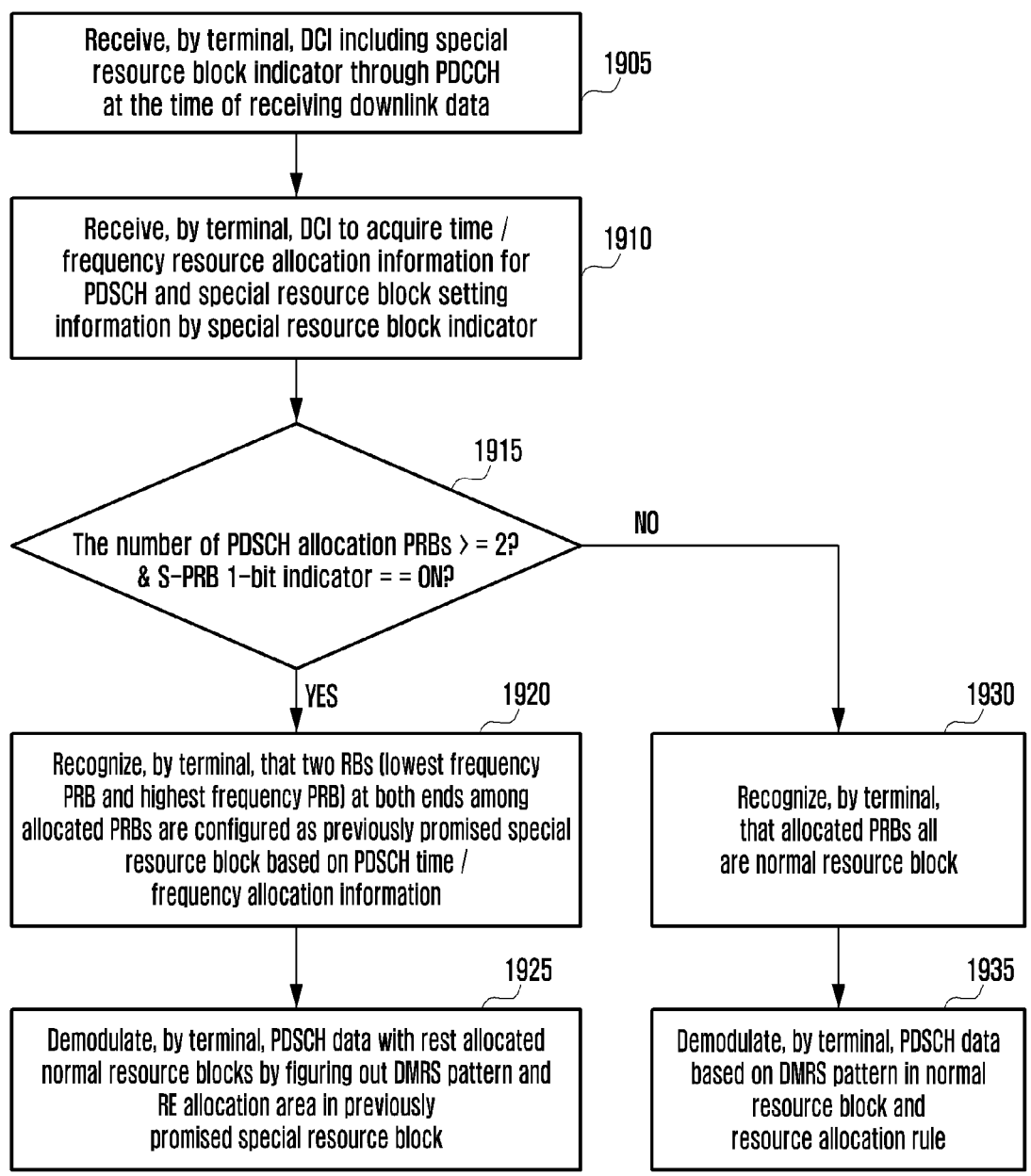
FIG. 19 illustrates a procedure of allowing a terminal according to various embodiments of the present disclosure to figure out whether to set a special resource block through DCI to thereby receive data.

FIG. 19 illustrates a procedure of allowing a terminal (e.g., 1500) according to various embodiments of the present disclosure to figure out whether to set a special type resource block through DCI to thereby receive data.

In step 1905, the terminal may receive DCI including a special resource block indicator (S-PRB 1-bit indicator) through a physical downlink control channel (PDCCH) upon receiving downlink data.

In step 1910, the terminal may receive the DCI to acquire time/frequency resource allocation information for a physical downlink control channel (PDSCH) and may acquire the special resource block setting information based on the special resource block indicator.

In step 1915, the terminal may determine whether the number of resource blocks (PRBs) to which the PDSCH is allocated is greater than or equal to 2, and determine whether the special resource block indicator (S-PRB 1-bit Indicator) indicates a predetermined value.

If the number of resource blocks (PRBs) to which the PDSCH is allocated is equal to or greater than 2 and the special resource block indicator (S-PRB 1-bit Indicator) indicates a predetermined value, in step 1920, the terminal may recognize that the already promised RB (e.g., resource blocks of a lowest frequency and a highest frequency) among the resource blocks allocated based on the time/frequency resource allocation information for the PDSCH is configured as the special resource block. In step 1925, the terminal may figure out a de-modulation reference signal (DMRS) pattern and a resource element (RE) allocation area in the already promised special resource block and demodulate the PDSCH data together with the normal resource block.

On the other hand, if the number of resource blocks (PRBs) to which the PDSCH is allocated is not 2 or more or the special resource block indicator (S-PRB 1-bit indicator) does not indicate a predetermined value, in step 1930, the terminal may recognize that all the allocated resource blocks are a normal resource block. In step 1935, the terminal may demodulate the PDSCH data based on the DMRS pattern and the resource allocation rule in the normal resource block.

Figure 20:
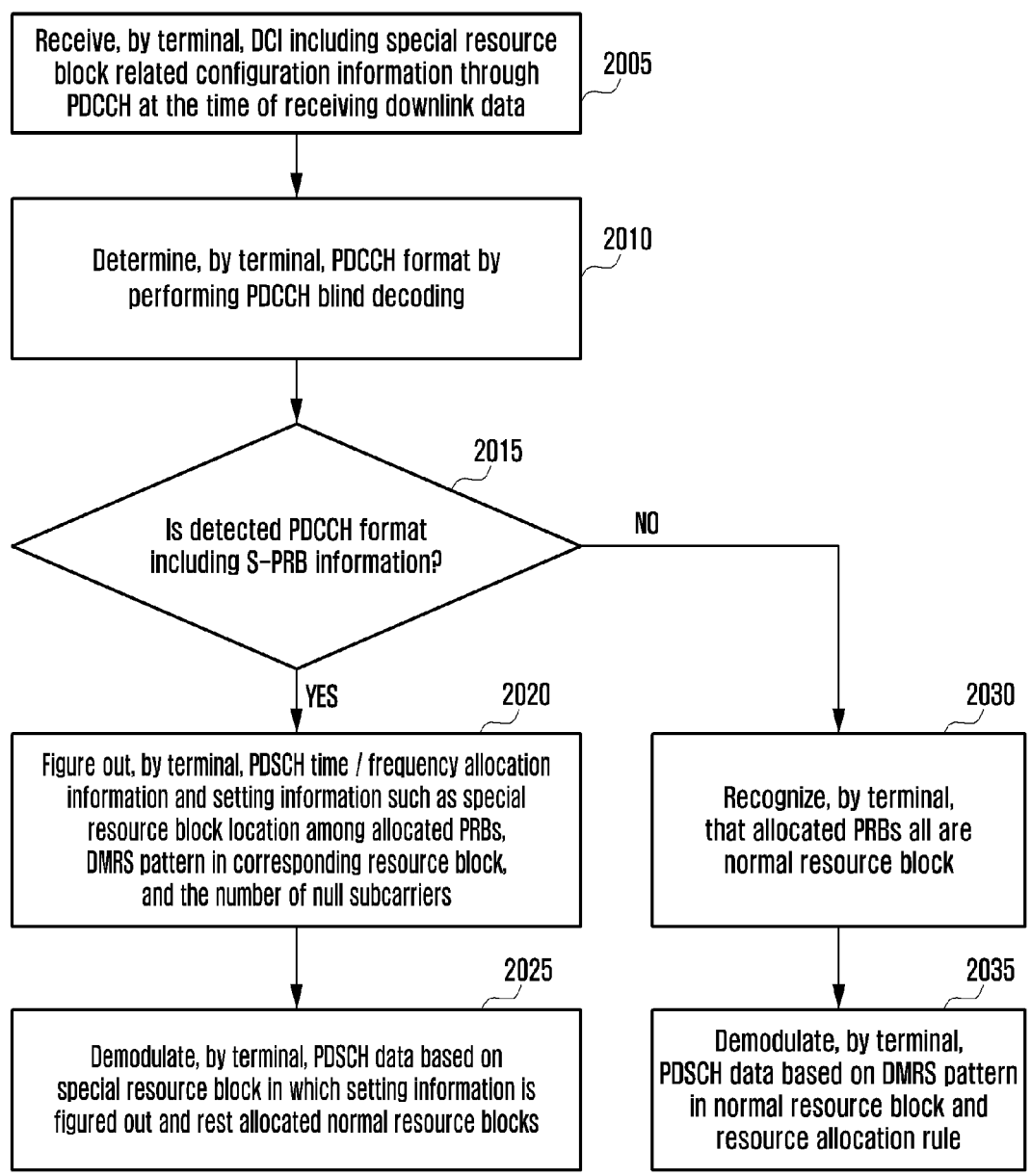
FIG. 20 illustrates a procedure of allowing a terminal according to various embodiments of the present disclosure to figure out a location and setting information of a special resource block through DCI to thereby receive data.

FIG. 20 illustrates a procedure of allowing a terminal (e.g., 1500) according to various embodiments of the present disclosure to figure out a location and setting information of a special type resource block through DCI to thereby receive data.

In step 2005, the terminal may receive the DCI including the special resource block related information through the physical downlink control channel (PDCCH) upon receiving downlink data.

In step 2010, the terminal may determine a PDCCH format by performing PDCCH blind decoding.

In step 2015, the terminal may determine whether the detected PDCCH is the format including the special resource block related information. That is, the terminal may determine whether or not the control information received via the PDCCH includes the special resource block related information.

If the detected PDCCH is the format including the special resource block related information, in step 2020, the terminal may figure out the time/frequency resource allocation information and the special resource block related information for the PDSCH from the control information included in the PDCCH. The special resource block related information may include setting information including a special resource block location, a DMRS pattern in a special resource block, a number of null subcarriers (or effective subcarriers), or the like. In step 2025, the terminal may demodulate the PDSCH data based on the special resource block in which the setting information is figured out and the normal resource block.

On the other hand, if the detected PDCCH is not the format including the special resource block related information, in step 2030, the terminal may recognize that all the allocated resource blocks are the normal resource block. In step 2035, the terminal may demodulate the PDSCH data based on the DMRS pattern and the resource allocation rule in the normal resource block.

Figure 21:
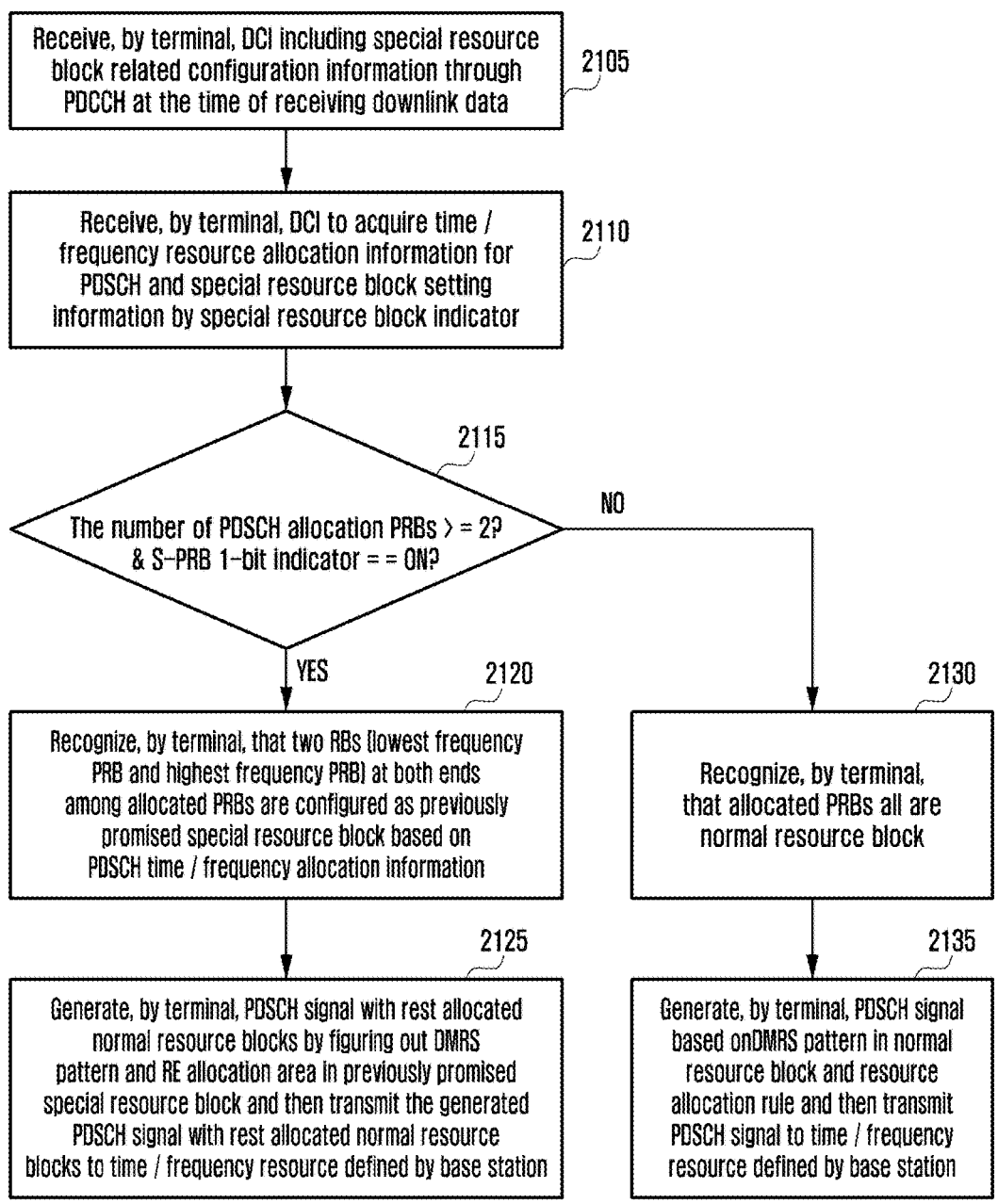
FIG. 21 illustrates a procedure of allowing a terminal according to various embodiments of the present disclosure to figure out whether to set a special resource block through DCI to thereby transmit data.

FIG. 21 illustrates a procedure of allowing a terminal (e.g., 1500) according to various embodiments of the present disclosure to figure out whether to set a special type resource block through DCI to thereby receive data.

In step 2105, the terminal may receive DCI including a special resource block indicator (S-PRB 1-bit indicator) through a physical downlink control channel (PDCCH) upon transmitting uplink data.

In step 2110, the terminal may receive the DCI to acquire time/frequency resource allocation information for a physical uplink control channel (PUSCH) and may acquire the special resource block setting information based on the special resource block indicator.

In step 2115, the terminal may determine whether the number of resource blocks (PRBs) to which the PUSCH is allocated is greater than or equal to 2, and determine whether the special resource block indicator (S-PRB 1-bit Indicator) indicates a predetermined value.

If the number of resource blocks (PRBs) to which the PUSCH is allocated is equal to or greater than 2 and the special resource block indicator (S-PRB 1-bit Indicator) indicates a predetermined value, in step 2120, the terminal may recognize that the already promised RB (e.g., resource blocks of a lowest frequency and a highest frequency) among the resource blocks allocated based on the time/frequency resource allocation information for the PUSCH is configured as the special resource block. In step 2125, the terminal may figure out the de-modulation reference signal (DMRS) pattern and the resource element (RE) allocation area in the already promised special resource block and generate the PUSCH data together with the normal resource block and then transmit the generated PUSCH data in the determined time/frequency resource.

Figure 22:
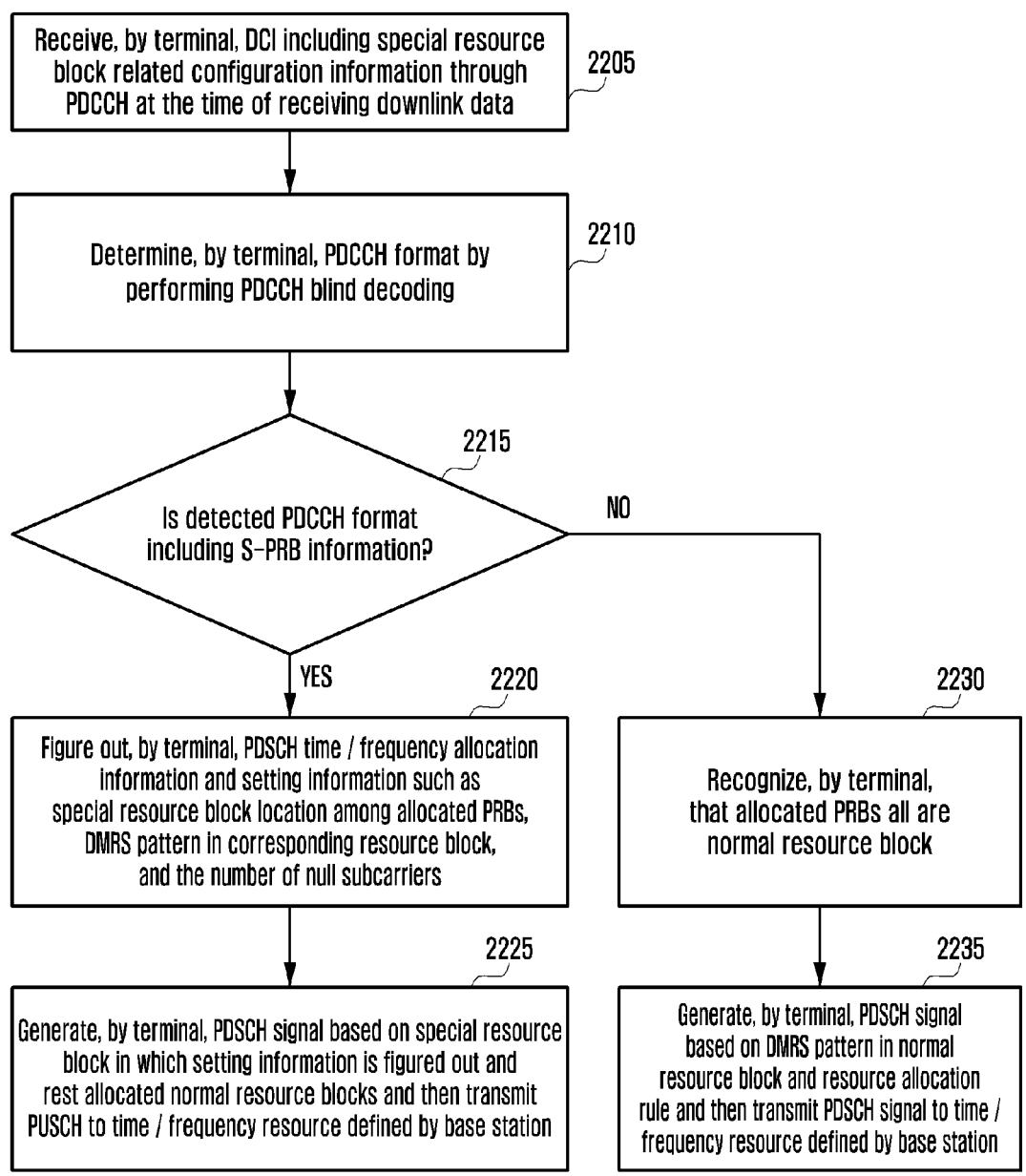
FIG. 22 illustrates a procedure of allowing a terminal according to various embodiments of the present disclosure to figure out a location and setting information a special resource block through DCI to thereby transmit data.

On the other hand, if the number of resource blocks (PRBs) to which the PUSCH is allocated is not 2 or more or the special resource block indicator (S-PRB 1-bit indicator) does not indicate a predetermined value, in step 2130, the terminal may recognize that all the allocated resource blocks are a normal resource block. In step 2135, the terminal generates the PUSCH data based on the DMRS pattern and the resource allocation rule of the normal resource block and then transmits the PUSCH data in a predetermined time/frequency resource. FIG. 22 is a flowchart illustrating a procedure of allowing a terminal (e.g. 1500) according to various embodiments of the present disclosure to figure out a location and setting information of a special type resource block through DCI to thereby transmit data.

In step 2205, the terminal may receive the DCI including the special resource block related information through the physical downlink control channel (PDCCH) upon the request of the uplink data.

In step 2210, the terminal may determine the PDCCH format by performing the PDCCH blind decoding.

In step 2215, the terminal may determine whether the detected PDCCH is the format including the special resource block related information. That is, the terminal may determine whether or not the control information received via the PDCCH includes the special resource block related information.

If the detected PDCCH is the format including the special resource block related information, in step 2220, the terminal may figure out the time/frequency resource allocation information and the special resource block related information for the PUSCH from the control information included in the PDCCH. The special resource block related information may include setting information including a special resource block location, a DMRS pattern in a special resource block, a number of null subcarriers (or effective subcarriers), or the like. In step 2225, the terminal generates PUSCH data based on the special resource block in which the setting information is figured out and the normal resource block and then transmits the PUSCH data in a predetermined time/frequency resource.

On the other hand, if the detected PDCCH is not the format including the special resource block related information, in step 2230, the terminal may recognize that all the allocated resource blocks are the normal resource block. In step 2235, the terminal generates the PUSCH data based on the DMRS pattern and the resource allocation rule of the normal resource block and then transmits the PUSCH data in a predetermined time/frequency resource.

Hereinafter, if the special resource block according to various embodiments of the present disclosure is set to variably operate the guard band, a method for setting and operating a guard band according to a given reference signal (RS) pattern in the resource block will be described.

The RSs are generally arranged regularly within the normal resource block, and are dispersed in time/frequency resources in order to improve interpolation/extrapolation accuracy upon the channel estimation. Therefore, when the special resource block is set, the channel estimation performance of the terminal may deteriorate due to the nulling if the RS is placed at a subcarrier location for nulling in the resource block. Therefore, it may be necessary to set the special resource block according to the RS pattern.

Figure 23:
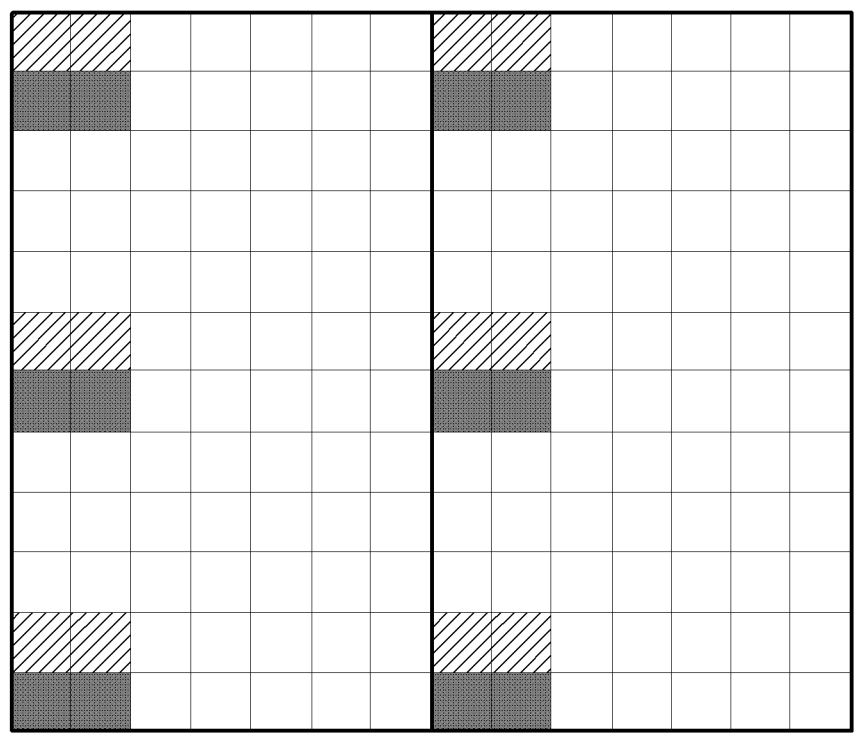
FIG. 23 illustrates an example of a Front-loaded DMRS pattern.

The special resource block information bit is inserted into the DCI for the terminal using the DMRS pattern as illustrated in FIG. 23, such that the terminal may recognize the information.

Case 1-1) Setting Guard Band Through 1-Bit Indication of DCI

Figure 24:
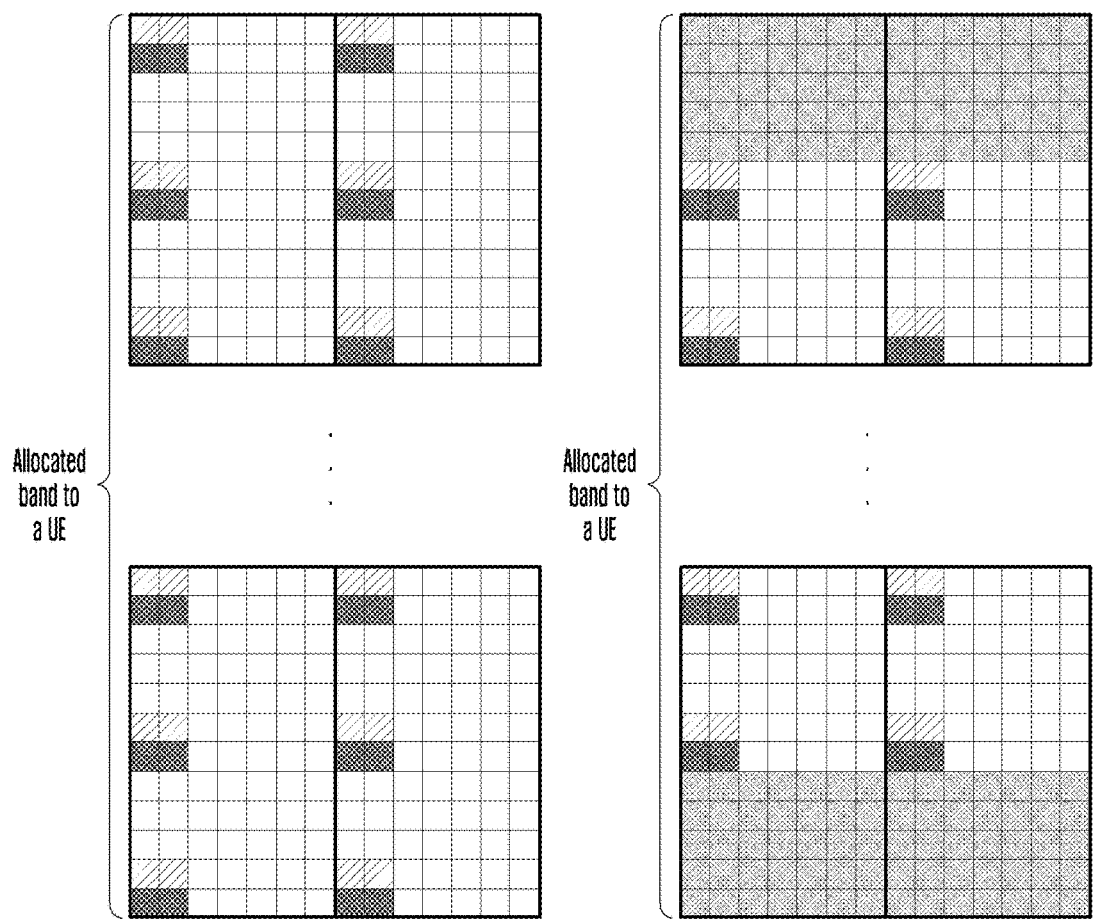
FIG. 24 illustrates a resource block configuration form depending on a DCI 1-bit indication when the DMRS pattern of FIG. 23 according to various embodiments of the present disclosure is used.

The two cases illustrated in FIG. 24 are distinguished by a 1-bit indication All allocated resource blocks consist of only normal resource block The resource blocks on both ends of the low/high frequency among the allocated resource blocks consist of the special resource block nulling the subcarrier of the edge region after the DMRS subcarrier located at the center in the resource block to prevent the performance deterioration due to the extrapolation upon the DMRS based channel estimation (i.e., fixed to the already promised number of null subcarriers according to the RS pattern)

Case 1-2) Setting Guard Band Through 2-Bit Indication of DCI

Figure 25:
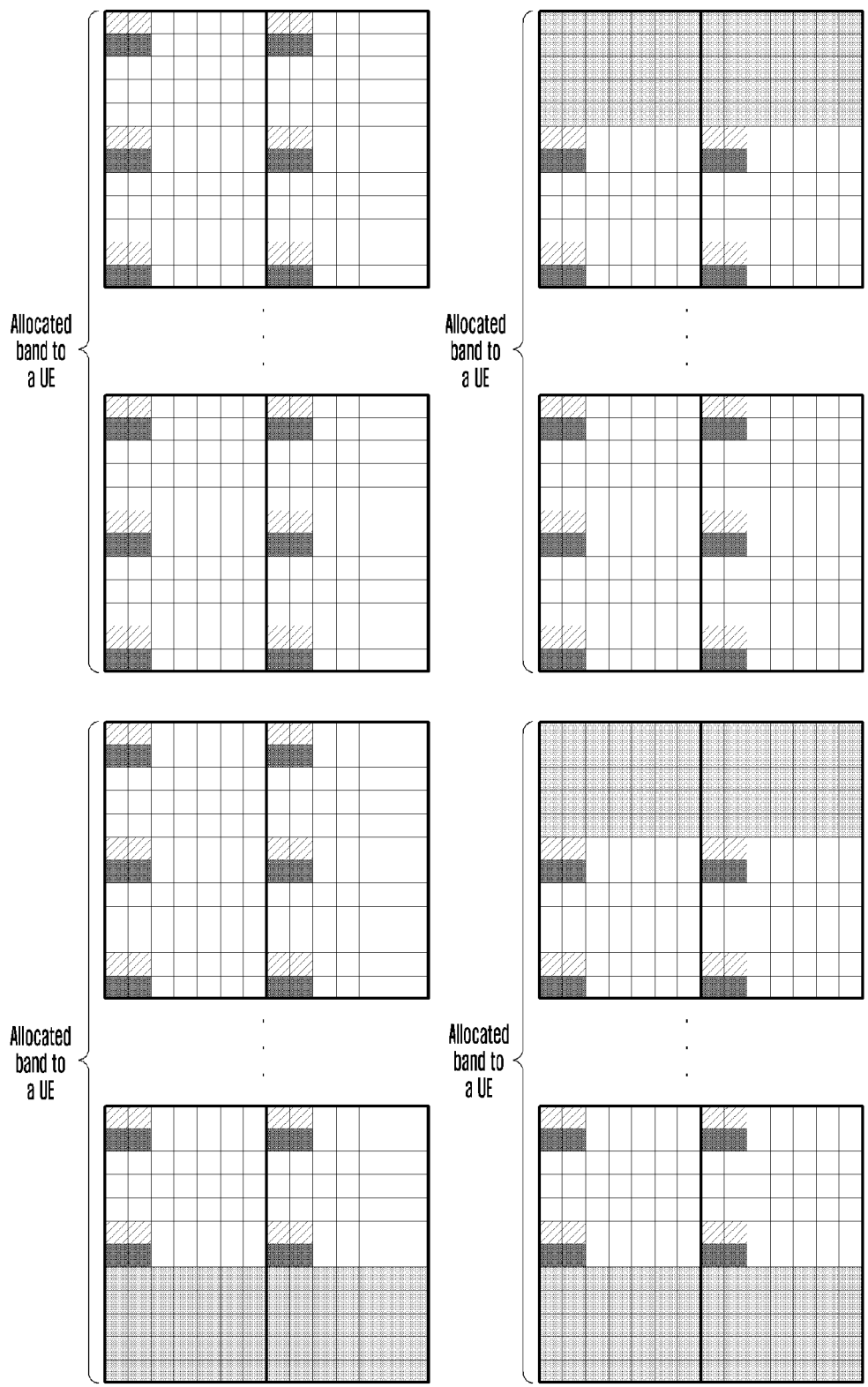
FIG. 25 illustrates a resource block configuration form depending on a DCI 2-bit indication when the DMRS pattern of FIG. 23 according to various embodiments of the present disclosure is used.
Figure 27:
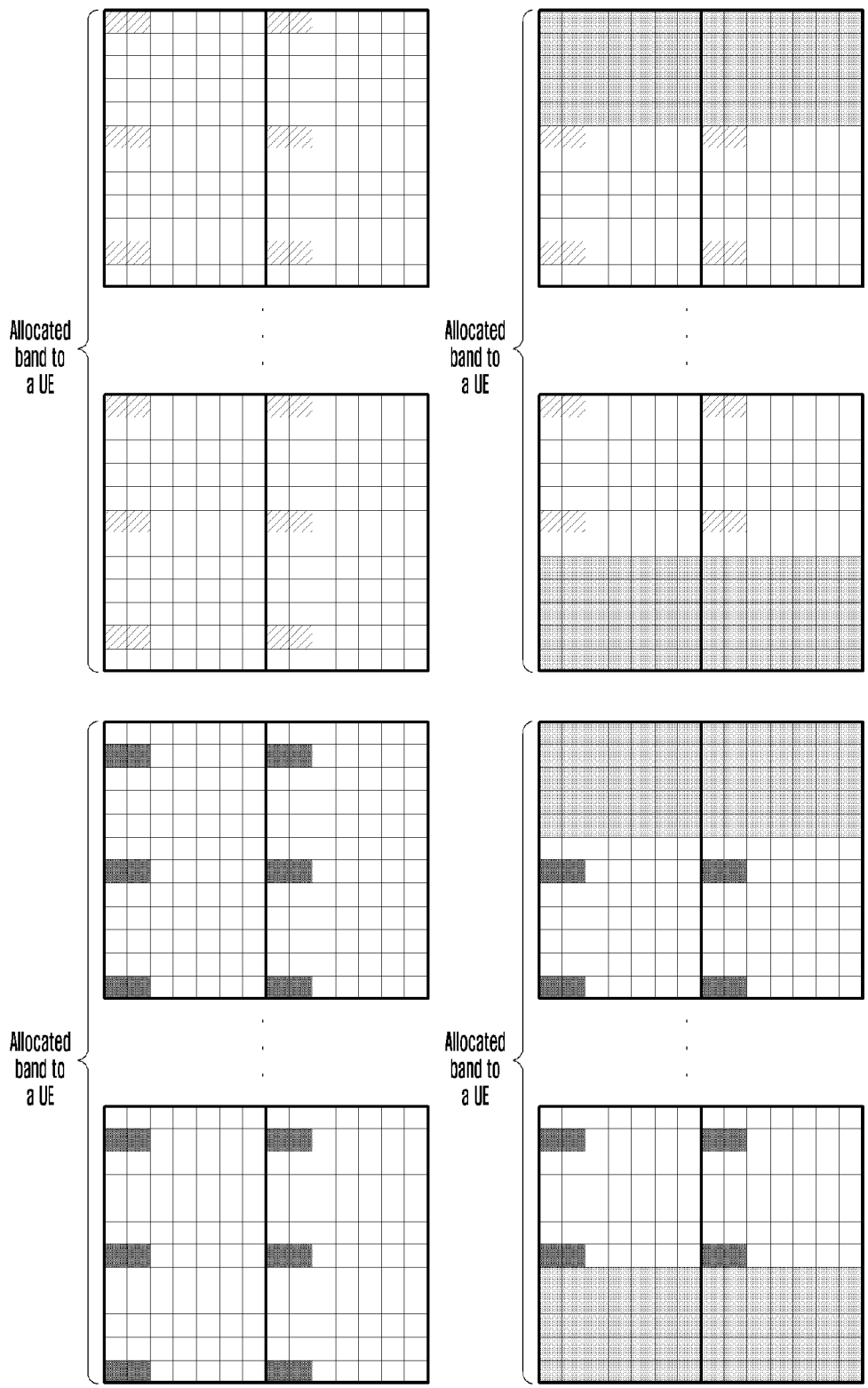
FIG. 27 illustrates a resource block configuration form depending on a DCI 1-bit indication when the DMRS pattern of FIG. 26 according to various embodiments of the present disclosure is used.
Figure 28:
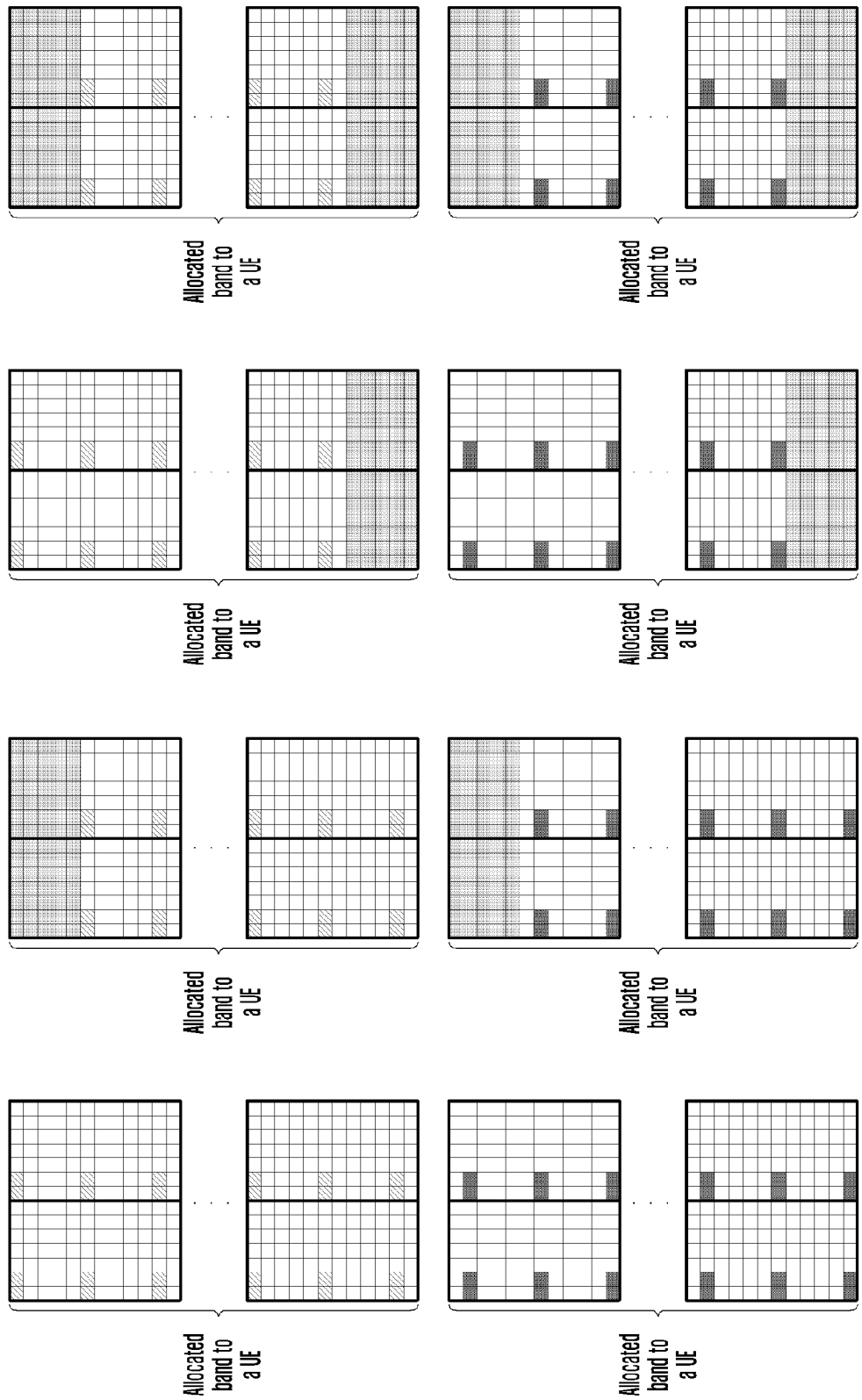
FIG. 28 illustrates a resource block configuration form depending on a DCI 2-bit indication when the DMRS pattern of FIG. 26 according to various embodiments of the present disclosure is used.

The four cases illustrated in FIG. 25 are distinguished by a 2-bit indication All allocated resource blocks consist of only normal resource block A resource block located at the edge in the low frequency direction among the allocated resource blocks consists of the special resource block using the already promised number of null subcarriers (indicated by a dark area in FIG. 24) according to the RS pattern A resource block located at the edge in the low frequency direction among the allocated resource blocks consists of the special resource block using the already promised number of null subcarriers according to the RS pattern All the two resource blocks located on both ends of the low/high frequencies among the allocated resource blocks consists of the special resource block using the already promised number of null subcarriers according to the RS pattern Likewise, even in the case of the RS pattern illustrated in FIG. 26, the guard band can be set through the 1-bit or 2-bit indication in the DCI as in the above Case 1-1) and 1-2), which is illustrated in FIGS. 27 and 28, respectively.

Figure 29:
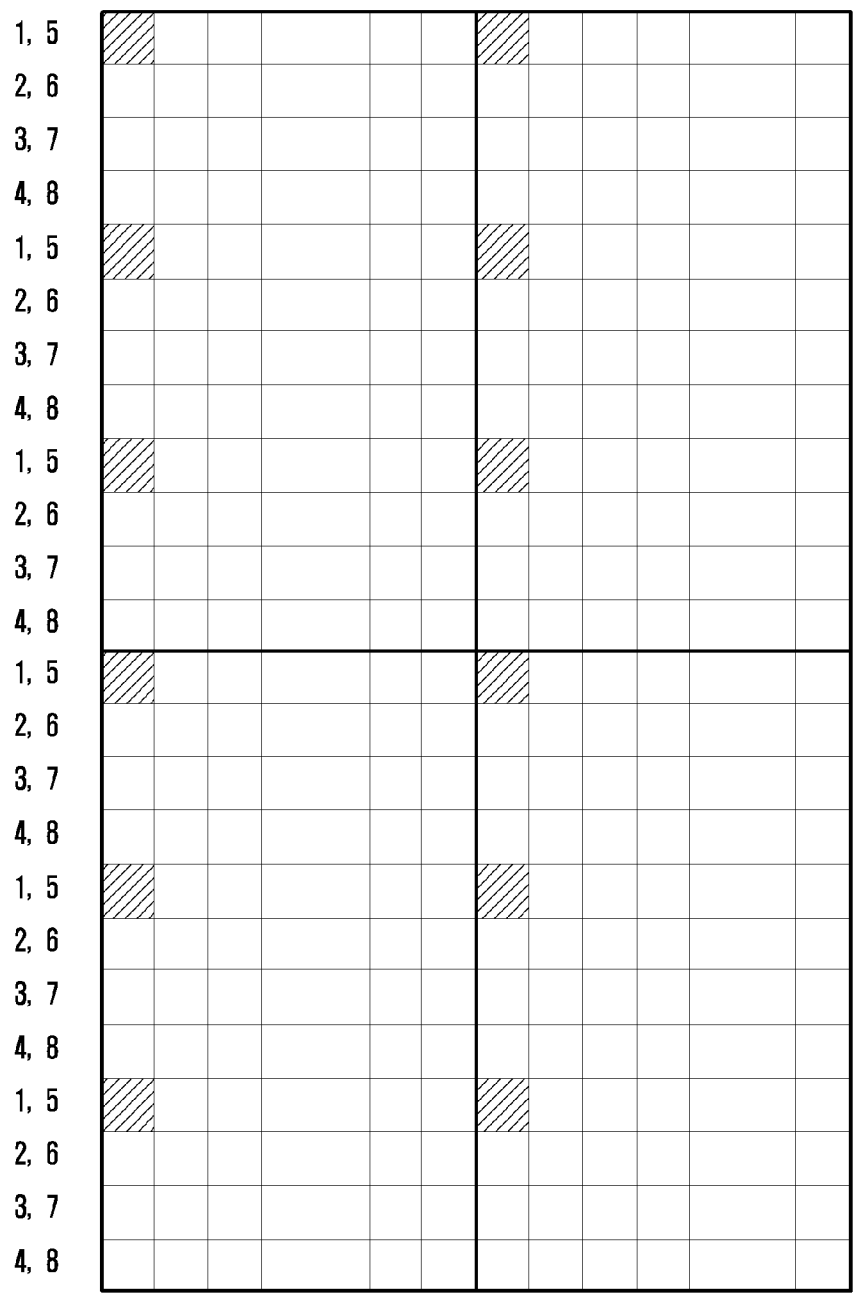
FIG. 29 illustrates an example of a front-loaded DMRS pattern formed in units of two consecutive resource blocks.

In the 5G NR system, the number of antenna ports is expected to increase compared to the 4G LTE/LTE-A, and therefore overhead may be too large for allocating DMRS for all antenna ports within one resource block consisting of 12 subcarriers and the number of subcarriers in the resource block may be too small for applying the front-loaded RS arrangement rule (e.g., when the DMRS is arranged only in the first OFDM symbol or the second OFDM symbol in the resource block, if the number of antenna ports is 16, it becomes difficult to allocate to 12 subcarriers), such that a rule for arranging the DMRS based on a plurality of consecutive resource blocks may be applied. For example, FIG. 29 illustrates the DMRS structure supporting eight antenna ports in units of two consecutive resource blocks. In FIG. 29, in consideration of the coherence bandwidth due to the multipath fading channel, the DMRS is arranged at four subcarrier intervals for each antenna port. (I.e., the RS allocation interval is arranged to be smaller than the coherence bandwidth). The guard band setting for the terminal using the RS pattern is as follows.

Case 1-1) Setting Guard Band Through 1-Bit Indication of DCI

Figure 30:
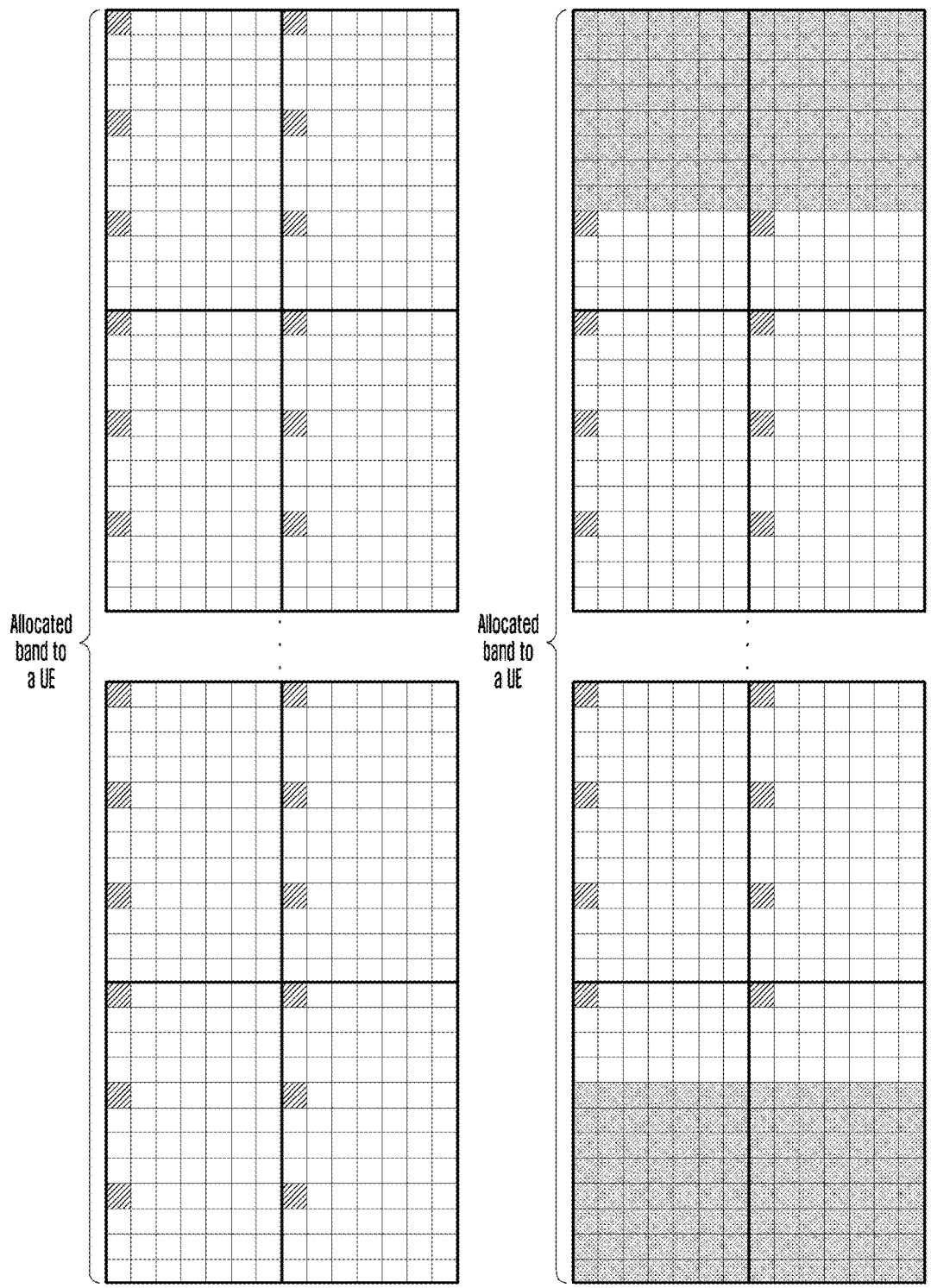
FIG. 30 illustrates a resource block configuration form depending on a DCI 1-bit indication when the DMRS pattern of FIG. 29 according to various embodiments of the present disclosure is used.

The two cases illustrated in FIG. 30 are distinguished by a 1-bit indication All allocated resource blocks consist of only normal resource block The resource blocks on both ends of the low/high frequency among the allocated resource blocks consist of the special resource block nullifying the subcarrier of the edge region after the DMRS subcarrier to prevent the performance deterioration due to the extrapolation upon the DMRS based channel estimation and maintain an orthogonal cover code (OCC) pair (i.e., fixed to the number of already promised null subcarriers according to the RS pattern)

Case 2-2) Setting Guard Band Through 2-Bit Indication of DCI

Figure 31:
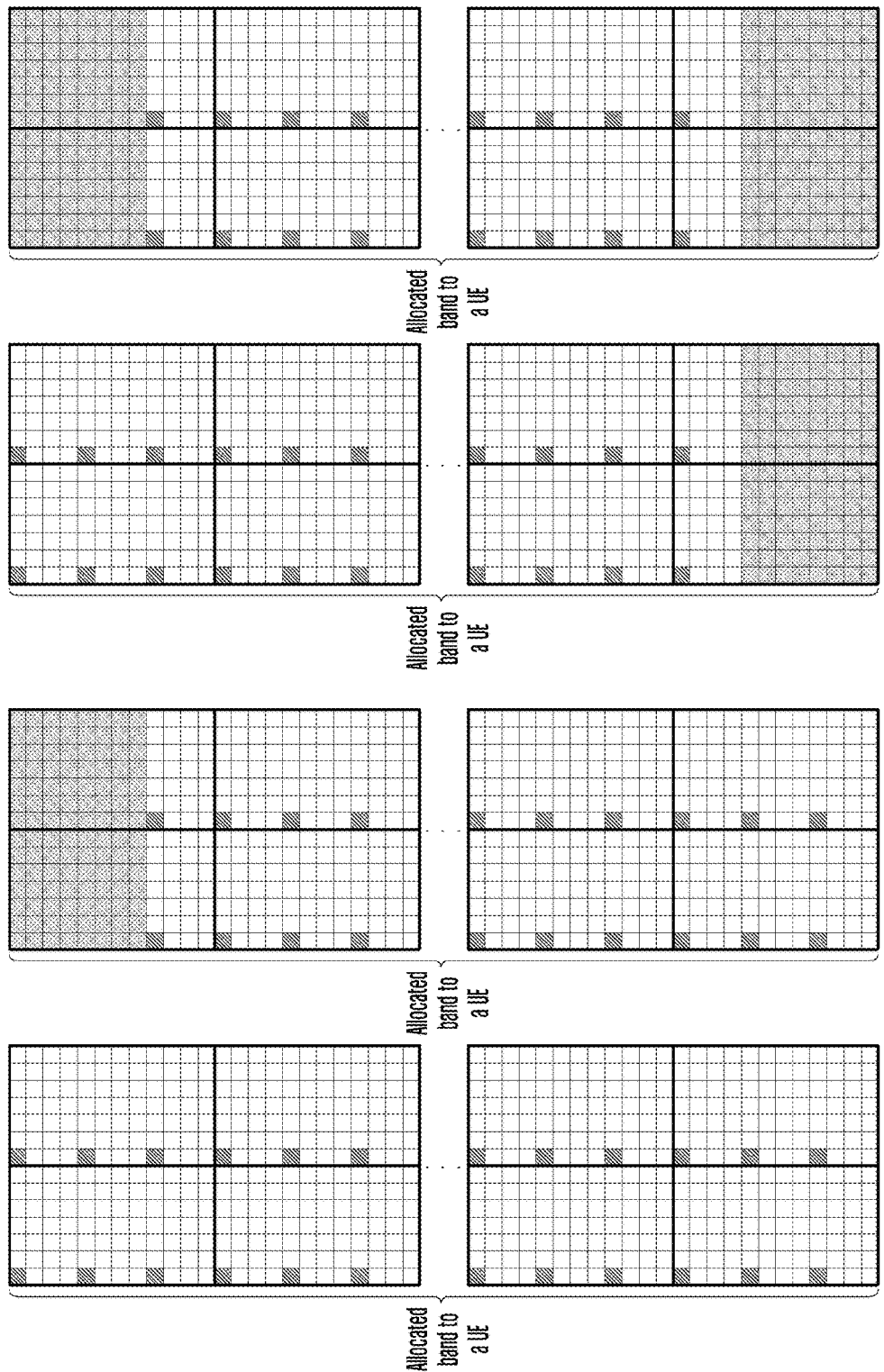
FIG. 31 illustrates a resource block configuration form according to a DCI 2-bit indication when the DMRS pattern of FIG. 29 is used.
Figure 33:
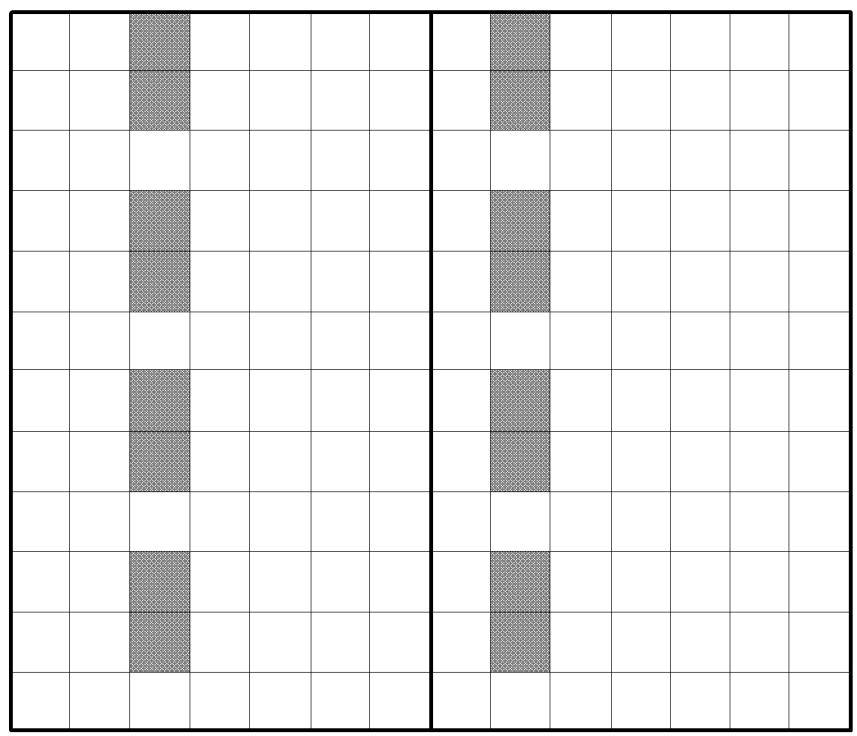
FIG. 33 illustrates an example of the DMRS pattern suitable for a channel environment having strong frequency selectivity in a resource block consisting of two consecutive slot units when a 7-symbol consists of slots.
Figure 34:
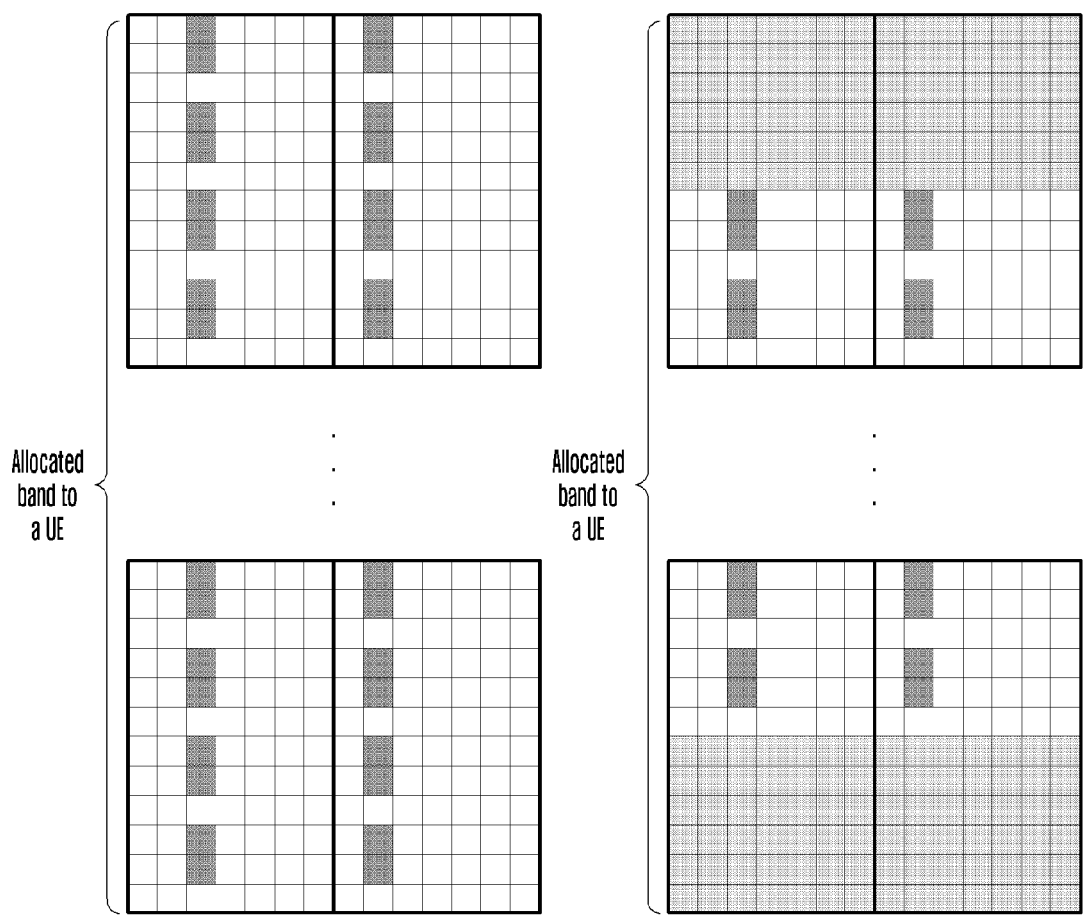
FIG. 34 illustrates a resource block configuration form depending on DCI 1-bit indication when the DMRS pattern of FIG. 33 according to various embodiments of the present disclosure is used.
Figure 35:
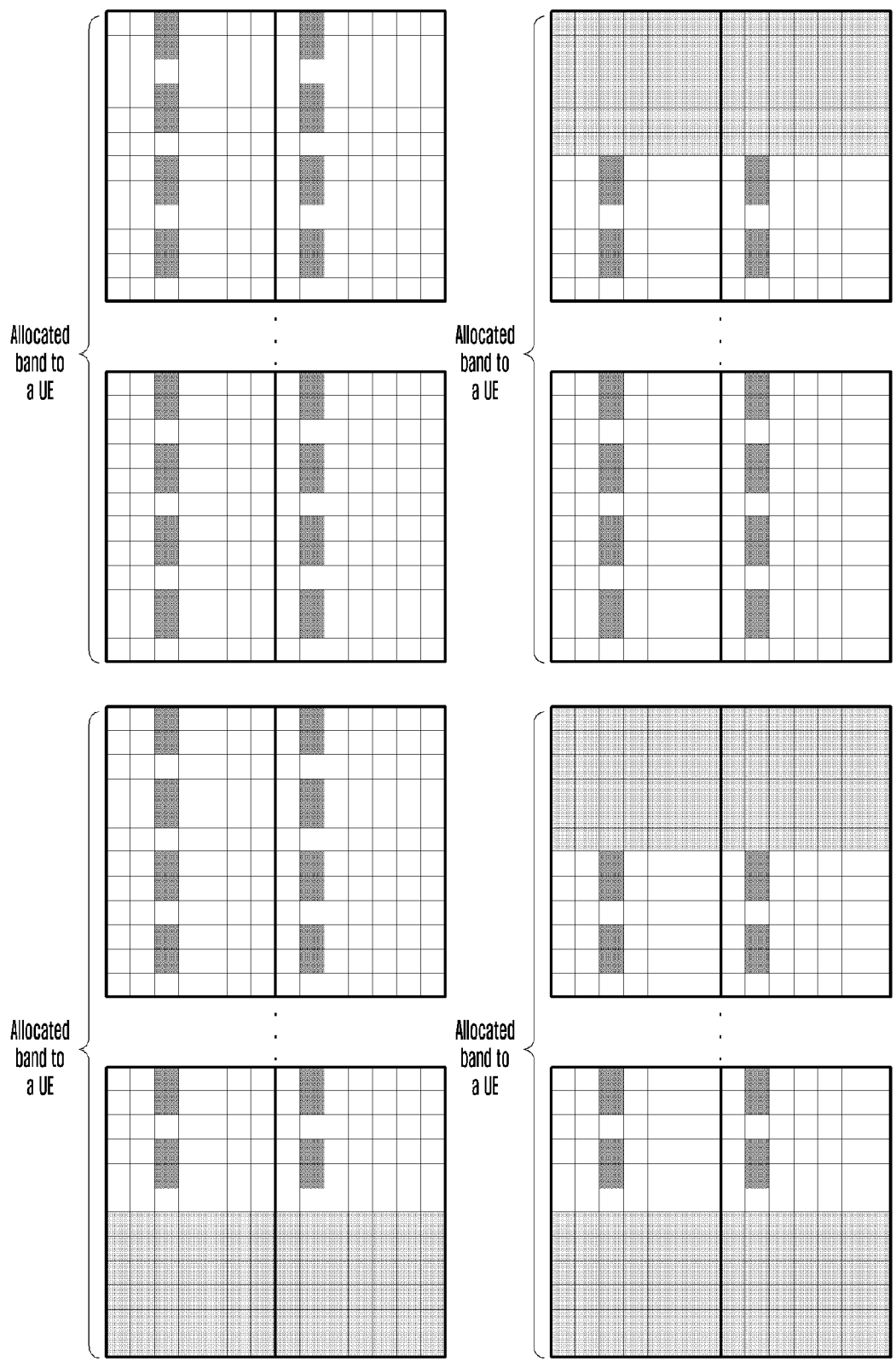
FIG. 35 illustrates a resource block configuration form depending on DCI 2-bit indication when the DMRS pattern of FIG. 33 according to various embodiments of the present disclosure is used.

The four cases illustrated in FIG. 31 are distinguished by a 2-bit indication All allocated resource blocks consist of only normal resource block A resource block located at the edge in the low frequency direction among the allocated resource blocks consists of the special resource block using the already promised number of null subcarriers (indicated by a gray area in FIG. 31) to maintain the OCC pair according to the RS pattern A resource block located at the edge in the high frequency direction among the allocated resource blocks consists of the special resource block using the already promised number of null subcarriers to maintain the OCC pair according to the RS pattern All the two resource blocks located on both ends of the low/high frequencies among the allocated resource blocks consists of the special resource block using the already promised number of null subcarriers to maintain the OCC pair according to the RS pattern Similarly, even in the case of having the RS pattern as illustrated in FIG. 32, the above-described cases 2-1) and 2-2) may be similarly applied. The RS pattern in FIG. 32 may be used in one or a plurality of terminals FIG. 33 is a diagram illustrating an example of the DMRS pattern suitable for a channel environment having strong frequency selectivity in a resource block consisting of two consecutive slot units when a 7-symbol consists of slots. Even in the case of the RS pattern illustrated in FIG. 33, the guard band can be set through the 1-bit or 2-bit indication in the DCI as in the above Case 1-1) and 1-2), which is illustrated in FIGS. 34 and 35, respectively.

Figure 36:
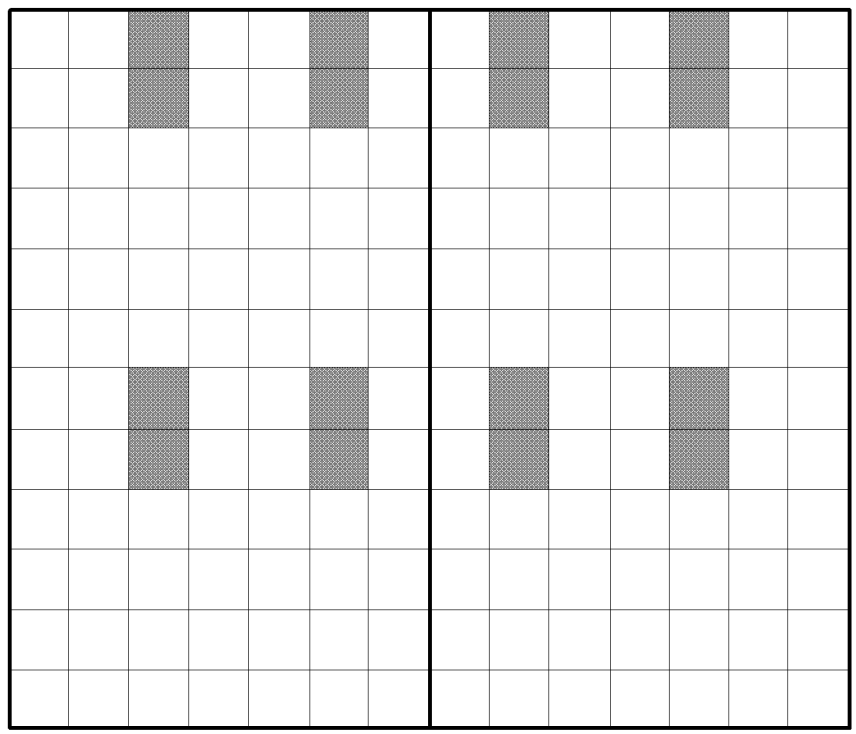
FIG. 36 illustrates an example of the DMRS pattern suitable for a channel environment having strong time selectivity in a resource block consisting of two consecutive slot units when a 7-symbol consists of slots.
Figure 37:
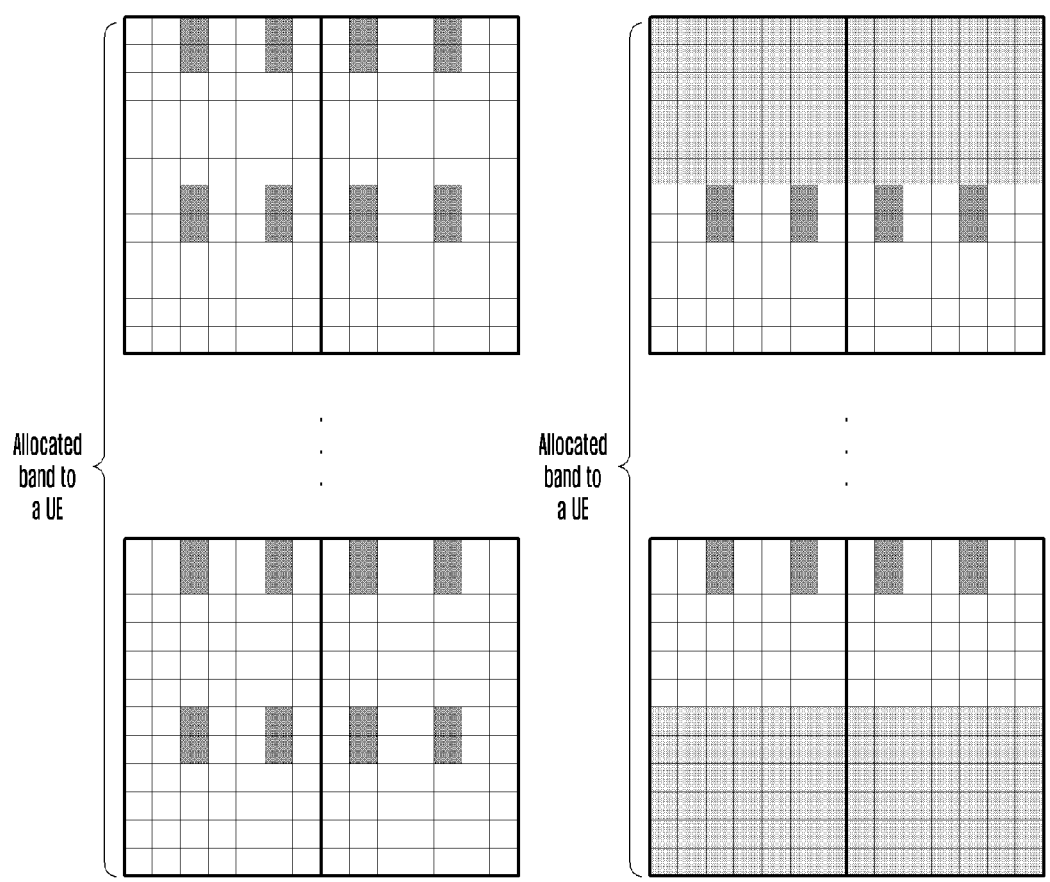
FIG. 37 illustrates a resource block configuration form depending on DCI 1-bit indication when the DMRS pattern of FIG. 36 according to various embodiments of the present disclosure is used.
Figure 38:
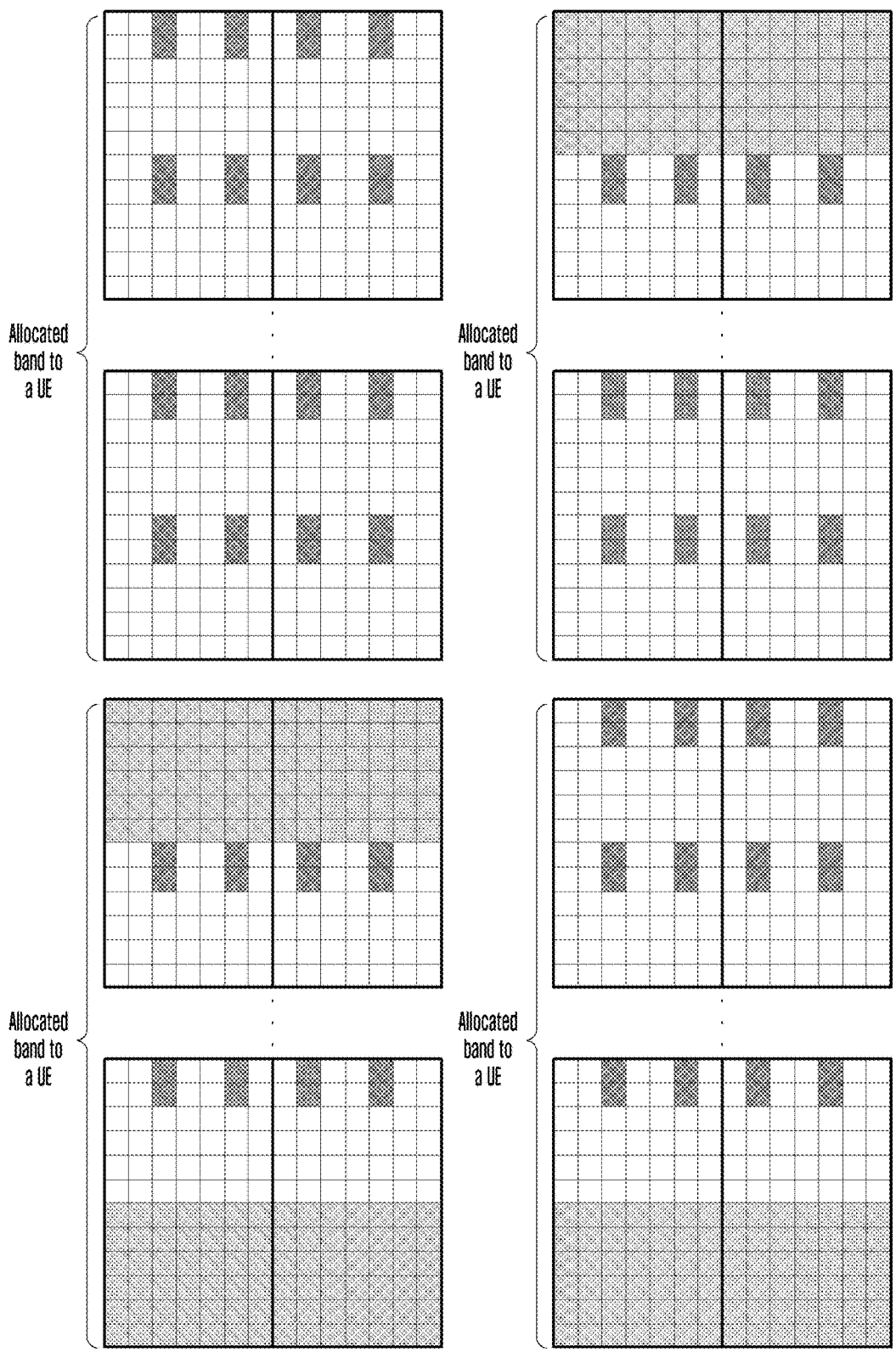
FIG. 38 illustrates a resource block configuration form depending on a DCI 2-bit indication when the DMRS pattern of FIG. 36 according to various embodiments of the present disclosure is used.

FIG. 36 illustrates an example of the DMRS pattern suitable for a channel environment having strong time selectivity in a resource block consisting of two consecutive slot units when a 7-symbol consists of slots. Even in the case of the RS pattern illustrated in FIG. 36, the guard band can be set through the 1-bit or 2-bit indication in the DCI as in the above Case 1-1) and 1-2), which is illustrated in FIGS. 37 and 38, respectively.

Hereinafter, resource mapping and transmission/reception operations of a base station and a terminal when data are transmitted/received including a special resource block according to various embodiments of the present disclosure will be described.

In determining the size of a transport block (TB) of a specific terminal for downlink data transmission or uplink data reception, the corresponding terminal first performs base station link adaptive algorithm based on channel state information (CSI), a channel quality indicator, or the like that are fed back to determine an MCS level and to determine the available resource size that may be currently scheduled in consideration of the number of data bits to be transmitted remaining in a data queue. In this case, when the base station sets the special resource block in consideration of the interference situation upon multi-user transmission, the final transport block (TB) size may be determined according to the estimated link margin of the MCS level to be allocated by the following three methods.

① Conservative scheme: The number of special resource blocks is subtracted from the total number of resource blocks allocated to a terminal, and then the TB size is determined based on the number of rest resource blocks.

② Aggressive scheme: The TB size is determined based on the total number of resource blocks including the number of special resource blocks allocated to the terminal.

③ Recalculation scheme considering Fractional RB: The TB size is determined by calculating the number of resource elements that may be actually mapped in consideration of the number of null subcarriers in the special resource block allocated to the terminal.

In the case of the conservative scheme, since the TB size is small but since the redundant bit may be further transmitted to the special resource block, the effective code rate is lowered, such that the probability of the data reception success probability of the terminal may be further increased. On the other hand, in the case of the aggressive scheme, since puncturing or rate matching is applied due to null subcarriers existing in the special resource block although the TB size increases, the effective code rate increases, such that the probability of data reception success probability of the UE may be relatively lowered. (In case of failure, it may be retransmitted through an HARQ operation.) The terminal basically finds the TB size based on the number of RBs allocated to the terminal and the MCS level through the look-up table to figure out the mapping rule and start the reception.

In the recalculation scheme considering Fractional RB, in constructing a resource group to transmit/receive data including the special resource block, the number of data transport bits (transport block size) may be set to meet the given MCS level in consideration of the number of REs, the total number of REs, and the number of RSs or the like corresponding to the null subcarrier area by the special resource block. For example, the total number of REs may be obtained by the total number of RBs to be allocated×the number of subcarriers per RB×the number of symbols per RB. At this time, the number of subcarriers of the special resource block included in the corresponding area×the number of symbols per RB is calculated and the number of RS resources is calculated to subtract the sum of two values from the total number of REs and then the ratio of the value to the total number of REs may be obtained. If there is a table defining the transport block size (in a manner similar to LTE) when there is the total number of REs in the case where only the normal resource block is originally allocated, then the MCS level to be allocated may be considered, and the calculated is multiplied again (may take an integer value by a floor function) to calculate the reduced transport block size.

As described above, the conservative and aggressive schemes have a common point in determining the TB size based on the resource block and are different from the recalculation scheme considering the fractional RB in that the recalculation scheme determines the TB size based on the number of resource elements (REs). In such schemes, the effective code rate may vary greatly or less depending on the total number of resource blocks allocated to the terminal. For example, when the number of allocated resource blocks is small and the special resource block is included, the conservative scheme may be advantageous in preventing the deterioration of the reception performance, and when the number of allocated resource blocks is large but the special resource block is included, the aggressive scheme may be advantageous in increasing the transmission efficiency. In the case of the recalculation scheme considering the fractional RB, since the TB size may be adjusted according to the number of resource elements to be actually allocated, the link performance may be maintained regardless of the number of allocated resource blocks.

The resource mapping method and the transmission/reception method of the base station/terminal may be changed according to the above-mentioned three TB size determination methods.

First, in the case of the re-calculation scheme considering the fractional RB, when the special resource block is set, the base station and the terminal promises the resource allocation scheme of first allocating data from the frequency domain except for the null subcarrier area and handing it over the next symbol between the transmitting/receiving ends, such that the base station and the terminal may prevent the failure of the data transmission/reception due to the special resource block configuration. As illustrated in FIG. 17, data may be first read or written on the frequency axis in order to reduce the transmission/reception processing delay. However, due to a certain reason, a promise may be made in different directions (e.g., a method for first filling a time axis which is a vertical axis and sequentially filling a frequency axis). If the directivity in which resources in the resource block are read and written is various, the base station may need to inform the corresponding order to the terminal through the control information.

Next, in the case of determining the TB size in the conservative scheme, a bit string in which the redundancy version is further increased by the number of allocatable resource elements in the special resource block among the channel-coded bits is modulated, and then the data symbol may be mapped according to the resource mapping method promised as illustrated in FIG. 17 and transmitted.

Finally, in the case of determining the TB size in the aggressive scheme, it is possible to follow the resource mapping rule upon the allocation only to an existing normal resource block. For example, the base station may set the special resource block in the downlink to ignore the null subcarrier resource even if there is the null subcarrier resource, map the modulated data symbol including the null subcarrier as the existing resource mapping, and then puncture and transmit the whole of the corresponding null subcarrier resource area upon the actual transmission (transmission puncturing). Next, after the terminal figures out the special resource block information through the control channel and then sets the long likelihood ratio of the symbol bit of the null subcarrier resource area to be 0 (the most difficult state to distinguish between 0 and 1), the terminal may perform the channel decoding. If there is no information on the special resource block or the information fails to figure out, the allocation only to the normal resource block is considered to be performed, and the channel decoding may be performed in the same scheme as the existing scheme. If the channel decoding fails due to the performance degradation, the retransmission may be attempted using the HARQ or the like. The base station may transmit data as it is without performing the puncturing, and the terminal may figure out the null subcarrier area of the special resource block through the control information, set the LLR for the symbol bit of the corresponding area to be 0, and then perform the channel decoding (reception puncturing) or use the advanced receiver technology to remove the interference of the corresponding area and then use it for the LLR calculation. As another scheme, the base station may modulate a bit string in which the redundancy version is further reduced by the number of nulled subcarriers in the special resource block× symbols in the special resource block among the channel-coded bits through the rate matching instead of the puncturing, and map the data symbols by excluding the nulled subcarrier region according to the new resource mapping method changed as in FIG. 17 and transmit the mapped data.

As described above, when the method of determining a TB size according to the setting of the special resource block may be divided into various methods, the base station may inform the terminal of the method through the RRC or DCI signaling, and adapt one of the three methods to allow the base station and the terminal to figure out the TB size as the promised method.

As described above, the embodiment of the present disclosure provides a method of adaptively setting a guard band between subcarrier spacings supported in a wireless communication system on a subcarrier basis instead of an RB basis and the derived extended frame structure. In addition, according to another embodiment of the present disclosure, there is provided a method of processing a control signal in a wireless communication system, including: receiving a first control signal transmitted from a base station; processing the received first control signal; and transmitting a second control signal generated based on the processing to the base station.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A signal transmission and reception method of a terminal in a mobile communication system, comprising: acquiring first information associated with a subcarrier spacing applied to the terminal; obtaining second information associated with a predetermined type of resource block for the subcarrier spacing, wherein the predetermined type of resource block includes at least one subcarrier and a predetermined number of null subcarrier; determining at least one of a resource block of a lowest frequency among scheduled resource blocks and a resource block of a highest frequency among the scheduled resource blocks as the predetermined type of resource block, the predetermined type of resource block is determined based on an indicator, indicating whether the predetermined type of resource block is included in the scheduled resource blocks, included in the second information; and transmitting and receiving data using the at least one subcarrier based on the second information.

2. The signal transmission and reception method of claim 1, wherein the second information is transmitted by radio resource control (RRC) signaling.

3. The signal transmission and reception method of claim 1, wherein the second information is transmitted by being included in downlink control information (DCI) through a physical downlink control channel (PDCCH).

4. The signal transmission and reception method of claim 1, further comprising:
identifying a configuration of the predetermined type of resource block based on location information of the predetermined type of resource block and information on the number of null subcarrier; or
identifying the configuration of the predetermined type of resource block based on de-modulation reference signal (DMRS) pattern information,
wherein the second information includes:
the information on the number of null sub carrier; and
the DMRS pattern information or the location information of the predetermined type of resource block.

5. A signal transmission and reception method of a base station in a mobile communication system, comprising: transmitting first information associated with a subcarrier spacing applied to a terminal to the terminal; transmitting second information associated with a predetermined type of resource block for the subcarrier spacing, wherein the predetermined type of resource block includes at least one subcarrier and a predetermined number of null subcarrier, and wherein at least one of a resource block of a lowest frequency among scheduled resource blocks and a resource block of a highest frequency among the scheduled resource blocks is determined as the predetermined type of resource block, the predetermined type of resource block is determined based on an indicator, indicating whether the predetermined type of resource block is included in the scheduled resource blocks, included in the second information; and transmitting and receiving data using the at least one subcarrier based on the second information.

6. The signal transmission and reception method of claim 5, wherein the second information is transmitted by radio resource control (RRC) signaling.

7. The signal transmission and reception method of claim 5, wherein the second information is transmitted by being included in downlink control information (DCI) through a physical downlink control channel (PDCCH).

8. A terminal in a mobile communication system, comprising: a transceiver; and a controller configured to: acquire first information on a subcarrier spacing applied to the terminal, obtain second information associated with a predetermined type of resource block for the subcarrier spacing from a base station, wherein the predetermined type of resource block includes at least one subcarrier and a predetermined number of null subcarrier; determine at least one of a resource block of a lowest frequency among scheduled resource blocks and a resource block of a highest frequency among the scheduled resource blocks as the predetermined type of resource block, the predetermined type of resource block is determined based on an indicator, indicating whether the predetermined type of resource block is included in the scheduled resource blocks, included in the second information; and transmit and receive data using the at least one subcarrier based on the second information.

9. The terminal of claim 8, wherein the second information is transmitted by radio resource control (RRC) signaling.

10. The terminal of claim 8, wherein the second information is transmitted by being included in downlink control information (DCI) through a physical downlink control channel (PDCCH).

11. The terminal of claim 8, wherein the controller is further configured to:
identify a configuration of the predetermined type of resource block based on location information of the predetermined type of resource block and information on the number of null subcarrier; or
identify the configuration of the predetermined type of resource block based on de-modulation reference signal (DMRS) pattern information,
wherein the second information includes:
the information on the number of null sub carrier; and
the DMRS pattern information or the location information of the predetermined type of resource block.

12. A base station in a mobile communication system, comprising: a transceiver; and a controller configured to: transmit first information associated with a subcarrier spacing applied to a terminal to the terminal, transmit second information associated with a predetermined type of resource block for the subcarrier spacing, wherein the predetermined type of resource block includes at least one subcarrier and a predetermined number of null subcarrier, and wherein at least one of a resource block of a lowest frequency among scheduled resource blocks and a resource block of a highest frequency among the scheduled resource blocks is determined as the predetermined type of resource block, the predetermined type of resource block is determined based on an indicator, indicating whether the predetermined type of resource block is included in the scheduled resource blocks, included in the second information; and transmit and receive data using the at least one subcarrier based on the second information.

13. The base station of claim 12, wherein the second information is transmitted by radio resource control (RRC) signaling.

14. The base station of claim 12, wherein the second information is transmitted by being included in downlink control information (DCI) through a physical downlink control channel (PDCCH).

* * * * *